United States Patent [19]
Adams et al.

[11] Patent Number: 5,926,647
[45] Date of Patent: Jul. 20, 1999

[54] PROCESSING SYSTEM WITH DYNAMIC ALTERATION OF A COLOR LOOK-UP TABLE

[75] Inventors: Christopher Adams; Gordon A. Charles, both of Palo Alto; Christopher Mills, Santa Clara, all of Calif.

[73] Assignee: Divicom Inc., Milpiitas, Calif.

[21] Appl. No.: 08/729,547

[22] Filed: Oct. 11, 1996

[51] Int. Cl.[6] .............................. G09G 1/28; G09G 5/06; G06F 12/04
[52] U.S. Cl. .................... 395/800.36; 345/199; 345/515; 345/430; 395/846
[58] Field of Search ..................................... 345/153, 516, 345/199, 119, 431, 197, 443, 340, 430, 502, 519; 395/829, 871, 843, 821, 309, 200.33, 200.54, 557, 559, 846; 364/DIG. 1, DIG. 2

[56] References Cited

U.S. PATENT DOCUMENTS

| | | | |
|---|---|---|---|
| 4,800,380 | 1/1989 | Lowenthal et al. | 340/750 |
| 5,629,720 | 5/1997 | Cherry et al. | 345/119 |

Primary Examiner—Daniel H. Pan
Attorney, Agent, or Firm—Proskauer Rose LLP

[57] ABSTRACT

A method and apparatus for dynamic alteration of a color look-up table (CLUT) pallet identifier in response to one or more key codes placed in an input data stream. An input data stream including a sequence of input data blocks is converted into a stream suitable for addressing a look-up table. The look-up table may be a 256×16 table which requires an 8-bit address to identify a particular table entry. The invention allows such a table to be addressed using 4-bit data blocks in the input data stream. For each received 4-bit data block in the input data stream, a determination is made as to whether that block corresponds to a predetermined key value. If a given input block does not correspond to the predetermined key value, the 4-bit input block is combined with a previously-stored 4-bit pallet identifier to generate an 8-bit address into the look-up table. The pallet identifier specifies one of 16 different 16-entry pallets within the 256×16 look-up table. If the given input block does correspond to the key value, a new 4-bit pallet identifier is stored. The new pallet identifier may be contained within a data block which immediately follows the key value block in the data stream. The new pallet identifier is then used in combination with subsequent 4-bit data blocks in the stream to generate 8-bit addresses into the look-up table.

19 Claims, 25 Drawing Sheets

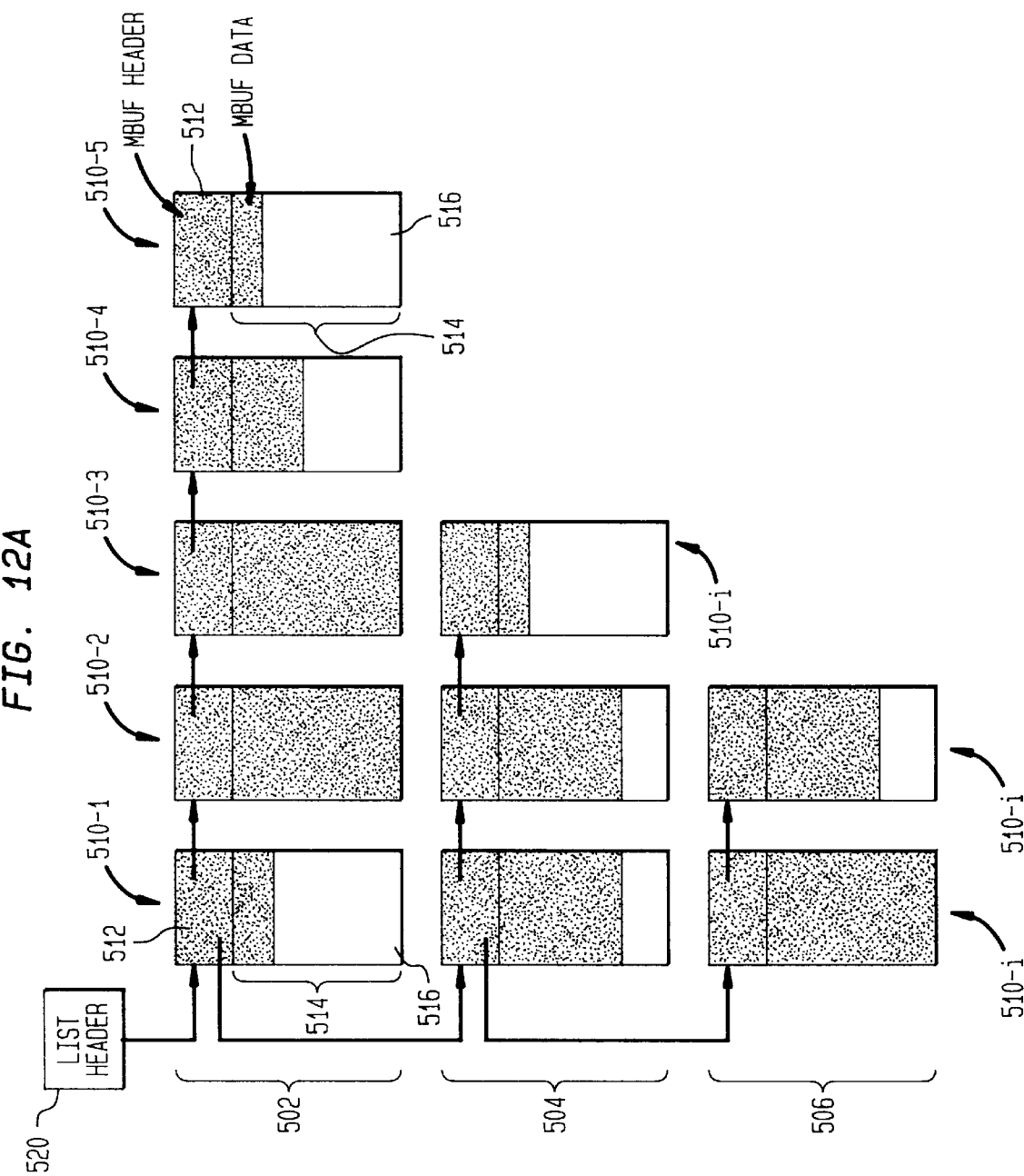

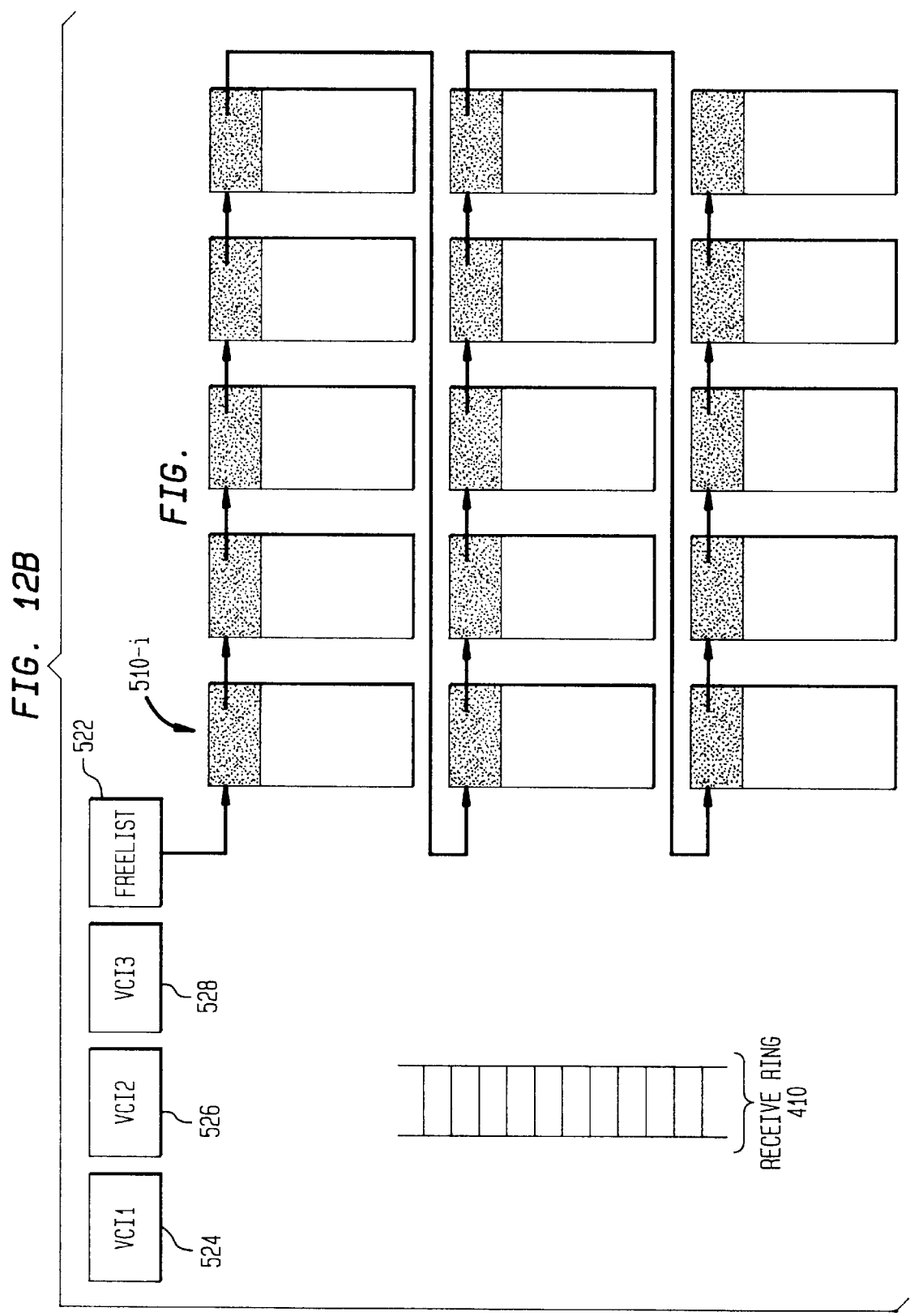

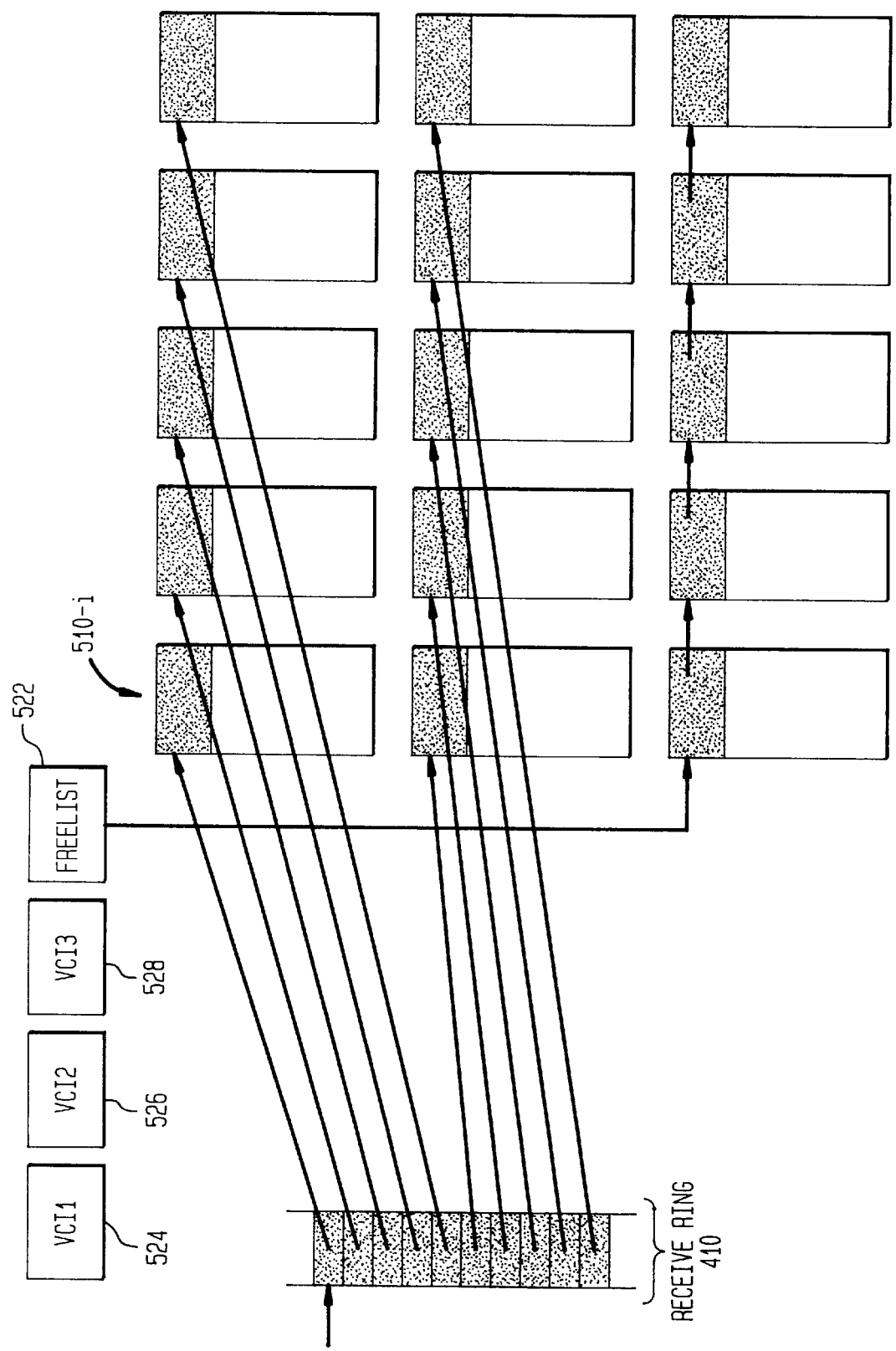

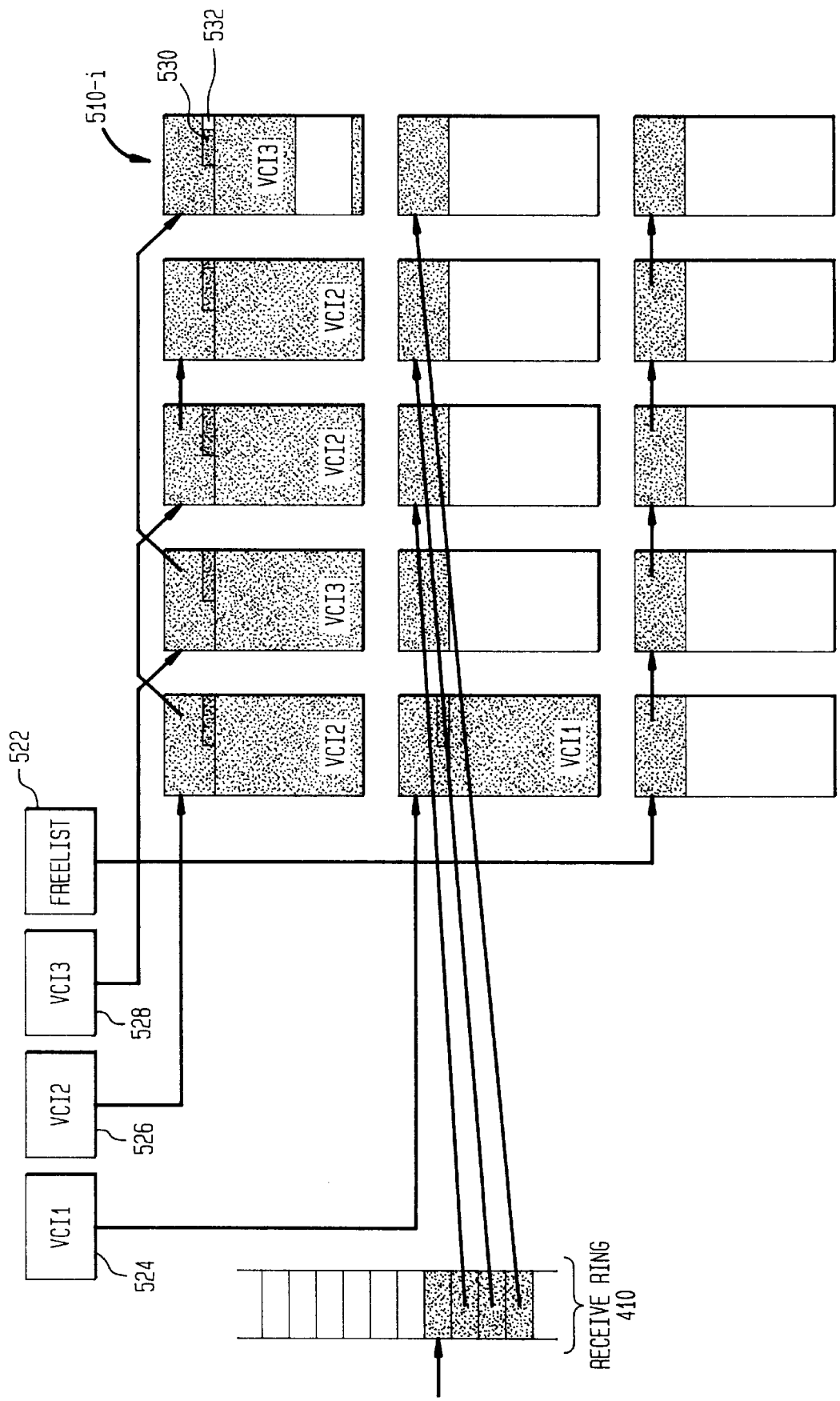

PROCESSING SYSTEM WITH DYNAMIC ALTERATION OF A COLOR LOOK-UP TABLE

RELATED APPLICATIONS

The present application is related to the following U.S. patent applications, all filed concurrently herewith and assigned to the present assignee: Ser. No. 08/729,545 entitled "Processing System With Graphics Data Prescaling"; Ser. No. 08/728,678 entitled "Processing System With Simultaneous Utilization of Multiple Clock Signals", now U.S. Pat. No. 5,790,842; Ser. No. 08/729,544 entitled "Processing System With Register-Based Process Sharing"; Ser. No. 08/731,343 entitled "Processing System With Memory Arbitration Between Memory Access Results in a Set Top Box", now U.S. Pat. No. 5,889,949; Ser. No. 08/731,218 entitled "Processing System With Delta-Based Video Data Encoding", now U.S Pat. No. 5,793,427; Ser. No. 08/731,217 entitled "Processing System With Single-Buffered Display Capture"; and Ser. No. 08/731,285 entitled "Processing System With Pointer-Based ATM Segmentation and Reassembly."

FIELD OF THE INVENTION

The present invention relates generally to video, audio, graphics, input/output and other processing functions in set top box applications. More particularly, the present invention relates to a processing system with an application specific integrated circuit (ASIC) processor which provides video, audio, graphics and input/output processing functions and is particularly well-suited for use in set top box applications.

BACKGROUND OF THE INVENTION

Multimedia distribution systems are becoming increasingly important vehicles for delivering video, audio and other data to and from remote users. Such distribution systems include cable or community access television (CATV) systems, telephone systems and computer networks. A set top box may be used as an interface between the distribution system and a television set, computer or other type of remote user terminal. The set top box typically provides functions such as input/output processing of video, audio and other data, audio and video demultiplexing and decompression, graphics overlay processing for use in electronic program guides and the like, entitlement control for video on demand (VOD), near video on demand (NVOD) and pay-per-view (PPV) applications, and remote control user interfaces.

A conventional set top box generally provides the above-noted functions using a multiplicity of dedicated stand-alone integrated circuits, each having its own separate support circuitry and protocols to provide, for example, memory access and other processing functions. This may be attributed in part to the fact that many of the circuits used in set top box applications are general-purpose devices designed to support a broad array of applications. As a result, there is considerable overlap in many of the circuit functions, as well as potential incompatibilities which lead to slower processing speed and other inefficiencies. The conventional set top boxes are therefore not only unduly complex and expensive, but also fail to provide optimal levels of performance. Widespread implementation of multimedia distribution systems using cable, telephone and/or computer networks will depend in large part upon reducing the complexity and cost of set top box hardware.

As is apparent from the above, there is a need for an improved processing system suitable for use in set top box applications and which can be configured to utilize shared processing hardware to thereby provide video, audio, graphics, input/output communication and other functions with improved efficiency and reduced cost and complexity.

SUMMARY OF THE INVENTION

The present invention involves apparatus and methods for providing video, audio, graphics, input/output communication and other processing functions in set top boxes and other applications with reduced cost and complexity. In one embodiment, the invention is implemented as an application-specific integrated circuit (ASIC) processor suitable for use in a set top box or other processing system to improve hardware efficiency and throughput performance relative to conventional systems.

One aspect of the invention involves a method and apparatus for prescaling graphics data for use in a graphics overlay operating mode. In an exemplary embodiment, a method and apparatus are provided for processing a stream of RGB pixel data in a graphics processor. The RGB pixel data for a given pixel are first converted to luminance and chrominance data for that pixel. The luminance and chrominance data are then prescaled by a blending value associated with the given pixel. An interpolation operation is performed on the luminance and chrominance data as well as on the blending value for the given pixel using corresponding luminance and chrominance data and blending values for at least one other pixel in the stream. This interpolation may include operations such as horizontal filtering and may also include chroma filtering to convert the luminance and chrominance data into a 4:2:2 chrominance format compatible with MPEG-2 video. The interpolation operation produces interpolated luminance and chrominance data and an interpolated blending value for the given pixel. A video signal to be combined with the graphics data is then scaled using the interpolated blending value. The scaled video signal is combined with the interpolated luminance and chrominance data for the given pixel to provide a combined video/graphics signal suitable for display.

Another aspect of the invention involves a technique for dynamic alteration of a color look-up table (CLUT) pallet identifier in response to one or more key codes placed in an input data stream. In an exemplary embodiment, a method and apparatus are provided for converting an input data stream including a sequence of input data blocks into a converted stream suitable for addressing a look-up table. The look-up table may be a 256×16 table which requires an 8-bit address to identify a particular table entry. The present invention allows such a table to be addressed using 4-bit data blocks in the input data stream. For each received 4-bit data block in the input data stream, a determination is made as to whether that block corresponds to a predetermined key value. If a given input block does not correspond to the predetermined key value, the 4-bit input block is combined with a previously-stored 4-bit pallet identifier to generate an 8-bit address into the look-up table. The pallet identifier specifies one of 16 different 16-entry pallets within the 256×16 look-up table. If the given input block does correspond to the key value, a new 4-bit pallet identifier is stored. The new pallet identifier may be contained within a data block which immediately follows the key value block in the data stream. The new pallet identifier is then used in combination with subsequent 4-bit data blocks in the stream to generate 8-bit addresses into the look-up table. This arrangement provides substantial improvements in table addressing efficiency and is particularly well-suited for use in graphics processors which generate graphics data using color look-up tables.

Another aspect of the invention relates to a technique for permitting simultaneous utilization of two system clocks in applications in which certain processing system elements utilize one system clock operating at a non-integer multiple of another system clock used by other processing system elements. For example, a processing system may include a video decoder and/or an NTSC encoder which operate with a first clock at 27 MHz. The processing system may also include an ASIC processor operating with a second clock at 40.5 MHz. A synchronous phase detector is used to generate a clock enable signal suitable for use in a pipeline structure to facilitate data transfer between the different elements of the processing system. An exemplary circuit may include two or more D-type flip-flops or other data storage devices. The first clock signal is applied to a clock input of a first data storage device, and the second clock is applied to a data input of the first data storage device. The second clock is also applied to a clock input of at least one additional data storage devices connected in series with the first data storage device. The output of the first data storage device is applied to the data input of a second data storage device, the output of the second is applied to the data input of a third, and so on. The clock enable signal is provided at the output of the fourth data storage device. The clock enable signal includes phase information extracted from the first and second clock signals, and is suitable for use in driving one or more multiplexers in a pipeline structure or other state-based logic device to thereby allow data transfer between an element of the processing system operating at the first clock rate and an element operating at the second clock rate.

Another aspect of the invention involves a differential video data encoding technique which utilizes a reduced number of bits per pixel to encode chroma and luma components of a video data stream. In an exemplary embodiment, a 4-bit absolute code is determined for a given 8-bit luma or chroma component in the data stream. The determined absolute code is indicative of a particular one of a plurality of ranges into which the given component falls. The given component is encoded using the determined absolute code if the absolute code produces a lower encoding error than a 4-bit delta code which encodes the component as a difference relative to a previously-encoded component. If the delta code produces a lower encoding error than the determined absolute code, the given component is encoded using the delta code. In a situation in which the given component is the first component of its type on a line of video, an absolute code may be used regardless of whether or not the absolute code produces a higher encoding error than the delta code. The number of 4-bit absolute codes may be selected as fourteen, such that each absolute code specifies one of fourteen possible ranges into which the given component may fall. The remaining two 4-bit delta codes specify whether a predetermined value should be added to or subtracted from the value of a previously-encoded component. Alternatively, the number of 4-bit absolute codes may be selected as eleven, such that each absolute code specifies one of eleven possible ranges into which the given component may fall. The remaining five 4-bit delta codes specify whether a first predetermined value should be added to or subtracted from the value of the previously-encoded component, whether a second predetermined value should be added to or subtracted from the value of the previously-encoded component, or whether the given component should be encoded using the same value as the previously-encoded component. Numerous other arrangements of absolute and delta codes could also be used.

Another aspect of the invention relates to a single-buffered display capture technique. The display capture technique eliminates a "tearing" problem which arises when a top portion of a displayed video image is from a current frame, while a bottom portion of the displayed image is from a previous frame. An exemplary embodiment includes an apparatus for processing a video signal in a processing system, wherein the video signal including a sequence of frames each having an even field and an odd field. The apparatus includes a video capture circuit which receives the video signal from a video source, and a video display circuit which has an input coupled to an output of the video capture circuit. The video capture circuit captures a first set of lines in an even field of the video signal during a time period in which the video display circuit displays a second set of lines in the even field. The video capture circuit also captures the second set of lines in an odd field of the video signal during a time period in which the video display circuit displays the first set of lines in the odd field. The video capture circuit utilizes an odd-numbered decimation factor to determine the first and second sets of lines from all lines in the even and odd fields.

Another aspect of the invention involves a technique for utilizing a hardware register to prevent interference between simultaneously-running processes which attempt to access certain processing hardware such as a drawing acceleration engine. In a exemplary embodiment, a method and apparatus are provided for controlling access of a plurality of processes to a graphics engine in a graphics processor. The graphics processor or other device such as a CPU associated with the processor includes a register with an acquire bit portion and a process identifier portion. When a given process requests access to the graphics engine, a determination is made as to whether the acquire bit of the register is set. A set acquire bit indicates that some process has already been granted access to the engine. If the acquire bit is not set, the requesting process is granted access to the engine, and its process identifier is stored in the process identifier portion of the register. If the acquire bit is already set when the given process requests access to the engine, the identifier for that process is compared to the identifier stored in the process identifier portion of the register. If the identifiers match, the requesting process is granted access. The lack of a match between the identifiers indicates that a different process has previously been granted access to the engine, and the requesting process is therefore denied access to the engine. When a process granted access to the engine no longer requires access, the acquire bit is cleared. This hardware-based sharing mechanism allows multiple processes to share common state-sensitive graphics hardware such as a drawing acceleration engine.

Another aspect of the invention is directed to a memory arbitration technique which allows multiple hardware functions implemented in a single ASIC to utilize a single shared memory unit or multiple shared memory units. The memory arbitration technique establishes a priority among multiple memory access requestors which is particularly well-suited for use in a set top box processing system. This aspect of the invention significantly reduces the complexity of a set top box or other processing system in that separate memory controllers are eliminated and memory conflicts are considerably reduced. An exemplary embodiment provides a method of arbitrating between a plurality of memory access requests received from a plurality of processing elements in a set top box processing system. The processing elements include a transport stream demultiplexer, a host central processing unit and a graphics processor. The method involves the steps of receiving the memory access requests from the processing elements, and permitting the processing elements to access a shared memory in accordance with an established priority. The established priority assigns a higher priority to the graphics processor than to the host central processing unit, and may be in the order of graphics processor, transport stream demultiplexer, and central processing unit. In an embodiment in which the plurality of processing elements includes an asynchronous transfer mode (ATM) processing element, the established priority may assign the lowest priority to the memory access requests of the ATM processing element.

Another aspect of the invention involves an ATM segmentation and reassembly (SAR) device which provides efficient transfer of ATM cell data between a set top box or other processing system and an ATM network. The SAR device provides filtering of a stream of received ATM cells by comparing the virtual channel indicators (VCIs) of the incoming cells with a plurality of indicators stored in a receive VCI table. A given cell is accepted if the VCI for that cell matches one of the stored indicators. At least one additional stored indicator may be used as a hash table to provide a matching function for a number of additional VCIs. If the VCI for the given received cell does not match one of the stored indicators in the receive VCI table, at least a portion of the VCI for that cell can be used as a bit index into the hash table provided by the additional stored indicator. The given received cell is accepted if the hash table bit designated by the portion of the VCI used as a bit index has a predetermined value. The indicator table may be implemented as a 16×16 random access memory table in which the first 15 entries represent VCI values to be accepted by a receiver, and the last entry represents a 16-bit hash table such that the four least significant bits of a given received VCI are used as a bit index into the table. A given received cell is discarded if its VCI does not match one of the identifiers stored in the identifier table and if its corresponding hash table bit does not have the predetermined value.

The SAR device also provides an improved technique for storing received ATM cells which facilitates the reassembly process. An exemplary embodiment uses a receive ring which stores an array of pointers. Each of the pointers specifies the address of a cell buffer suitable for storing an ATM cell. Received ATM cells are first filtered to determine if the cells should be accepted in the SAR device. As noted above, this filtering may be based on a comparison of the incoming cell VCIs with entries in a receive VCI table. When a given cell is accepted, a pointer retrieved from the receive ring is used to determine the address of a cell buffer in which that cell will be stored. Host CPU software directing the operation of the SAR device periodically services the receive ring to prevent overflow. The periodic servicing of the receive ring may be triggered by a flag indicating that all or most available receive ring pointers are already in use. The host CPU software then services the receive ring by sequentially stepping through the ring entries and linking the pointer for each stored cell into a chain of pointers maintained for the VCI on which that stored cell was received. The pointers which are linked into a chain are removed from the receive ring and replaced with pointers to empty cell buffers so that additional receive cells can be processed and stored. When an end-of-frame indicator is detected in a cell received on a given VCI, the host CPU software uses the pointers in the chain maintained for that VCI, as well as any pointers for that VCI remaining in the receive ring, to reassemble an AAL5 frame. A cumulative frame cyclic redundancy code (CRC) is computed using dedicated hardware in a CRC processor. The host CPU software uses the pointers to direct the CRC processor to each cell of the frame in turn, until the full frame CRC is computed. The frame is then accepted or rejected based on a comparison of the computed full frame CRC with the CRC field of the frame trailer. An accepted frame may be passed to upper protocol layers for additional processing, and is eventually written to application buffers such that the cell buffers and corresponding pointers are free to be reused for subsequently-received cells. The cell buffers and corresponding pointers for a rejected frame may be made immediately available for reuse.

The SAR device also provides improved segmentation by utilizing a host CPU to direct the transmission of stored cells in accordance with an array of pointers stored in a transmit ring. In one possible embodiment, host CPU software directs the realignment of stored cell data using dedicated hardware in the form of a CRC processor. The CRC processor computes a full frame CRC as it carries out the cell data realignment under the direction of the host CPU software. The full frame CRC is retrieved from the CRC processor and inserted into an AAL5 trailer in the last cell of a frame to be transmitted. The host CPU software then loads the transmit ring with pointers identifying the cell buffers containing the ATM cells of the frame to be transmitted. A transmitter in the SAR device retrieves a pointer from the transmit ring and then retrieves the corresponding ATM cell identified by the pointer. The transmitter then transmits the retrieved cell to the ATM physical layer interface via a UTOPIA port. The host software periodically services the transmit ring to return pointers for already-transmitted cells to a list of available pointers, and to load the transmit ring with pointers for new cells to be transmitted. The software loads the pointers such that a quality of service transmission rate established for a given VCI is not exceeded, and may direct the interleaving of cells from multiple VCIs as well as the insertion of pointers to null cells into the transmit ring.

These and other features and advantages of the present invention will become more apparent from the accompanying drawings and the following detailed description.

BRIEF DESCRIPTION OF THE DRAWINGS

FIGS. 12A–12H illustrate an exemplary ATM reassembly operation in accordance with the present invention.

DETAILED DESCRIPTION OF THE INVENTION

The present invention will be described in a number of different sections as set forth in the following brief outline.

| | |
|---|---|
| 1. | Set Top Box Processing System |
| 2. | Graphics Processor |
| | 2.1 Square Pixel Aspect Ratio |
| | 2.2 Graphics Modes |
| | 2.3 Alpha Prescaler |
| | 2.4 Dynamic Color Look-up Table (CLUT) |
| 3. | Clock Circuitry |
| | 3.1 Synchronous Phase Detector |
| | 3.2 Multiple Clock Pipeline Structure |
| 4. | Video Data Encoding |
| 5. | Single-Buffered Display Capture |
| 6. | Register-Based Process Sharing |
| 7. | Memory Arbitration |
| 8. | ATM Segmentation and Reassembly (SAR) Features |
| | 8.1 General Description |
| | 8.2 Reassembly |
| | 8.3 Segmentation |

Although illustrated herein in conjunction with exemplary set top box processing applications, the present invention is more generally applicable to numerous other video, audio, graphics and/or communication applications. For example, the ATM SAR features of the present invention may be utilized in any application requiring an efficient interface to an ATM network, and the multiple clock enable circuit may be utilized in any application in which it is desirable for different portions of a device or system to utilize one or more additional clocks which are non-integer multiple versions of a first clock. The term "set top box" as used herein should therefore be construed broadly to include any video, audio, graphics and/or communications processing device or system. Furthermore, although illustrated in conjunction with MPEG-2 transport streams, the invention is more broadly applicable to packet-based data streams generated in accordance with standards other than MPEG-2. These other standards include, for example, the video and audio portions of the CCITT H.320 standard, and the audio coding standards of MPEG-1 and Dolby AC-3. The term "transport stream" as used herein should therefore be understood to refer to any packet-based digital data stream which includes video, audio and/or other types of data, or various combinations thereof.

1. Set Top Box Processing System

Figure 1:
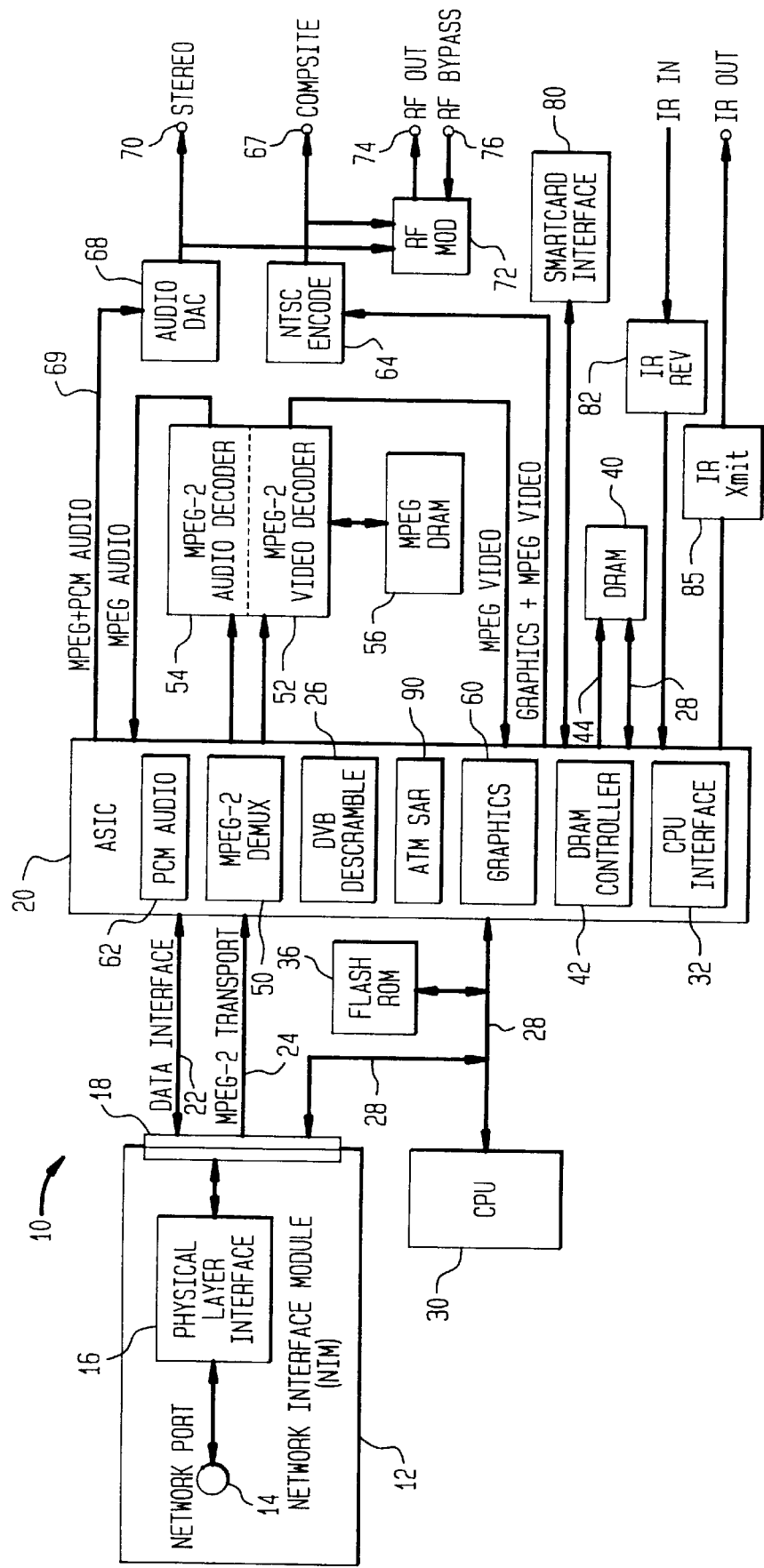
FIG. 1 is a block diagram of an exemplary processing system in accordance with the present invention.

FIG. 1 is a block diagram of an exemplary set top box processing system 10 in accordance with the present invention. The processing system 10 includes a network interface module (NIM) 12 which receives an input signal via a network port 14. The NIM 12 may serve as an interface to a cable, telephone or computer network. For example, the input signal may an RF signal supplied from a multichannel multipoint distribution service (MMDS) to the processing system 10 at a remote user site using conventional transmission techniques. Other exemplary signal distribution techniques suitable for use with the present invention include switched digital video (SDV), hybrid fiber/coax (HFC), direct broadcast satellite (DBS) and digital subscriber loop (DSL). The input signal is demodulated or otherwise processed in a physical layer interface 16. Portions of the demodulated input signal are supplied from an output interface 18 to an ASIC processor 20 over data interface line 22. An MPEG-2 transport stream portion of the demodulated input signal is applied over line 24 to the processor 20. The portions of the demodulated input signal passing over lines 22 and 24 may be further processed by a digital video broadcast (DVB) descrambler 24 within the ASIC 20. The DVB descrambler 24 could alternatively be arranged external to the ASIC 20. The MPEG-2 transport stream represents hierarchically-organized compressed video, audio and other program data, and is described in greater detail in A. Wasilewski, "MPEG-2 Systems Specification: Blueprint for Network Interoperability," Comm. Tech., February 1994, which is incorporated by reference herein. The MPEG-2 standard was developed by the International Standards Organization (ISO) Moving Picture Experts Group (MPEG) and is documented in ISO/IEC DIS 13818, which is incorporated by reference herein. Other portions of the demodulated input signal, as well as control signals for the NIM 12, may be supplied over a bus 28 connected to the interface 18. The bus 28 is also connected to the ASIC processor 20.

A central processing unit (CPU) 30 is connected to bus 28, and may be implemented as a Motorola MC68306 processor operating at 16 MHz. Many alternative CPUs are suitable for use in processing system 10, including, for example, other CPUs in the MC68xxx series, as well as CPUs in the PowerPC 40x series. Also connected to bus 28 is a Flash read-only memory (ROM) 36 which may have a memory capacity on the order of 512 Kbytes. Other elements which may be connected to bus 28 but are not shown in FIG. 1 include a modem and an optional SIMM socket for expansion of dynamic random access memory (DRAM). The modem may be used to communicate with external telephone, computer or cable network communication channels. The ASIC processor 20 includes a CPU interface 32 through which the processor 20 and other elements connected thereto communicate with the CPU 30. The processing system 10 further includes a DRAM 40 which communicates via bus 28 with the ASIC processor 20. The DRAM 40 may have a memory capacity on the order of 512 Kbytes, although it should be noted that the capacity of DRAM 40, Flash ROM 36 and other memory devices in processing system may vary depending upon the memory requirements of a given application. As will be described in greater detail below, the DRAM 40 is generally used to support CPU operations, as well as the video, graphics and ATM communication processing functions of the processor 20. The processor 20 includes a DRAM controller 42 which may control some or all of the DRAM 40 using control signals supplied via line 44. The processor 20 also includes an MPEG-2 demux 50 which receives an MPEG-2 transport stream from the NIM output interface 18 via line 26 and generates therefrom one or more MPEG-2 elementary data streams.

The MPEG-2 transport stream supplied via line 24 will now be described in more detain. A given transport stream associates related elementary data streams for a given program or programs such that the elementary streams can be extracted, decoded and presented together in a coherent fashion. Each elementary data stream represents a stream of MPEG-2 encoded audio, video or other data. An MPEG-2 transport stream generally includes a sequence of fixed-length 188-byte transport packets. A transport packet of the PES-bearing type includes a payload which carries a portion of a longer packetized elementary stream (PES) packet, where a PES packet includes elementary stream data for a given program as well as corresponding timing, identification and control information. All PES-bearing transport packets with a common packet identifier (PID) carry elementary stream data for a single common elementary stream and no other. The payload portion of the transport packet will thus include elementary stream data from a corresponding PES packet if the transport packet is of the PES-bearing type. The transport packet may also be of the program specific information (PSI) type or the private data type.

Each transport packet also includes a one-byte sync pattern and a three-byte prefix, and may include a variable-length adaptation field. The adaptation field may include, for example, program clock reference (PCR) and encryption key management information. The sync byte is a fixed pattern which permits identification of the beginning of each transport packet, and is 47×H in the MPEG-2 standard. The prefix includes a thirteen-bit packet identifier PID which, as noted above, identifies the elementary stream supplying the transport packet payload. The transport packet prefix also includes two adaptation field control bits which indicate whether the corresponding transport packet includes a payload with no adaptation field, an adaptation field with no payload, or both an adaptation field and a payload. The prefix further includes a packet error indicator bit, a payload unit start indicator bit, a transport priority bit, two transport scrambling control bits and a four-bit continuity counter. Additional detail regarding MPEG-2 transport packets may be found in the above-cited ISO reference.

The MPEG-2 demux 50 may provide a number of additional functions, including video and audio decoder control, PSI table parsing, PCR clock recovery, and private data capture which supports multiple simultaneous PIDs. It should be noted that the MPEG-2 demux 50 may be configured in the manner described in U.S. patent application Ser. No. 08/585,109 entitled "Transport Stream Decoder/Demultiplexer for Hierarchically Organized Audio-Video Streams," which is assigned to the assignee of the present invention and incorporated by reference herein. Although not illustrated in FIG. 1, transport stream recording and playback features may be provided in processing system 10 in the manner described in U.S. Patent application Ser. No. 08/566,283 entitled "Recording and Playback of Audio-Video Transport Streams", now abandoned, which is assigned to the present assignee and incorporated by reference herein.

Elementary video streams from the MPEG-2 demux 50 are supplied to an MPEG-2 video decoder 52, while elementary audio streams from the demux 50 are supplied to an MPEG-2 audio decoder 54. The processor 20 may manage small ring buffers in DRAM 40 for each of the elementary streams. The decoders 52, 54 convert the elementary streams into decoded video and audio data signals, respectively, using conventional techniques. The video decoder 52 utilizes a DRAM 56 to perform MPEG-2 video decoding operations, and may be configured to support full main-profile-at-main-level (MP@ML) MPEG-2 decoding as defined by the above-cited ISO/IEC 13818-2 specification. The memory capacity of the DRAM 56 may be on the order of 2 Mbytes. The decoded video signal from decoder 52 is supplied to a graphics processor 60 in the ASIC processor 20 and utilized in graphics overlay operations to be described in greater detail below. The graphics processor 60 in processor 20 combines the decoded video signal with one or more graphics signals and supplies a combined digital video output signal to an NTSC encoder 64 via line 65. The NTSC encoder 64 converts the digital video signal to an analog video signal suitable for display on a television or other display monitor connected to a composite video output 67.

The MPEG-2 audio decoder 54 may be configured to support the Musicam Audio Layer II defined by the ISO/IEC 11172-3 specification, including all single and dual channel modes. Multiple sample rates such as 32 KHz, 44.1 KHz and 48 KHz may be supported. The decoded audio signal from decoder 54 is supplied to a pulse-code modulation (PCM) audio processor 62 in the processor 20. The PCM audio processor 62 in processor 20 combines the decoded audio signal with one or more PCM audio signals and supplies a combined digital audio signal to an audio digital-to-analog converter (DAC) 68 via line 69. The audio DAC 68 converts the combined digital audio signal into an analog audio signal which may be supplied to a speaker or other audio output device connected to stereo output 70. The PCM audio feature allows uncompressed PCM audio to be mixed with decoded MPEG audio so that it is possible to, for example, play sound effects while decoding an MPEG program. The analog video and audio output signals are also supplied directly to an RF modulator 72 which may be configured to modulate the analog video and/or audio onto one or more RF carrier signals suitable for application to an RF input of a television, video cassette recorder (VCR) or other device connected to RF output 74. An RF bypass input 76 is connected to the RF modulator 72 and is used, for example, to allow an input analog video signal from another source to be supplied directly to a television monitor.

The processing system 10 includes a smartcard interface 80 connected to the processor 20. The smartcard interface includes a smartcard socket for receiving a smartcard. The smartcard socket may be configured in accordance with the ISO 7816 standard, which is incorporated by reference herein, and may utilize a smartcard of the type known as NagraVision™ available from Nagra+ of Switzerland. Numerous alternative smartcards are well known in the art and may also be used. The smartcard interface 80 and corresponding smartcard may be part of a conditional access service (CAS) compliant with ISO/IEC 13818-1, ISO 7816 and the Digital Video Broadcast (DVB) recommendations. The CAS system utilizes the MPEG-2 demux 50 in processor 20 to identify entitlement management messages (EMMS) and entitlement control messages (ECMs) in an incoming MPEG-2 transport stream. The EMMs are typically addressed to the decoders 52, 54 and indicate whether the decoders are entitled to receive program data transmitted on a given input signal channel or channels. The EMMs may also be used to specify an entitlement time range, or event signaling information such as near video on demand (NVOD)/pay-per-view (PPV) billing credits, return channel access schedules, parental control information or custom application-defined events. A given EMM may contain an encrypted service key which is used to decrypt subsequent ECMs. The service keys are changed at a relatively low rate, typically on the order of days or months. The ECMs are addressed to the decoders 52, 54 and contain encrypted control words (CWs) which are changed at a relatively frequent rate, typically on the order of seconds. The EMMs and ECMs identified in demux 50 are queued by processor 20 in DRAM 40 for transmission through the smartcard interface 80 to the smartcard. A direct memory access (DMA) technique may be used to implement this transfer. The smartcard stores a secret key for the processing system 10 and uses the secret key to decrypt an encrypted service key and thereby authenticate the EMM information. The decrypted service key is then used to decrypt the encrypted CWs which are supplied to the DVB descrambler 26 for use in decoding portions of an entitled program. Any event EMMs may be transferred to an event queue for processing by the CPU 30.

The processing system 10 includes an infrared (IR) receiver 82 which receives a control signal from a remote control device in a conventional manner. The system 10 is also configured to include an IR transmitter 85 which supplies an output IR signal to an IR output 86. The output IR signal may be used to control the operation of or otherwise communicate information to other devices within the vicinity of the processing system 10. For example, the IR transmitter 85 may be used to communicate with a VCR in conjunction with an electronic programming guide to facilitate VCR programming.

An interface to an asynchronous transfer mode (ATM) communication network is provided in system 10 using an ATM segmentation and reassembly (SAR) device 90 contained within processor 20. The operation of the SAR device 90 will be described in greater detail below. The ATM SAR device 90 may interface directly with a UTOPIA port for connection to an ATM network via a physical layer (PHY) device such as a synchronous optical network (SONET) interface. The term UTOPIA refers to a standard handshake/data transfer protocol defined by the ATM Forum for communication between an ATM layer device, such as an ATM SAR device, and a physical layer device, such as a SONET interface. The UTOPIA port may be included within the processor 20 or elsewhere in the processing system 10. Alternative protocols could also be used to interface processor 20 with an ATM network. The ATM SAR capability facilitates implementation of the processing system 10 in applications based on switched digital video (SDV) architectures. As will be described in greater detail below, an ATM SAR device in accordance with the present invention alleviates processing bottlenecks by utilizing a shared memory approach and an appropriate allocation of hardware and software responsibility for ATM processing operations.

It should be noted that many of the elements of processing system 10 which are shown outside the ASIC processor 20 may in alternative embodiments be incorporated into the processor 20. For example, one possible alternative arrangement could incorporate the video decoder 52, the audio decoder 54 and the NTSC encoder 64 into the ASIC processor 20. Of course, numerous other alternative arrangements of the illustrated elements may also be utilized.

2. Graphics Processor

The set top box processor 20 includes a graphics processor 60 which can be configured to support a variety of graphics modes and resolutions. An exemplary embodiment may support a background plane, a decoded video plane, a graphics plane and a hardware cursor. The graphics plane may be arranged to support multiple resolutions of pixel size and aspect ratio, including square pixels, multiple color modes, and multiple levels of alpha blending. The graphics plane may be programmable in size, screen position, and DRAM memory map position. The graphics plane will also be referred to herein as the drawport. On a case in which the drawport is configured to be smaller than an entire display screen, the area outside the drawport may be set to the background color or can be made "transparent" to allow video to show through. Suitable variation of factors such as resolution, color depth and drawport size may be used to control the amount of DRAM 40 which is used by the graphics processor 60. The present invention provides a number of graphics modes which require less memory and therefore free up large portions of memory for use in other processing applications.

2.1 Square Pixel Aspect Ratio

As noted above, the graphics processor 60 may be configured to support a square pixel aspect ratio, that is, a 1:1 aspect ratio. The MPEG-2 video decoder 52 and NTSC encoder 64 of FIG. 1 typically utilize a 4:2:2 chrominance format which results in a 9:8 aspect ratio. Although the difference between a 9:8 and 1:1 aspect usually does not result in completely unacceptable appearance, it still may be desirable to utilize a 1:1 ratio rather than a 9:8 ratio when, for example, displaying graphics content which was prepared for a square pixel platform. Conversion of a 9:8 aspect ratio to a 1:1 aspect ratio will generally involve at least some amount of re-sampling of a given image to stretch or shrink one of the dimensions. It should be noted that re-sampling will usually cause some loss of image bandwidth and therefore fidelity. It may thus be preferable to use the 9:8 video aspect ratio unless the application has a specific need for a square pixel aspect ratio.

In accordance with the invention, a horizontal re-sampling filter can be included within the ASIC processor 20 of FIG. 1. The re-sampling filter may be part of the graphics processor 60, and can be enabled or disabled under control of the CPU 30. The re-sampling filter provides a square pixel aspect ratio by stretching the image horizontally. It has been determined that this horizontal stretching is significantly more cost effective than vertical shrinking. One reason that vertical shrinking is more expensive is that vertical filters typically require line buffers and utilize substantially more memory bandwidth.

2.2 Graphics Modes

The graphics processor 60 can support multiple transparency modes which each provide several different levels of blending between graphics and underlying video. In one embodiment, transparency modes are provided which support nine different levels of blending. A first transparency mode, referred to as a chroma key mode, allows a particular red-green-blue (RGB) color to be specified as translating to transparent. When the color designator appears in a given pixel or group of pixels in an image to be displayed, the underlying video plane is made visible. This chroma key translation can be utilized in either a direct RGB mode, in which an RGB color designator is supplied directly from memory, or a color look-up table (CLUT) mode, in which an index supplied from memory is used to specify a color designator in the CLUT. Other transparency modes, to be described in detail below, include a 5-5-5-1 RGBA mode and a 4-4-4-4 RGBA mode. These RGBA modes may be implemented as either direct RGB or CLUT modes.

Figure 2A:
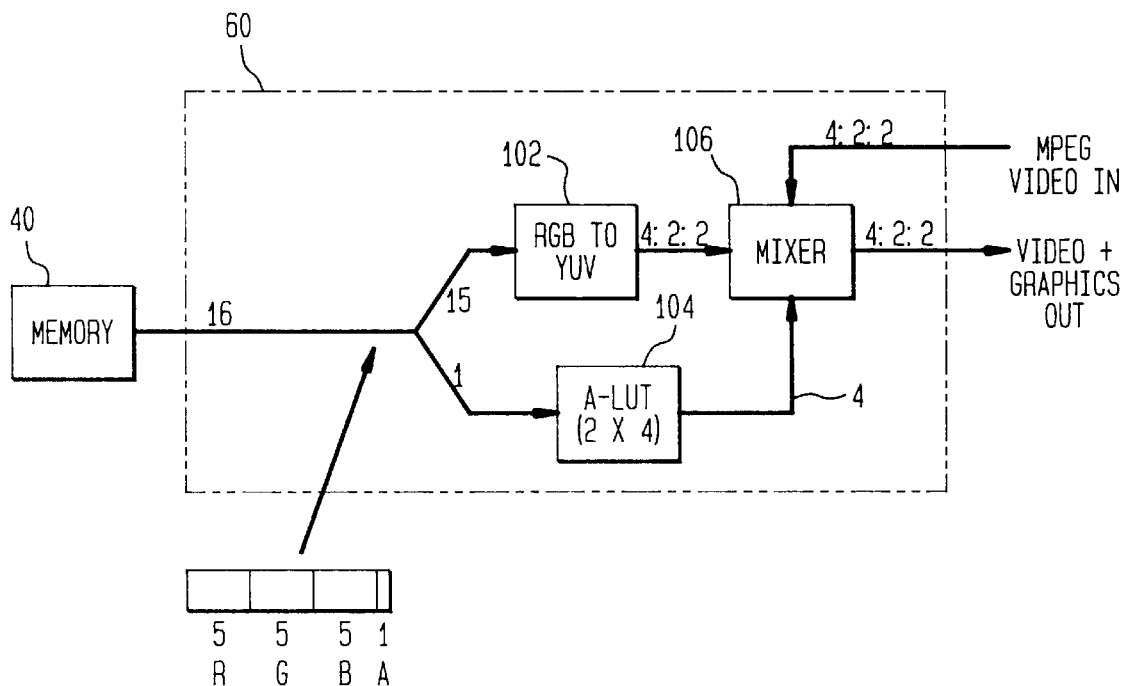
FIGS. 2A–2D illustrate different graphics processing modes which may be implemented in the processing system of FIG. 1.

FIG. 2A illustrates a direct 5-5-5-1 RGBA mode supported by graphics processor 60. A 16-bit RGB color designator for a given pixel is supplied from memory 40 to the graphics processor 60. The 16-bit designator includes 5 bits each of R, G and B and a one-bit alpha (A) value which specifies one of two transparency classes. The 15 RGB bits are supplied to an RGB to YUV converter 102 which converts a sequence of 15-bit RGB values to 8-bit luminance (Y) and chrominance (UV) pixels in accordance with a conventional 4:2:2 chrominance format in which every block of four luminance pixels also includes two chrominance pixels. The A bit is supplied to an alpha look-up table (ALUT) 104 which in this embodiment is configured as a 2×4 LUT in which the A bit identifies one of two 4-bit alpha blending registers. Each blending register in this example contains one of nine 4-bit blending values, 0/8, 1/8, 2/8, 3/8 . . . 8/8. The blending value specifies the transparency of the overlying graphics relative to the video, and is supplied to one input of a mixer 106. Other inputs of the mixer 106 receive the converted YUV output in 4:2:2 format from RGB to YUV converter 102, and the decoded MPEG video input in 4:2:2 format from the video decoder 52. The mixer 106 utilizes the blending value and the 4:2:2 video and graphics signals to form a combined video and graphics signal which is supplied to the NTSC encoder 64 as shown in FIG. 1.

Figure 2B:
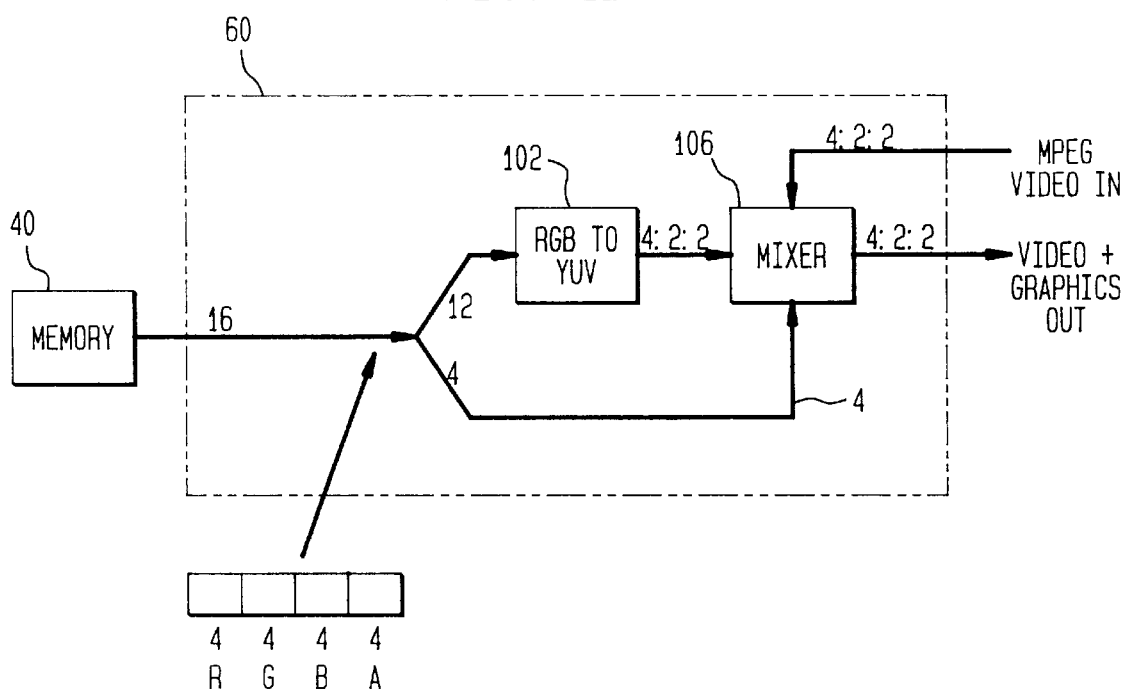

FIG. 2B illustrates a direct 4-4-4-4 RGBA mode supported by graphics processor 60. As in the direct 5-5-5-1 mode, a 16-bit RGB color designator is supplied from memory 40 to the graphics processor 60. However, the 16-bit designator in the direct 4-4-4-4 mode includes only 4 bits each of R, G and B and a 4-bit alpha (A) value which directly specifies one of the above-noted nine possible blending values. The 4-bit alpha value utilizes a least significant bit from each of the R, G and B color values. The direct 4-4-4-4 mode thus sacrifices the least significant bit of each of the R, G and B color values to provide a 4-bit transparency weight for each pixel. The 12 RGB bits are supplied to an RGB to YUV converter 102 which converts the 12-bit RGB values to a 4:2:2 pixel format. The 4-bit blending value is supplied directly to the mixer 106, which uses the value and the 4:2:2 video and graphics signals to generate a combined video and graphics signal as in the 5-5-5-1 mode described above.

Figure 2C:
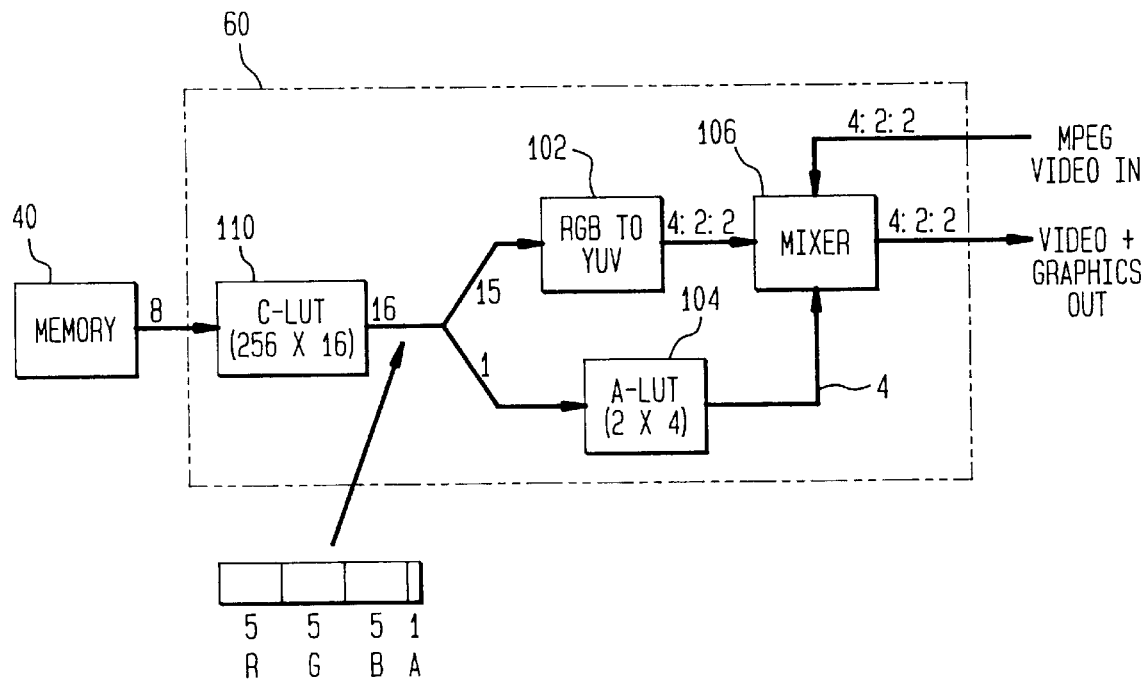
Figure 2D:
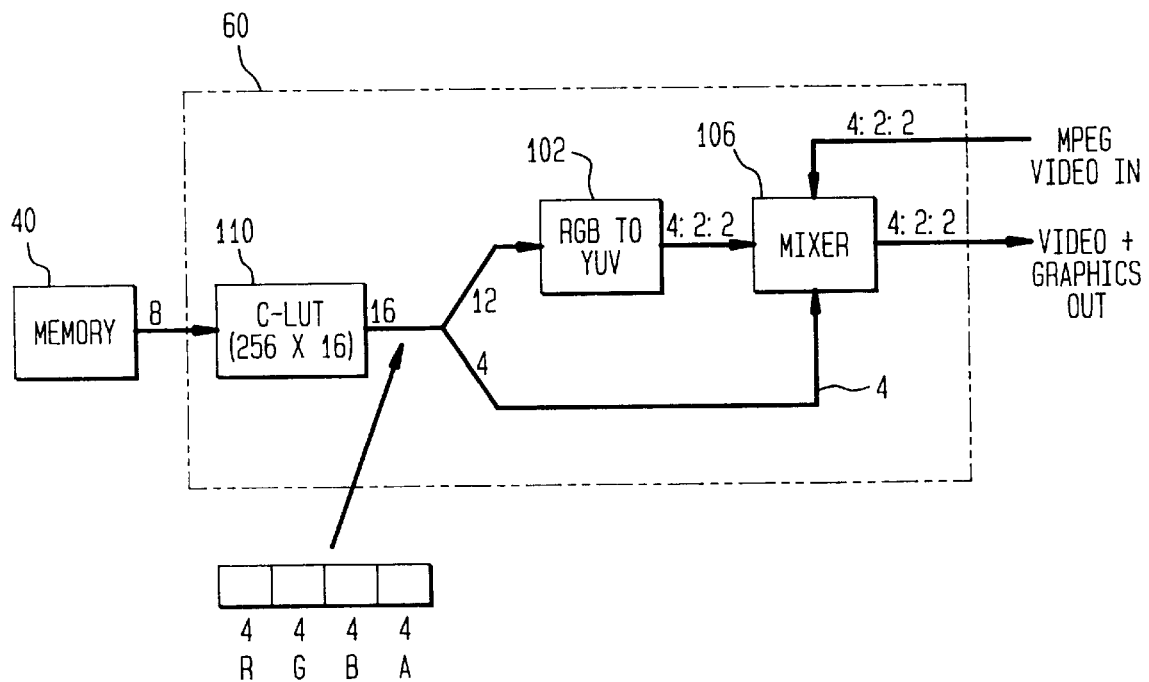

FIGS. 2C and 2D illustrate the operation of the 5-5-5-1 and 4-4-4-4 transparency modes using a 256×16 color look-up table (CLUT) 110. In the transparency modes based on the CLUT, the 16-bit RGBA value is supplied from the CLUT 110 rather than directly from memory 40. An 8-bit index to the CLUT 110 is supplied from the memory 110 and used to determine a 16-bit RGBA value for a given pixel. Once the 16-bit RGBA value is determined using the CLUT 110, the operation of the CLUT-based 5-5-5-1 and 4-4-4-4 transparency modes is the same as that of the direct 5-5-5-1 and 4-4-4-4 modes previously described in conjunction with FIGS. 2A and 2B. The transparency modes of the present invention thus operate in substantially the same manner regardless of whether the 16-bit value for a given pixel comes directly from memory 40 or is supplied indirectly via the CLUT 110. In other words, the CLUT table entries are formatted in the same manner as direct memory mapped pixels. The CLUT may be implemented in a number of alternative sizes, depending upon the application. The convention "CLUTx" will be used to denote a CLUT having an x-bit index and therefore $2^x$ entries. The exemplary 256×16 CLUT 110 of FIGS. 2C and 2D utilizes an 8-bit index to address each of the 256 entries, and is therefore referred to herein as a CLUT8 type of CLUT.

Color expansion features may be provided to further improve processing speed in certain applications. Many graphics operations involve filling a pattern with just one or at most two different colors. Examples of such operations include region fills and text instantiation. The direct or CLUT-based RGBA modes described above may therefore often involve writing 8 or 16 bits per pixel, respectively, but with the same color over and over again. The graphics processor 60 may therefore be configured to allow a graphics driver such as CPU 30 to set a draw color just once in a register in graphics processor 60, and then to draw up to 16 pixels per write cycle to the graphics processor 60 by writing a mask with one bit per pixel significance. For an MC68306 CPU, this color expansion feature can result in about a factor of ten speed improvement for region fill operations.

In an exemplary implementation, a color expander is provided which includes four registers, a foreground/background color register, a mask register, a data register and a destination pointer register. The color expander facilitates the transfer of 1 bit/pixel font/icon bitmaps to an 8-bit per pixel display. The expansion process is initiated by a write to the data register. Each bit in the mask and data registers maps to a byte in DRAM. The corresponding destination DRAM byte is modified if the mask bit is a logic one and not modified if the mask bit is a logic zero. The modification, if any, is dependent on the value of the data register bit. For example, the DRAM byte may be set to the foreground color if the data bit is a logic one and set to a background color if the data bit is a logic zero. The mask register may be initialized by default to all ones, such that the default will be to write the foreground color wherever the data is a one and the background color wherever the data is a zero. This will provide a basic opaque color expansion suitable for use with two-color text, stipples and block fills.

A transparent or masked opaque stipple can be provided by writing the mask register before the data register.

2.3 Alpha Prescaler

In the exemplary graphics modes described in conjunction with FIGS. 2A–2D, the output of the RGB to YUV converter 102 was applied directly to the mixer 106 and mixed therein with the decoded video signal in accordance with the specified alpha blending value. Alternative embodiments of the invention may utilize an alpha prescaler to scale the YUV graphics signal before it is combined with the decoded video in mixer 106. The alpha prescaling serves to preserve the proper relationship between graphics and video in the event certain processing functions such as horizontal and/or chroma filtering are performed on the graphics pixels prior to blending with the video pixels.

Figure 3A:
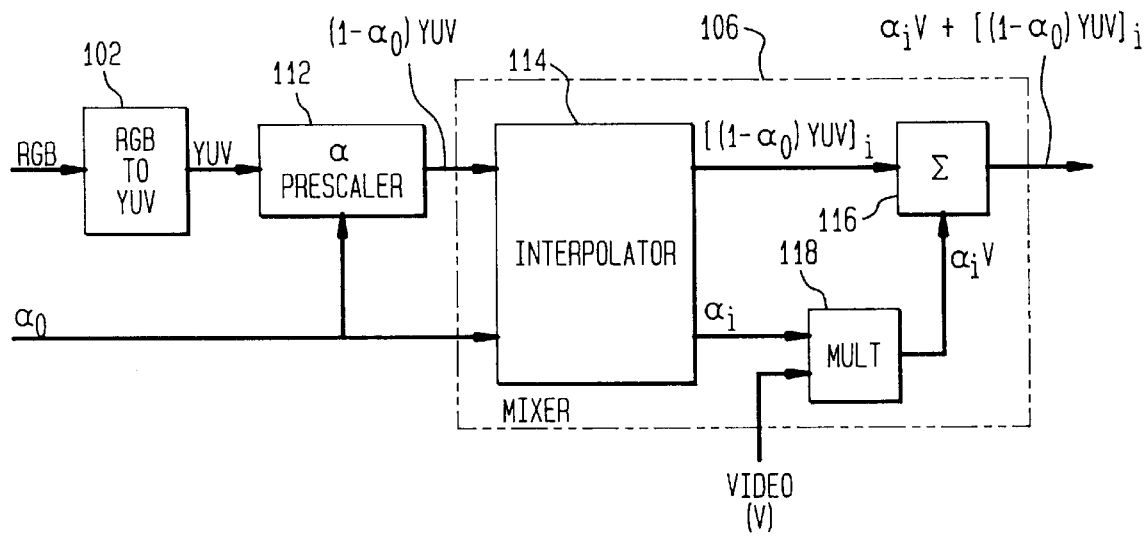
FIG. 3A is a block diagram of an exemplary graphics prescaler in accordance with the invention and suitable for use in the processing system of FIG. 1.

FIG. 3A shows an exemplary implementation of a graphics processing circuit which includes an alpha prescaler 112 arranged between the converter 102 and the mixer 106. As noted above, the converter 102 converts RGB pixels to 8-bit luminance (Y) and chrominance (U,V) pixels which are compatible with the 4:2:2 format of the decoded MPEG video. The converted YUV signal is applied to the alpha prescaler 112 which multiplies the YUV signal by the quantity $1-\alpha_0$ in which the value $\alpha_0$ represents an initial unscaled alpha blending value specified for a given pixel in the manner described in conjunction with FIGS. 2A–2D above. For example, the value $\alpha_0$ may represent one of the nine blending values 0/8 through 8/8 in the examples described above. The prescaled YUV signal is then applied to the mixer 106 along with the initial alpha blending value. The mixer 106 in this embodiment includes an interpolator 114, a signal combiner 116 and a multiplier 118. The interpolator 114 performs a horizontal filtering operation on the prescaled YUV signal and the initial alpha blending value to thereby generate an interpolated scaled YUV signal, $$[(1-\alpha_0)YUV]_i,$$

which is applied to the signal combiner 116, and an interpolated blending value $\alpha_i$ which is applied to the multiplier 118. The interpolator may also perform a chroma filtering function to convert 8-8-8 YUV data into the 4:2:2 chrominance format of the decoded MPEG video. This chroma filtering may be provided using a three-tap chroma filter with coefficients (¼, ½, ¼). The interpolated blending value scales the decoded video signal in multiplier 118 and the result is combined with the interpolated scaled YUV signal in the signal combiner 116. The output of the signal combiner 116 represents a combined video and graphics signal, $$\alpha_i V+[(1-\alpha_0)YUV]_i,$$

which may be supplied to the NTSC encoder 64 as shown in FIG. 1. Although the interpolator 114 is shown as part of the mixer 106 in this example, the interpolator 114 may be arranged outside of the mixer in other embodiments. Also, the interpolator 114 may provide numerous alternative types of known functions, in place of or in addition to the horizontal and chroma filtering functions noted above. Other possible interpolation functions suitable for use with the present invention in place of or in additional to the above-described horizontal and/or chroma filtering include, for example, linear or non-linear filters for smoothing, sharpening or noise reduction.

Figure 3B:
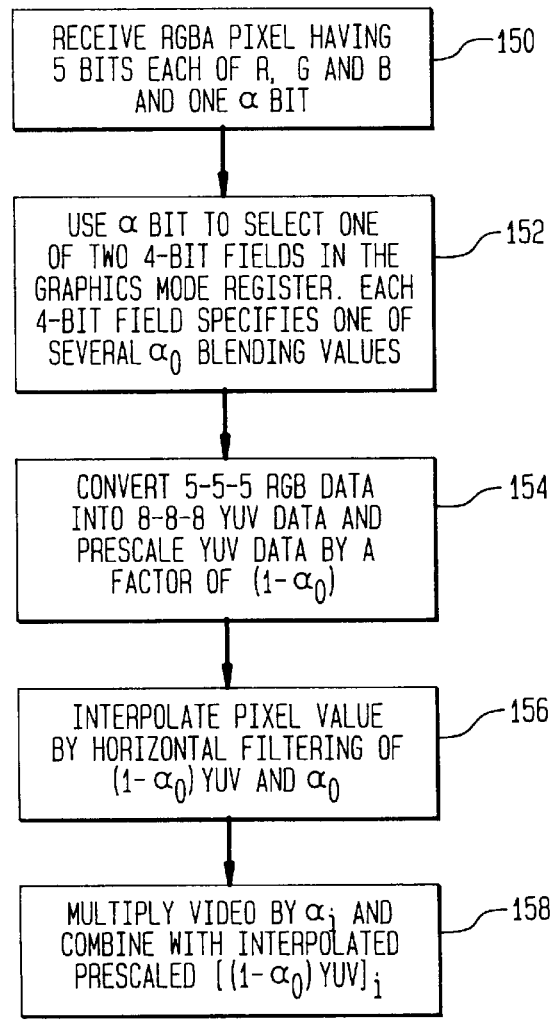
FIG. 3B is a flow diagram illustrating the operation of the exemplary graphics prescaler of FIG. 3A.

The operation of the graphics processing circuit of FIG. 3A is illustrated in the flow diagram of FIG. 3B for a direct 5-5-5-1 RGBA mode. In step 150, an RGBA pixel is received including 5 bits each of R, G and B data and one alpha bit A. Step 152 indicates that the alpha bit A is used to select one of two 4-bit fields in a graphics mode register in processor 20. Each 4-bit field specifies a particular alpha blending value $\alpha_0$. In the above-described examples, one of nine possible blending values $\alpha_0$ was specified in the 4-bit field. Step 154 indicates that the 5-5-5 RGB values are converted in converter 102 into 8-8-8 YUV data, and the YUV data is scaled by a factor of $1-\alpha_0$ in alpha prescaler 112. The resultant scaled values are then interpolated by horizontal filtering in interpolator 114, as shown in step 156. As noted above, the interpolation operation may also include chroma filtering to convert the 8-8-8 YUV data into a 4:2:2 chrominance format to match the decoded video format. The decoded video is then multiplied by the interpolated alpha blending value $\alpha_i$ and combined with the interpolated prescaled $[(1-\alpha_0)YUV]_i$ signal, as shown in step 158.

The alpha prescaling operation should generally be performed prior to interpolation operations such as horizontal filtering, as is illustrated in the following example. Assume an RGB data sequence includes two pixels, the first a red pixel with an alpha value of zero (all graphics), and the second a green pixel with an alpha value of one (all video). Assume also that green is the designated transparent color in accordance with the above-described chroma key technique, such that when a green pixel is received, only the underlying video should be displayed. Further assume that the two pixels are horizontally adjacent pixels which are to be averaged in interpolator 114 using a simple two-tap averaging filter with coefficients (½, ½). If the two pixels are applied directly to the horizontal filter before applying the above-described alpha prescaling, the resulting output pixel will include 50% red from the first pixel as well as 50% green from the second pixel when no green should be visible. However, if the two pixels are first prescaled by the quantity $1-\alpha_0$, where $\alpha_0$ is the above-noted alpha value of zero for the red pixel and one for the green pixel, the resulting output pixel will include 50% red and no green. Assuming the interpolator 114 also performs horizontal filtering on the pixel alpha values as is shown in FIG. 3A, the interpolated alpha value $\alpha_i$ for the resulting output pixel will be (½(0.0)+½(1.0)) or 0.5. The interpolated alpha value $\alpha_i$ is then used to blend in decoded video with the output graphics pixel. The blending produces the desired output with a graphics pixel having 50% red and no green, and 50% underlying video. As noted previously, performing the alpha prescaling operation of the present invention prior to the horizontal filtering would have had the undesirable result of allowing some portion of the green pixel to pass to the output.

The graphics processor 60 may be configured to provide an analog overlay mode of operation suitable for use with analog mixers. The analog overlay mode involves scaling the alpha blending values from, for example, the nine possible blending values used in the foregoing illustrative embodiment, to a reduced number of values such as 0.0, 0.5 and 1.0. This reduction in the number of possible alpha values will generally help to reduce the potential for downstream error. The original alpha values may therefore be quantized to one of the three reduced levels, and then converted to mix bits suitable for driving an analog mixer. The graphics YUV should generally be unscaled by alpha if the analog mixer cannot accommodate the scaled YUV data.

2.4 Dynamic Color Look-up Table (CLUT)

Figure 4A:
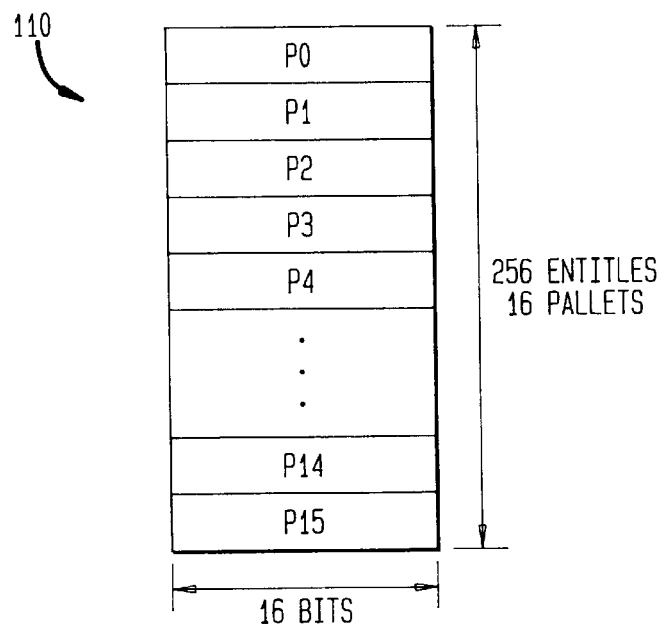
FIG. 4A illustrates an exemplary 256×16 color look-up table (CLUT) divided into sixteen separate pallets and suitable for use in a dynamic CLUT alteration technique which may be implemented in the processing system of FIG. 1.

The graphics processor 20 may include another graphics mode referred to herein as a dynamic color look-up table (CLUT). An exemplary embodiment will be described in conjunction with FIGS. 4A–4D. FIG. 4A shows a CLUT 110 which may be implemented in the graphics processor 60. The CLUT 110 is a 256×16 CLUT with 256 16-bit RGBA entries. As described above in conjunction with FIGS. 2C and 2D, the CLUT 110 may be addressed using an 8-bit index. The dynamic CLUT mode of the present invention allows the CLUT 110 to be addressed using only a 4-bit index, and is therefore also referred to herein as a CLUT4 mode. In the CLUT4 mode, the CLUT 110 is viewed as including 16 different color pallets P0 through P15 as shown in FIG. 4A. Each of the color pallets P0–P15 includes sixteen 16-bit RGBA entries. A 4-bit index can therefore be used to identify one of the color pallets P0–P15 or one of the sixteen entries within a given pallet.

Figure 4B:
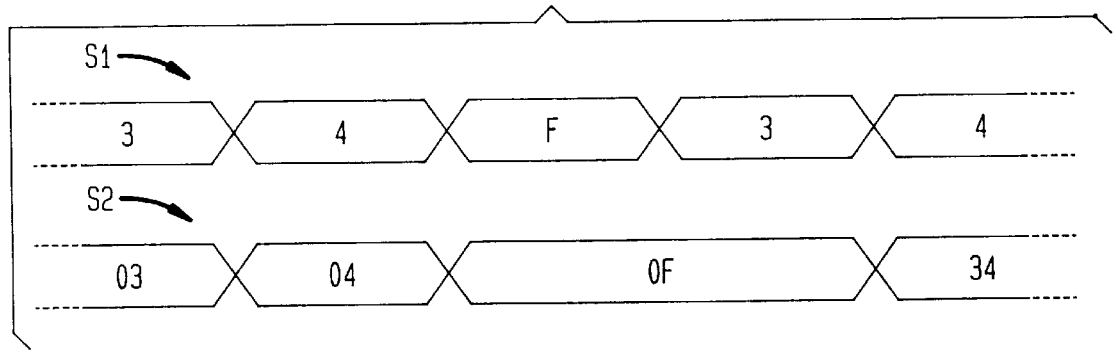
FIG. 4B shows an input data stream and a corresponding converted data stream suitable for use with a dynamic CLUT alteration technique.

FIG. 4B illustrates an input data stream S1 which includes a series of 4-bit color indicators and a modified data stream S2 in which the 4-bit color values are converted to 8-bit indicators in accordance with the present invention. The series of 4-bit indicators in the input stream S1 generally serve as a 4-bit address identifying one of the sixteen entries in a particular pallet P0–P15. For example, the indicator "3" refers to word three, or the fourth entry, of an identified pallet. The particular pallet addressed by a 4-bit indicator is determined by a pallet identifier which immediately follows a key value in the input stream. In this example, the 4-bit input stream key value is 1111 or "F". For the first two indicators in stream S1, the pallet identifier has been previously set to P0. Therefore, the first two indicators "3" and "4" of S1 are converted to 8-bit indicators by appending them to the pallet identifier. The resulting 8-bit indicators are shown in corresponding portions of the stream S2 as "03" and "04". The 8-bit indicators are thus formed from the 4-bit indicators using a designated pallet identifier in conjunction with the 4-bit values.

The same pallet identifier is used for all 4-bit indicators in the input data stream S1 until the above-noted key value appears in the stream. When the key value "F" appears in the input stream, the graphics processor 60 is notified that the pallet identifier is about to be changed, and that the next 4-bit value in the input stream S1 will specify a new pallet identifier to be used with subsequent 4-bit indicators. The key value "F" appears as the third value in the input stream S1 in the example of FIG. 4B. The corresponding converted 8-bit indicator in the converted stream S2 is "0F" and identifies a background color. The 4-bit indicator following the key value "F" in stream S1 is "3" and indicates to the graphics processor 60 that the pallet identifier should be changed to "3" to identify pallet P3. The subsequent 4-bit value in the input stream S1 is "4" and this value is converted to an 8-bit indicator in stream S2 by appending it to the new pallet identifier "3". The resulting 8-bit indicator is "34" as shown in FIG. 4B and identifies word four, or the fifth entry, of pallet P3. This dynamic addressing technique permits the entire 256×16 CLUT 110 to be accessed using 4-bit input data stream values.

Figure 4C:
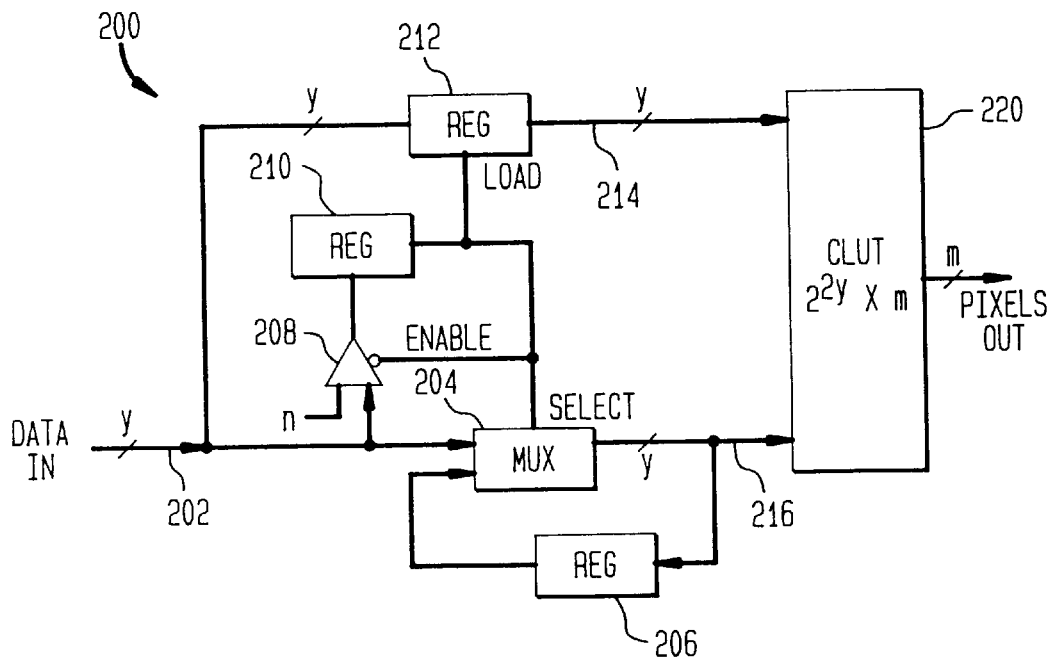
FIG. 4C is a schematic diagram of an exemplary circuit implementation of a dynamic CLUT alteration technique.

FIG. 4C shows an exemplary graphics processing circuit 200 which may be used to implement the above-described dynamic CLUT feature of the present invention. The circuit 200 may be implemented within the graphics processor 20 or elsewhere within ASIC processor 20 or processing system 10 of FIG. 1. An input data stream including y-bit blocks is received on an input 202 of circuit 200 and applied to a multiplexer 204. The y-bit output of multiplexer 204 is fed back to a register 206. A given y-bit input block is compared in comparator 208 with a key value n. The presence of the key value n in the input stream indicates that the pallet identifier should be changed to the value immediately following the key value in the input data stream. A given y-bit block in the input data stream therefore may also be applied to the register 212 which stores the current pallet identifier. Once a pallet identifier has been stored in register 212, that identifier is passed via line 214 to a $2^{2y}$xm CLUT 220 and used as the upper y bits of a 2y-bit address into the CLUT 220. This pallet identifier is used with each subsequent y-bit input block until the key value is received. The y-bit input blocks are passed via line 216 to the CLUT 220 and used as the lower y bits of the 2y-bit address into the CLUT 220. The CLUT 220 uses the y-bit input blocks and stored y-bit pallet identifier to select one of $2^{2y}$ m-bit entries for output.

If the comparator 208 indicates a match between key value n and an input data stream block, the comparator output transitions from a low to a high level, is delayed through a register 210 and is then used to load the next input block into the register 212 as the new pallet identifier. The delayed comparator output is also used to disable the comparator 208 until after the next input block has been received. Disabling the comparator 208 in this manner ensures that an input block received after a key value cannot itself be considered a key value. The delayed comparator output is further applied as a select signal to the multiplexer 204. In the event of a match between a given input block and the key value n, the next block in the stream is not used as an index into the current pallet. Instead, the previous block stored in register 206 is used again by selecting the lower input of multiplexer 204. Once the new pallet identifier has been established and stored in register 212, the comparator output has transitioned back to a low level, such that the comparator is again enabled, and the upper input of multiplexer 204 is selected to thereby pass the y-bit input blocks to the CLUT 220.

Figure 4D:
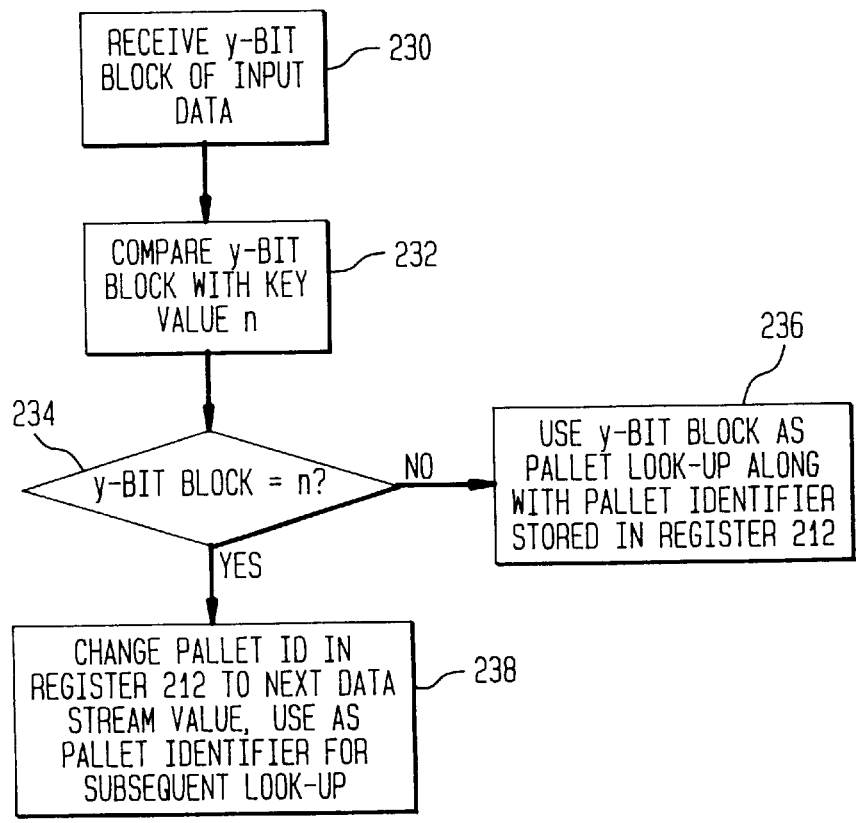
FIG. 4D is a flow diagram illustrating an exemplary dynamic CLUT alteration technique.

FIG. 4D is a flow diagram which summarizes the operation of the exemplary circuit 200. In step 230, a given y-bit block of input stream data is received on input 202 of circuit 200. The received y-bit block is compared with key value n in comparator 208 as shown in steps 232 and 234. If there is no match, step 236 indicates that the y-bit block is used as the lower y bits of a pallet look-up address. These lower y bits are supplied to CLUT 220 via the upper input of multiplexer 204 and line 216. If there is a match, step 238 indicates that the pallet identifier stored in register 212 is changed to the next y-bit value in the input data stream, and used as the pallet identifier for subsequent look-up in CLUT 220. It should be emphasized that the circuit 200 is merely an illustrative embodiment of the dynamic CLUT technique of the present invention, and that numerous alternative implementations will be apparent to those skilled in the art.

3. Clock Circuitry

The present invention provides clock circuitry which allows different elements in the set top box processing system 10 to operate with different but related system clocks. For example, the video data supplied from the MPEG-2 video decoder 52 to the ASIC processor 20 in the processing system 10 of FIG. 1 may be clocked by a first clock with a clock rate R1. The ASIC processor 20 may operate using a second clock with a clock rate R2, where R2 is a multiple of R1. The NTSC encoder 64 which receives the combined video/graphics output signal from the ASIC processor 20 may also operate with the first clock at rate R1. In one possible embodiment, the first clock may have a rate R1 of 27 MHz, while the second clock has a rate R2 of 1.5R1 or 40.5 MHz. Such non-integer variation in operating clock rates between different system elements has presented a number of problems in prior art processing systems, including metastability and difficulty in regulating pipelined data transfer. As a result, it has generally been necessary to utilize either a common or integer-related multiple clock for all elements of the processing system, or to provide complex regulation mechanisms designed to avoid metastability and to regulate data transfer. The present invention avoids these and other problems of prior art processing systems by utilizing a synchronous phase detector illustrated in FIG. 5A in conjunction with a multiplexed pipeline structure illustrated in FIG. 6A.

3.1 Synchronous Phase Detector

Figure 5A:
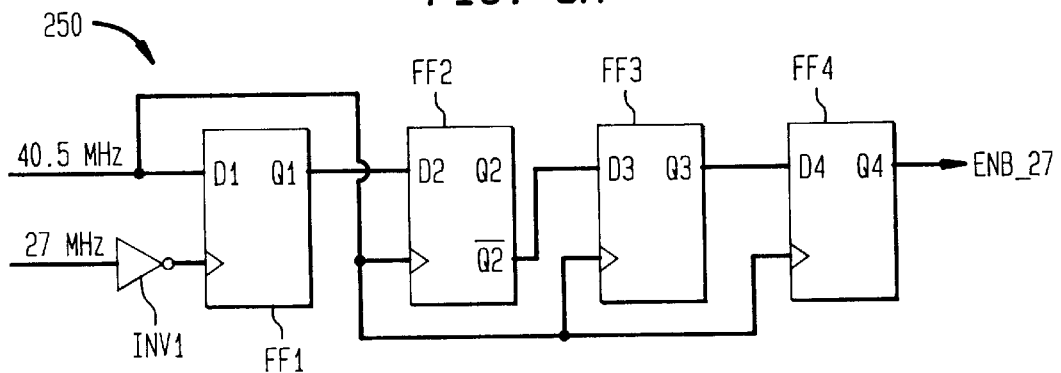
FIG. 5A is a schematic diagram illustrating an exemplary synchronous phase detector in accordance with the present invention and suitable for use in the processing system of FIG. 1.

FIG. 5A is a schematic diagram of a synchronous phase detector 250 in accordance with the invention. The phase detector 250 provides an enable signal which may be used in a pipeline data transfer structure or any other state-based logic circuit to permit different elements of the processing system 10 to utilize first and second clocks which are non-integer multiples of one another. It will be assumed for the purposes of this description that the first clock has a rate R1 of 27 MHz and is utilized by the video decoder 52 and NTSC encoder 64. It will also be assumed that the second clock has a rate 1.5 times that of the first clock, or 40.5 MHz, and is utilized by the ASIC processor 20. It will be appreciated by those skilled in the art that these exemplary clock rates are selected for illustration purposes only, and that the described synchronous phase detector is readily applicable to processing systems utilizing more than two related clocks and/or other combinations of clock rates.

The synchronous phase detector 250 includes a serial arrangement of D-type flip-flops FF1–FF4 arranged as shown on FIG. 5A. The 27 MHz first clock is applied via an inverter INV1 to a clock input of FF1. The 40.5 MHz second clock is applied to a data input D1 of FF1 and to the clock inputs of FF2, FF3 and FF4. The uncomplemented outputs Q1 and Q3 of FF1 and FF3 are applied to the data inputs D2 and D4 of FF2 and FF4, respectively. The complemented output of FF2 is applied to the data input of FF3. The output enable signal ENB_27 is provided at the uncomplemented output Q4 of FF4. As will be described in conjunction with FIGS. 6A and 6B below, this output may be utilized in a multiplexed data transfer pipeline structure to prevent metastability and to provide effective data transfer between processing system elements operating at 27 MHz and elements operating at 40.5 MHz. Alternative embodiments of the synchronous phase detector 250 may eliminate the third and/or fourth flip-flops FF3 and FF4 and provide the enable signal ENB_27 at the complemented output of FF2 or the uncomplemented output of FF3.

Figure 5B:
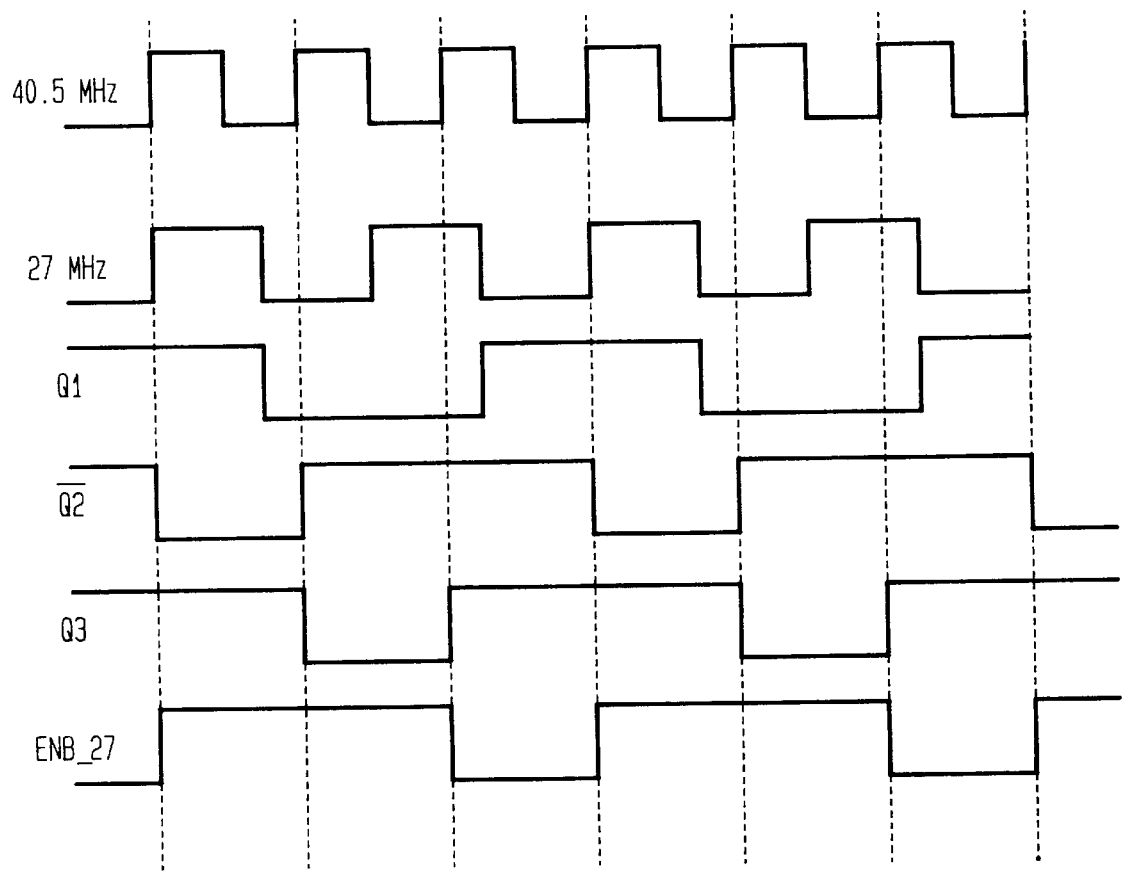
FIG. 5B is a timing diagram illustrating the operation of the clock enable circuit of FIG. 5A.

FIG. 5B is a timing diagram illustrating the manner in which the output enable signal ENB_27 is generated from the input 27 MHz and 40.5 MHz clock signals in the circuit 250. The first D-type flip-flop FF1 will clock on the falling edge of the 27 MHz clock signal shown in FIG. 5B due to the presence of the inverter INV1. At the first falling edge of the 27 MHz clock, the 40.5 MHz clock applied to the data input of FF1 is low, so the Q1 output of FF1 transitions from high to low. Q1 remains low until the next falling edge of the 27 MHz clock, at which time the 40.5 MHz clock is high, so Q1 transitions from low to high. This pattern repeats, such that Q1 has a period twice that of the 27 MHz signal. The second flip-flop FF2 is clocked by the rising edge of the 40.5 MHz clock. At the first rising edge of the 40.5 MHz clock, the complemented Q2B output of FF2 transitions from high to low because the Q1 output of FF1 is high. At the second rising edge of the 40.5 MHz clock, Q2B transitions from low to high because Q1 is low. At the third rising edge of the 40.5 MHz clock, Q1 is still low, so Q2B remains high. The next rising edge of the 40.5 MHz clock causes Q2B to transition from high to low, because Q1 has gone high. This pattern repeats to provide the Q2B signal as shown in FIG. 5B. As noted above, the Q2B signal itself may be used as an enable signal in accordance with the invention. In the exemplary embodiment of FIG. 5A, the Q2B signal is clocked through the two additional flip-flops FF3 and FF4. Each of the flip-flops FF3 and FF4 delay the Q2B signal by one period of the 40.5 MHz clock and thereby serve to align the rising edge of the output enable signal ENB_27 relative to the concurrent rising edges of the 40.5 MHz and 27 MHz clocks.

The synchronous phase detector 250 of FIG. 5A serves to extract the phase information in the 40.5 MHz and 27 MHz clocks such that this information may be utilized to regulate data flow in a pipeline structure or other state-based logic circuit in a manner to be described below.

3.2 Multiple Clock Pipeline Structure

Figure 6A:
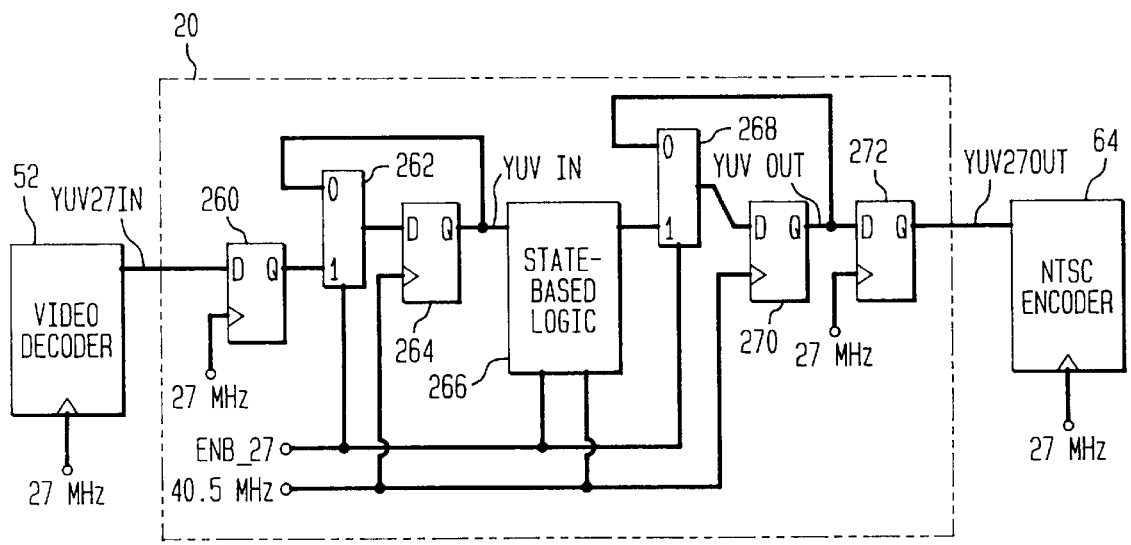
FIG. 6A is a block diagram illustrating a data transfer pipeline utilizing a clock enable signal generated in the synchronous phase detector of FIG. 5A.
Figure 6B:
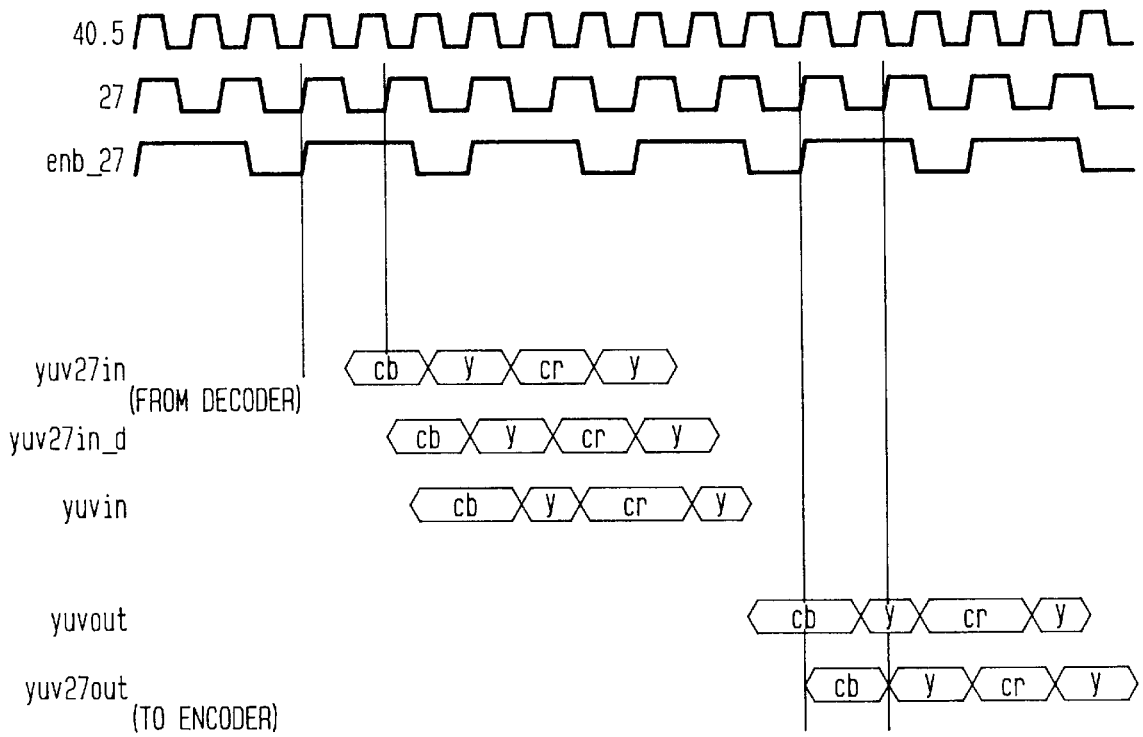
FIG. 6B is a timing diagram illustrating the operation of the data transfer pipeline of FIG. 6A.

FIG. 6A shows a schematic diagram of an exemplary pipeline structure in accordance with the present invention. FIG. 6B is a timing diagram illustrating the relationship between a 40.5 MHz clock, a 27 MHz clock, the above-described enable signal ENB_27 and a number of other signals used in the pipeline structure of FIG. 6B. In this exemplary embodiment, the pipeline structure is implemented within the graphics processor 60 in the ASIC processor 20 of FIG. 1. The video decoder 52 operates at a 27 MHz clock rate and supplies a video signal YUV27IN in a 4:2:2 chrominance format at a rate of 27 MHz to a data input of a D-type flip-flop 260 clocked at 27 MHz. FIG. 6B indicates that the video signal YUV27IN includes alternating luminance (Y) and chrominance (Cr, Cb) bytes as is described in greater detail in conjunction with FIG. 11A below. The uncomplemented output of flip-flop 260 is a delayed version YUV27IN_D of the input signal YUV27IN and is applied to a first input of a multiplexer 262. An output of multiplexer 262 is applied to a data input of another D-type flip-flop 264 which is clocked at 40.5 MHz. The output of the flip-flop 264 is a signal YUVIN shown in FIG. 6B. The signal YUVIN is applied to state-based logic 266 which in this exemplary embodiment operates at the higher 40.5 MHz clock rate. The state-based logic 266 may represent a pipeline logic circuit, a state machine or any other state-based circuitry. For example, the state-based logic 266 may include a graphics overlay portion of the graphics processor 60. The signal YUVIN at the output of flip-flop 264 is also applied to a second input of the multiplexer 262. A select signal input of the multiplexer 262 receives the above-described enable signal ENB_27 generated by the synchronous phase detector 250 of FIG. 5A. The enable signal in conjunction with the multiplexer 262 allows the 27 MHz input signal YUV27IN to be clocked into the state-based logic 266 in an acceptable manner.

The output of the state-based logic 266 is applied to one input of a multiplexer 268 which also receives on a select signal input the enable signal ENB_27. The output of the multiplexer 268 is applied to a data input of a D-type flip-flop 270 which is clocked at 40.5 MHz. The output of the flip-flop 270 is a signal YUVOUT operating at a clock rate of 40.5 MHz and shown in FIG. 6B. This signal is fed back to another input of the multiplexer 268 and also applied to a data input of a D-type flip-flop 272 which is clocked at 27 MHz. The output YUV27OUT from the flip-flop 272 is a 27 MHz combined video and graphics signal which is applied to the NTSC encoder 64. The enable signal in conjunction with the multiplexer 268 ensures that the 40.5 MHz signal supplied from the state-based logic 266 of the graphics processor 60 can be accurately converted to a 27 MHz signal suitable for application to the NTSC encoder 64.

The above-described pipeline structure uses an enable signal containing phase information from two clocks to permit the video decoder 52 and NTSC encoder 64 to operate at one clock rate while the graphics processor operates a higher clock rate. The synchronous phase detector of FIG. 5A and pipeline structure of FIG. 6A are particularly well-suited for use in applications in which one processing system element operates at a rate R1 and a second operates at a rate R2, where R1 and R2 are related in a non-integer manner such as R2=R1(2n+1)/2 for n=1, 2, . . . N. The above illustrative embodiment could be readily adapted to accommodate other types of non-integer relationships. It should be emphasized that the pipeline data structure in FIG. 6A is merely an illustrative embodiment of the invention, and that the disclosed techniques could be applied to data transfer in a variety of alternative types of state machines or other state-based logic.

4. Video Data Encoding

The present invention also provides a video data encoding technique which reduces the amount of memory space required to store digital video. The encoding technique is efficient and cost-effective, and can be implemented using relatively simple hardware. The video data encoding aspects of the invention will be described using a CCIR-601 video data stream.

Figure 7A:
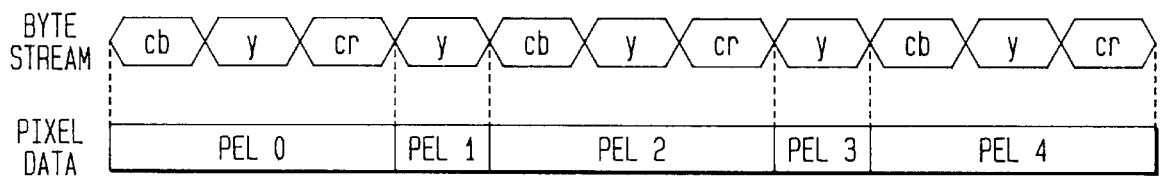
FIG. 7A shows the correspondence between bytes and pels in an exemplary video data stream to be encoded in accordance with a differential encoding technique of the present invention.

FIG. 7A shows a portion of a CCIR-601 encoded byte stream which includes a sequence of 8-bit bytes in which Y represents a one-byte luma sample and Cb and Cr represent one-byte blue and red chroma samples, respectively. Although a luma sample and two chroma samples are required for each pixel to be displayed, the odd luma in the byte stream do not have associated chroma. FIG. 7A shows that each of the even pels 0, 2 and 4 have a luma sample Y and two chroma samples Cr and Cb associated therewith, while the odd pels 1 and 3 have only a luma sample. The chrominance information for the odd pels is recovered from the chroma samples of its surrounding pels using a suitable reconstruction filter. The CCIR-601 standard encodes luma samples Y using the range 10xH to EBxH, and encodes chroma samples Cr, Cb using the range 10xH to F0xH. The CCIR-601 encoded data may occasionally be allowed to exceed the maximum values in these specified ranges, but may never take on the values 00xH or FFxH, both of which are used for in-band signaling of video timing information. It is apparent from FIG. 7A that the average memory storage requirement for a stream of CCIR-601 encoded video data is 16 bits/pel. The present invention in an exemplary embodiment reduces the storage requirement of the video data stream from 16 bits/pel down to only 8 bits/pel. This is accomplished by utilizing four encoding bits rather than eight to encode each of the luma and chroma samples in the video data stream. The four encoding bits specify one of sixteen different codes, which are grouped into absolute codes and delta codes. The present invention achieves this substantial reduction in encoded data through a selective utilization of the above-noted CCIR-601 coding ranges.

A first exemplary embodiment of the video data encoding of the present invention utilizes fourteen of the 4-bit codes, 1xH to ExH, as absolute codes which correspond to CCIR-601 codes 18xH to E8xH as shown in TABLE 1 below:

TABLE 1

| Input Range | Code | Output |
|---|---|---|
| 10-1F | 1 | 18 |
| 20-2F | 2 | 28 |
| 30-3F | 3 | 38 |
| 40-4F | 4 | 48 |

TABLE 1-continued

| Input Range | Code | Output |
|---|---|---|
| 50-5F | 5 | 58 |
| 60-6F | 6 | 68 |
| 70-7F | 7 | 78 |
| 80-8F | 8 | 88 |
| 90-9F | 9 | 98 |
| A0-AF | A | A8 |
| B0-BF | B | B8 |
| C0-CF | C | C8 |
| D0-DF | D | D8 |
| E0-EF | E | E8 |

These absolute codes introduce a maximum encoding error of −8 to +7 relative to the higher resolution CCIR-601 input codes. Since the input data values may occasionally exceed the 10xH to F0xH range, the input is first clipped to the 10xH to EFxH range. That is, all input data values less than 10xH become 10xH, and all values greater than EFxH become EFxH. The absolute codes can then be generated using only the four least significant bits of the input data.

Additional precision is provided in accordance with the invention by using the remaining two of the above-noted sixteen 4-bit codes as delta codes. The first delta code 0xH specifies that the current encoded output value will be generated by adding four to the output value of the last previously-coded component of the same type (Y, Cr or Cb). The second delta code FxH specifies that the current encoded output value will be generated by subtracting four from the output value of the last previously-coded component of the same type. These delta codes may produce an output value which is closer to the input value than that which would be produced using the absolute code. This is particularly true for the many practical applications in which image date tends to change slowly across a given scene. A video data encoder implementing the above-described absolute and delta coding could be configured to select a delta code if the resulting encoding error will be less than or equal to the encoding error of the absolute code.

Consistent encoding may be provided for a given image by using an absolute code rather than a delta code for the first component of each type (Y, Cr, or Cb) on a given scan line. This process may be implemented in a video encoder by resetting the last output value for each type to 00xH at the beginning of each scanline. Since the closest valid CCIR-601 input code is 10xH, the encoding error resulting from using a delta code will be at least +16, which is greater than the maximum encoding error resulting from use of an absolute code. An absolute code would therefore always be used for the first component of each type on a given scan line. Although the average encoding error produced by the absolute codes is on the order of four, the average encoding error produced by the delta codes in a typical image is on the order of two.

This exemplary embodiment of the encoding technique thus effectively provides an extra two bits of encoding range for typical images.

Figure 7B:
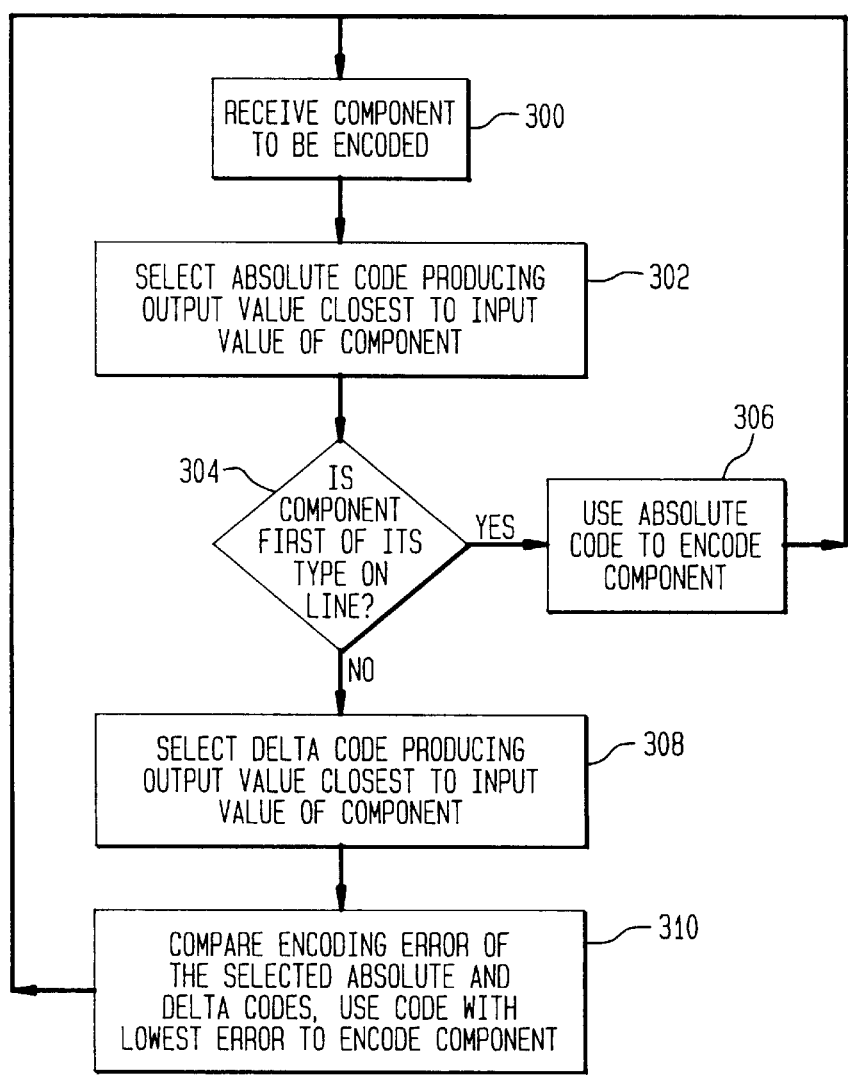
FIG. 7B is a flow diagram illustrating a video date encoding technique in accordance with the invention.

FIG. 7B is a flow diagram illustrating the video data encoding process. In step 300, a luma or chroma component of the input video data stream is received in an encoder. The encoder in step 302 selects the absolute code which produces an output value closest to the input value of the received component. A determination is made in step 304 as to whether the received component is the first of its type in a given scan line of the input video data stream. If the received component is the first component of its type on the scan line, step 306 indicates that the selected absolute code is used to encode the component, and the process then returns to step 300 to receive the next component of the input stream. If the received component is not the first component of its type on the scan line, step 308 indicates that the encoder selects the delta code producing an output value closest to the input value of the component. The encoder in step 310 then compares the encoding error which will result from the use of the selected absolute code and the selected delta code. The encoder then uses the code producing the lowest encoding error to encode the component. The process is repeated for each received component in the input data sequence. The encoded data in the form of a sequence of absolute and delta codes may be stored in DRAM 40, processed in graphics processor 60, or otherwise utilized in the processing system 10 of FIG. 1.

The following example serves to illustrate the above-described video data encoding process. All input values, absolute values, delta values and output values are in hexadecimal format.

```
Component:      Cb Y  Cr Y  Cb Y  Cr Y  Cb Y  Cr Y  Cb Y  Cr Y
Input value:    85 30 73 32 8C 36 75 3F 90 41 71 44 91 47 70 49
Absolute code:  8  3  7  3  8  3  7  3  9  4  7  4  9  4  7  4
Absolute value: 88 38 78 38 88 38 78 38 98 48 78 48 98 48 78 48
Absolute error: −3 −8 −5 −6 +4 −2 −3 +7 −8 −7 −7 −4 −7 −1 −8 +1
Delta Code:     - - - F  0  0  F  0  0  0  F  0  0  0  0  0
Delta value:    - - - 34 8C 38 74 3C 90 40 70 44 94 48 74 4C
Delta error:    - - - −2 +0 −2 +1 +3 +0 +1 +1 +0 −3 −1 −4 +3
Output code:    8  3  7  F  0  0  F  0  0  0  F  0  0  0  0  4
Output value:   88 38 78 34 8C 38 74 3C 90 40 70 44 94 48 74 48
Output error:   −3 −8 −5 −2 +0 −2 +1 +3 +0 +1 +1 +0 −3 −1 −4 +1
```

As noted above, an absolute code is selected as the first code for each component type (Y, Cr, or Cb). The first three output values are therefore the absolute values generated using the absolute codes. For the next twelve input values, the delta codes produce a lower encoding error, and therefore are used to generate the twelve corresponding output values. For example, the second luma sample has an input value of 32xH. The previously-coded luma code was 3xH, corresponding to an output luma value of 38xH. The resulting delta codes are therefore 34xH and 3CxH, of which 34 is the closer to the input value of 32xH. Since the delta code 0 results in less encoding error than the absolute code 3, the second luma sample is encoding using the delta code 0 to produce an output value of 34. For the final input value in the exemplary sequence, the encoding error produced with the absolute code is +1, while the delta code results in an encoding error of +3, so the corresponding output value is generated using the absolute code. In the above example, when an absolute code and a delta code result in the same encoding error, the delta code is selected.

A second exemplary embodiment of the video data encoding of the present invention utilizes eleven of the sixteen 4-bit codes, 3xH to DxH, as absolute codes which correspond to CCIR-601 codes 1CxH to E4xH as shown in TABLE 2 below:

TABLE 2

| Input Range | Code | Output |
|---|---|---|
| 10–25 | 3 | 1C |
| 26–39 | 4 | 30 |
| 3A–4D | 5 | 44 |
| 4E–61 | 6 | 58 |
| 62–75 | 7 | 6C |
| 76–89 | 8 | 80 |

TABLE 2-continued

| Input Range | Code | Output |
|---|---|---|
| 8A–9D | 9 | 94 |
| 9E–B1 | A | A8 |
| B2–C5 | B | BC |
| C6–D9 | C | D0 |
| DA–EF | D | E4 |

These absolute codes introduce a maximum encoding error of −10 to +9 relative to the higher resolution CCIR-601 input codes. As in the first embodiment, the input data values should be clipped to conform to the 10xH to EFxH input range prior to encoding. Additional precision is provided in the second embodiment by using the remaining five 4-bit codes 0xH, 1xH, 2xH, ExH and FxH as delta codes. The delta code 0xH specifies that the current encoded output value will be the same as the output value of the last previously-coded component of the same type (Y, Cr or Cb). The delta codes 1xH and FxH specify that the current encoded output value will be generated by adding two or subtracting two, respectively, to or from the output value of the last previously-coded component of the same type. The delta codes 2xH and ExH specify that the current encoded output value will be generated by adding eight or subtracting eight, respectively, to or from the output value of the last previously-coded component of the same type. As in the first embodiment, a delta code is used when it produces an output value which is closer to the input value than that which would be produced using an absolute code. The use of the "same as previous" delta code 0xH makes the second exemplary embodiment of the video data encoding technique particularly well-suited for use with the many practical video image sequences which include color bars and "solid field" images.

The above-described video data encoding techniques greatly reduce the error resulting from quantization of an encoded image. The amount of memory bandwidth required to store and process the images is significantly reduced by representing each luma and chroma component by four bits rather than eight, while the delta codes provide substantial reductions in encoding error. It will be apparent to those skilled in the art that the above-described encoding techniques may be applied in alternative embodiments using different numbers of input and encoded bits, and different numbers and types of absolute and delta codes. In addition, the encoding techniques may be applied to other types of data, including video data in formats other than the exemplary format shown in FIG. 7A.

5. Single-Buffered Display Capture

Another feature of the present invention is a single-buffered display capture which is particularly well-suited for the implementation of a picture-in-picture (PIP) function for a video display. The single-buffered display capture could be used in the graphics processor 60 of the set top box processing system 10, and in numerous alternative video processing applications.

Figure 8A:
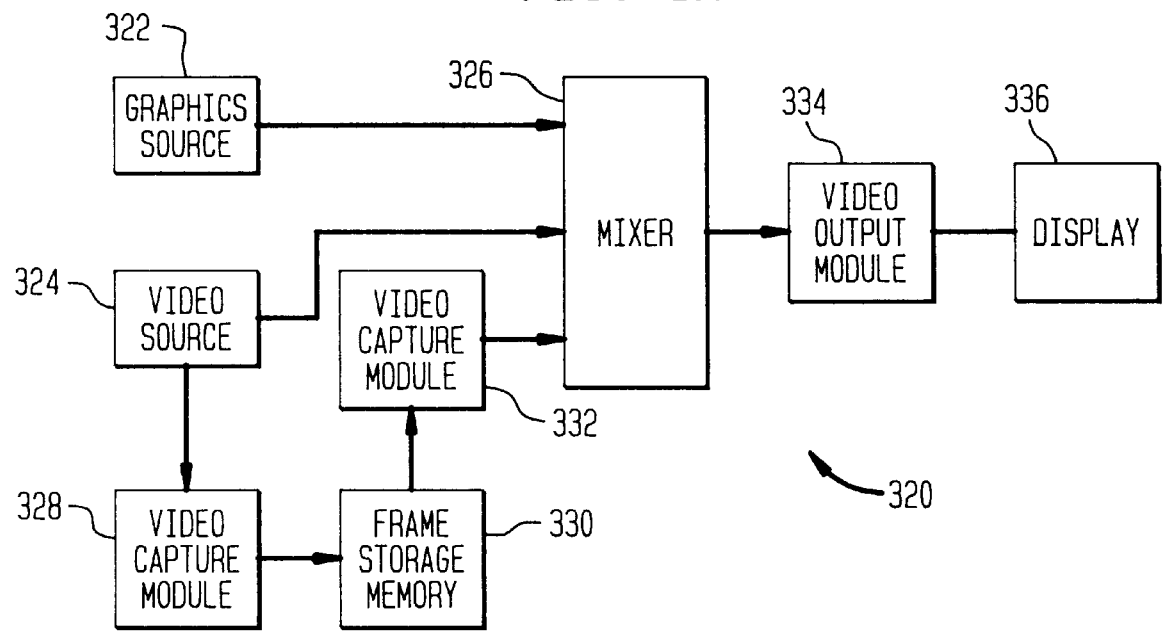
FIGS. 8A and 8B are block diagrams illustrating an exemplary video processing system in which a single-buffered display capture technique may be implemented in accordance with the invention.

FIG. 8A shows an exemplary video processing system 320 in which the single-buffered display capture may be implemented. A graphics source 322 supplies a graphics overlay or other suitable graphics signal to be combined with a video signal from a video source 324. The video signal could be decoded MPEG-2 video from a decoder such as decoder 52 of FIG. 1 or any other type of digitized video signal. The video signal from source 324 is supplied to a mixer 326 which combines the output of the graphics source 322, video source 324 and a video display module 332 into a single combined video output signal for display. The video signal from source 324 is also supplied to a video capture module 328 which captures video frames in real time and decimates the captured frame to a smaller size. The video capture module 328 may also provide other signal processing functions such as compression. A frame storage memory 330 provides temporary storage for video frames captured in the video capture module 328. The video display module 332 reads data from the frame storage memory 330 to thereby construct a repositionable video window within the video display. The mixer 326 combines the original video signal, any graphics overlay and the video window into a combined signal which is supplied to a video output module 334. The video output module 334 converts the digital combined signal into an analog format suitable for use with display 336.

An exemplary application for the system 320 of FIG. 8A is in a digital video set top box processing system such as that shown in FIG. 1. During normal operation, the output of the video source 324 is displayed in full-screen resolution and the video capture module 328 and display module 332 are not used. If a user changes the selected channel to, for example, a pay-per-view channel, the system 320 could configure video capture module 328 and video display module 332 to provide a combined output signal which includes a video window showing a reduced-size image of the pay-per-view channel surrounded by a graphics overlay detailing information about the event. After purchasing the pay-per-view event, the user would receive the full resolution video signal corresponding to the event, and the video capture module 328 and video display module 332 would again be deactivated.

The video display module 332 repositions the video image received from video capture module 328 to an arbitrary position on the display screen. Video data for the display module 332 may therefore need to be available either before or after the video data provided directly from the source 324 through the mixer 326 and output module 334 to the display 336. The frame storage memory 330 buffers the captured video field such that the display module 332 will always have access to the video data required for display. The frame storage memory 330 also serves to allow synchronization between the video signal supplied directly from source 324 and the reduced-size signal supplied from video display module 332.

Figure 8B:
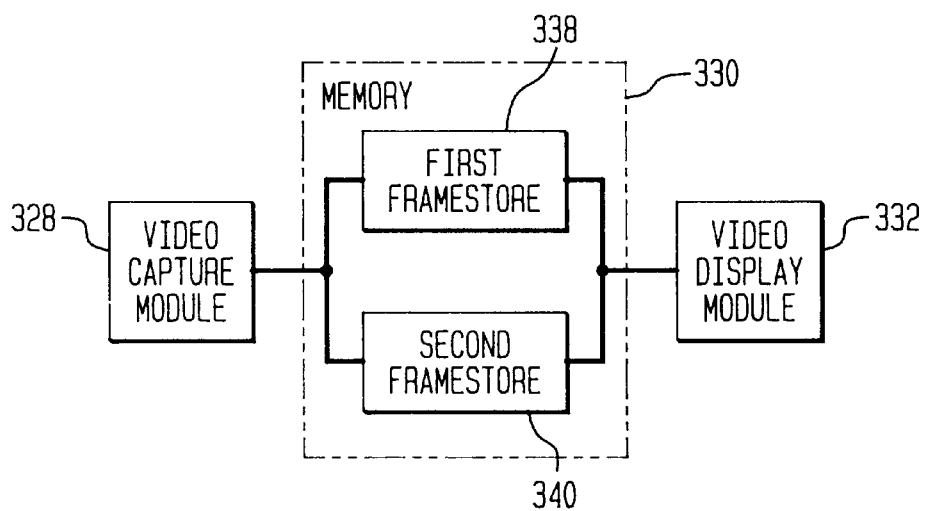

FIG. 8B illustrates a frame storage memory 330 which could be used to implement a conventional double framestore buffering technique. The conventional double buffering technique is designed to eliminate a "tearing" problem which may result if the top portion of the video data output from the display module 332 is from a current frame, while the bottom portion is from a previous frame. The double buffering of FIG. 8B solves this tearing problem by allowing the capture module 328 to store data from a current frame in a first framestore 338 while the display module 332 is displaying data from a previously-captured frame stored in second framestore 340. Although this conventional approach solves the tearing problem, it does so with an undesirable substantial increase in the memory requirements of system 320. The present invention provides a single buffering approach which solves the tearing problem without any increase in the system memory requirements.

The single buffering technique of the present invention takes advantage of the fact that the video frames from source 324 are often interlaced to thereby improve display resolution without increasing the amount of data per frame. For example, NTSC frames each include an even field and an odd field which are interlaced on display. The even field and odd field are delivered sequentially so as to create the appearance of 525 lines delivered at 60 fields per second, when in fact only 262 or 263 lines at 60 fields per second are delivered. The present invention utilizes this interlaced delivery of fields to remove the above-described double buffering requirement without introducing tearing.

The single buffering technique may be implemented as follows. Initially, an odd-numbered vertical decimation factor is selected for use in video capture module 328. In other words, the reduction ratio between the original source image and the captured image is selected from the odd-numbered ratios 1:1, 3:1, 5:1, and so on.

The reason for this is that capturing at an even decimation ratio will only capture a single field of the video frame, since all of the even-numbered display lines are in the even field. Capturing at an even ratio may also introduce temporal artifacts in the displayed video when objects in a given scene move since the display module 328 will be redisplaying the captured even field lines on both the even and odd display fields.

The video capture module 328 and video display module 332 are then configured to capture and display different fields at different times. As noted above, the capture module 328 and display module 332 may operate in synchronization such that the display module 332 directs display of an even field at the same time that the capture module 328 is capturing an even field. In accordance with the present invention, the display module 332 directs the display of a captured odd field during an even field display time, such that the buffering requirements are reduced to a single framestore buffer. This may be accomplished by moving the image from the video display module 332 up a line or down a line during display. For example, in a display with 6 lines per field, with a 3:1 decimation factor in the video capture module 328, a total of four lines per frame will be captured for use in the reduced-size image, with two from each field. During a given even field, even field lines 4 and 10 may be captured by capture module 328, while previously-captured odd field lines 1 and 7 are displayed by display module 332. During a given odd field, odd field lines 1 and 7 are captured and previously-captured even field lines 4 and 10 are displayed. The capture module 328 and display module 332 are thus configured to capture and display, respectively, from different fields at different times.

The single-buffered display capture of the present invention therefore operates such that the lines captured from an even field in accordance with the selected vertical decimation factor are displayed during the subsequent odd field, while the lines captured from an odd field are displayed during the subsequent even field. This field-based allocation between capture and display processes in the video display module 332 ensures that the above-described tearing problem will not occur, and that the memory 330 can be implemented using a single framestore rather than two framestores as in a conventional double buffering technique.

6. Register-Based Process Sharing

The graphics processor 60 in the ASIC processor 20 of FIG. 1 may implement a register-based sharing mechanism which prevents simultaneously-running processes from interfering in their attempts to access graphics acceleration engines or other portions of the graphics processor 60. The graphics processor 60 will generally include one or more hardware-based drawing acceleration engines as well as a graphics driver. An exemplary graphics driver suitable for use with the present invention is the MAUI driver available from Microware, Inc. of Des Moines, Iowa. The MAUI driver and many other graphics drivers will generally allow multiple applications to simultaneously generate and supply graphics data to the drawing acceleration engine. Each application may be configured as a user process, such that a task switch in the acceleration engine could be triggered at any time during a given process by a call directed to the acceleration engine. This may create a problem for the acceleration engine in that the color registers and other internal state information may become corrupted if two or more applications simultaneously attempt to use the acceleration engine. Possible solutions to this problem include making a kernel save and restore the state for any interrupted application, allowing only one application to use the acceleration engine, or using a software semaphore. However, each of these solutions may introduce additional complexities or other undesirable results. The present invention provides an approach based on a hardware semaphore which avoids many of these undesirable results, and will be described in greater detail below.

Figure 9A:
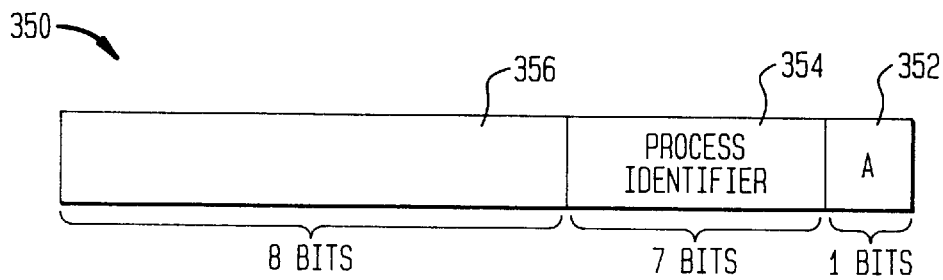
FIG. 9A shows an exemplary register configured to provide a hardware-based drawing acceleration engine sharing function in accordance with the present invention.

FIG. 9A shows an exemplary implementation of a semaphore register 350 used as a hardware semaphore in accordance with the invention. The semaphore register 350 includes an acquire bit portion 356, a process identifier portion 354, and a remaining portion 356. In this example, the register 350 is configured as a 16-bit register, and may be contained within the graphics processor 60, the ASIC processor 20 or elsewhere in the processing system 10 of FIG. 1. The register 350 is used to control the access of multiple processes operating through a graphics driver to a drawing acceleration engine. The acquire bit portion 352 of the semaphore register 350 indicates to other processes that the drawing acceleration engine has been acquired by another process. The process which has acquired the drawing acceleration engine writes its identifier into the process identifier portion 354 of the register 350. Other processes can determine if the drawing acceleration engine has been acquired by simply examining the acquire bit portion of the register 350, and if the engine has not been acquired, may themselves acquire the engine.

Figure 9B:
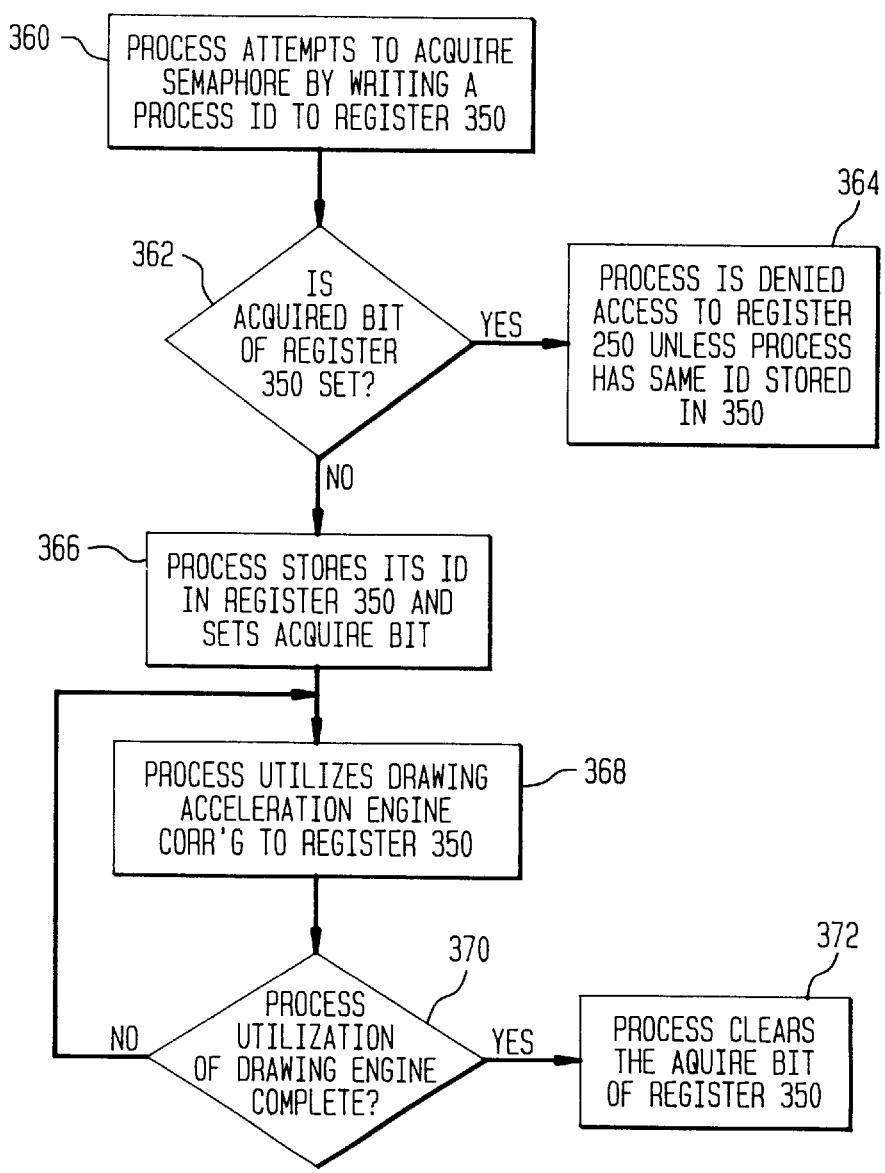
FIG. 9B is a flow diagram illustrating the operation of an exemplary sharing function using the register of FIG. 9A.

FIG. 9B is a flow diagram illustrating the operation of the hardware semaphore feature of the present invention. In step 360, a given process operating through the graphics driver attempts to acquire the semaphore by writing its process identifier to the process identifier portion 354 of the semaphore register 350. Step 362 indicates that before the process is permitted to write to the register 350, a determination is made as to whether or not the acquired bit in the acquired bit portion 352 of the register 350 has been set. If the acquire bit has been set, step 364 indicates that the process is denied access to the drawing acceleration engine and the register 350 unless the process has the same process identifier as that already stored in the process identifier portion 354 of the register 350. If the acquire bit has not been set, the process attempting to acquire the semaphore stores its process identifier in the process identifier portion 354 of register 350, and is then permitted to utilize the drawing acceleration engine to the exclusion of other processes. In step 370, a determination is made as to whether the process has completed its use of the drawing acceleration engine. If the process has not completed its use of the engine, the process returns to step 368 and continues to use the engine. If the process has completed its use of the engine, the process clears the acquire bit in portion 352 of register 350, as shown in step 372. The cleared acquire bit indicates to other processes that the engine is now available to them. Although the hardware semaphore of the present invention has been illustrated in conjunction with controlling the access of graphics processes to a drawing engine, it should be emphasized that this is by way of illustration and not limitation. The hardware semaphore may be utilized in other applications in which it is desirable to control the access of one or more processes to a state-sensitive device. These alternative applications include hardware acceleration circuitry for cyclic redundancy code (CRC) calculation, or any other type of shared processing resource.

7. Memory Arbitration

The present invention provides memory arbitration techniques which allow multiple processes to share a common memory device or devices. In the exemplary processing system of FIG. 1, the memory arbitration techniques permit a number of graphics, communication and other processes operating within ASIC processor 20 to share the DRAM 40. This memory arbitration eliminates the requirement for separate memory devices in multiple processing elements, and thus permits a more efficient and cost-effective processing system implementation. Although illustrated below in conjunction with multiple system processes sharing a single memory device, it will be readily apparent that the disclosed techniques are also applicable to multiple processes sharing multiple memory devices.

The processes accessing a given memory device are referred to in the following description as requestors. Each requestor may have different memory bandwidth and latency requirements. A list of possible requestors in the processing system 10 of FIG. 1 include the following:

1) Directly-Mapped CPU Memory (CPU)
2) MPEG-2 Transport Stream Demultiplexed Video Buffer (VQM)
3) MPEG-2 Transport Stream Demultiplexed Audio Buffer (AQM)
4) MPEG-2 Transport Stream Demultiplexed Input Queue (IQM)
5) Graphics Overlay
6) PCM Audio
7) DRAM Refresh
8) ATM SAR Receive Cell Buffer
9) ATM SAR Transmit Cell Buffer
10) Smart Card Message Buffer
11) Video Capture Buffer
12) Picture in Graphics (PIG)

Each of these requestors may be permitted to utilize portions of the DRAM 40 in accordance with an arbitration technique. In one possible embodiment, an arbitration technique is provided which assigns a priority to each of the various requestors. The priorities may be assigned in the following order:

1) Graphics Overlay
2) Picture in Graphics (PIG)
3) MPEG-2 Transport Stream Demultiplexed Input Queue (IQM)
4) Video Capture Buffer
5) Directly Mapped CPU Memory (CPU)
6) MPEG-2 Transport Stream Demultiplexed Video Buffer (VQM)
7) DRAM Refresh
8) PCM Audio
9) MPEG-2 Transport Stream Demultiplexed Audio Buffer (AQM)
10) Smart Card Message Buffer
11) ATM SAR Receive Cell Buffer
12) ATM SAR Transmit Cell Buffer The arbitration technique is implemented in the DRAM controller 42 of ASIC processor 20 in this exemplary embodiment, but could be provided using other elements of processing system 10 in other embodiments. The DRAM controller 42 receives requests for memory bandwidth from the above-noted requestors, and allocates the memory in accordance with the established priority. The ATM SAR receive and transmit cell buffers are assigned the lowest priority because the cell buffers are relatively deep and therefore the SAR memory accesses may be held off for a longer period of time without overflowing the buffers.

TABLE 3 below illustrates a maximum allowable latency and a maximum actual latency for each of the above-noted requestors in an exemplary implementation of the memory arbitration technique of the present invention.

TABLE 3

| Requestor | Bandwidth | Maximum Allowable Latency (40.5 MHz clock cycles) | Max. Actual Latency |
|---|---|---|---|
| Graphics Overlay | 108 Mbit/s | 48 | 24 |
| PIG | 108 Mbit/s | 48 | 36 |
| IQM | 60 Mbit/s or 44 Mbit/s | 64 | 48 |
| Video Capture | 54 Mbit/s | 96 | 60 |
| CPU | — | 192 | 96 |
| VQM | 16 Mbit/s | 256 | 106 |
| DRAM Refresh | (1/512 clock cycles) | 510 | 192 |
| PCM Audio | 768 Kbit/s | 840 | 242 |
| AQM | 768 Kbit/s | 840 | 314 |
| Smart Card | (1/1408 clock cycles) | 1406 | 398 |
| ATM | 16 Mbit/s | 1000 | 442 |

A number of exceptions to the established priority may be provided. For example, if the MPEG-2 transport stream input queue is granted access and other lower-priority requestors are also requesting access, one of the lower-priority requestors may be granted a first memory access cycle before the transport stream input queue is granted a second memory access cycle. Another possible exception could specify that if the directly-mapped CPU memory is granted an access and other lower-priority requestors are also requesting access, one of the lower-priority requestors is granted a first memory access cycle before the directly-mapped CPU memory is granted a second memory access cycle. As another example, if an ATM transmit cell buffer request is received while an ATM receive cell buffer request has been granted access, the transmit request is guaranteed to receive the next access available for ATM.

The memory arbitration features of the present invention provide acceptable latencies for each of the requestors, while providing high bandwidth for the direct memory mapping operations of CPU 30, the input queue of MPEG-2 transport stream demultiplexer 50 and the video capture and graphics overlay operations of graphics processor 60. For example, with all requestors operating, the CPU 30 may still receive on the order of half of the available memory bandwidth. Although the CPU memory accesses experience a higher latency as a result of collisions with the demux, video and graphics accesses, the overall throughput for all requestors can be maintained within an acceptable range.

8. ATM Segmentation and Reassembly (SAR)
8.1 General Description

As noted above, the ASIC processor 20 of FIG. 1 includes an asynchronous transfer mode (ATM) segmentation and reassembly (SAR) device 90 for providing an interface to an ATM network. ATM networks are generally designed to support high-speed, low-delay multiplexing and switching of voice, data, video and other types of user information traffic. An ATM network processes user traffic in fixed-length cells of 53 bytes. A 5-byte header in each cell typically includes a virtual channel identifier (VCI) and a virtual path identifier (VPI) associated with the corresponding cell. The VCI and VPI fields together identify a virtual circuit (VC) which is established when a user requests a network connection in an ATM system. Additional details regarding these and other aspects of ATM systems can be found in the ATM Forum, "ATM User-Network Interface Specification," Version 3.1, September, 1994, and in Martin de Prycker, "Asynchronous Transfer Mode: Solution for Broadband ISDN," Ellis Horwood, New York, 1993, both of which are incorporated by reference herein.

The ATM SAR 90 in the ASIC processor 20 of FIG. 1 is configured in this exemplary embodiment to perform ATM adaptation layer 5 (AAL5) segmentation and reassembly. A general description of conventional segmentation and reassembly operations for AAL5 can be found in the above-cited ATM Forum and M. de Prycker references. The reassembly operations may include filtering a received ATM cell stream, sorting the cells by virtual circuit, accumulating cells until an entire AAL5 frame is received, checking the AAL5 trailer fields, stripping the trailer fields and other AAL5 encapsulation and passing the data to upper protocol layers. The segmentation operations performed in the ATM SAR 90 may include converting a variable-length payload into an AAL5 frame, generating a 32-bit cumulative cyclic redundancy code (CRC) over the entire AAL5 frame, and providing flow control by interleaving cells for one virtual circuit with the cells of others to thereby utilize a fixed percentage of the overall ATM bandwidth. The ATM SAR 90 uses a combination of hardware and software to provide these and other functions for multiple virtual circuits. Conventional ATM SARs generally use a primarily hardware-based approach which keeps running counts of the receive and transmit CRCs for each channel and therefore require relatively large amounts of on-chip memory. An ATM SAR in accordance with the present invention provides improved performance with a reduced amount of memory in part by utilizing software to direct available hardware resources more efficiently.

The ATM SAR 90 is particularly well-suited for use with fixed-size kernel data structures aligned to power of two boundaries. One such kernel data structure is referred to as an MBUF. The MBUF data structure is often utilized in UNIX-like operating systems such as the OS-9 operating system available from Microware, Inc. of Des Moines, Iowa. A given MBUF corresponds generally to a fixed-size area of memory and includes both a header and a data portion. For example, the MBUFs utilized in conjunction with the OS-9 operating system are each 64 bytes in length, with a 16-byte header and a 48-byte data portion. FIG. 12A illustrates a number of exemplary MBUFs. The MBUF headers contain information which allow the MBUFs to be grouped together into larger data structures or packets. This information includes an identifier of the MBUF type. The MBUF type specifies whether the MBUF is unused, or contains a particular type of data such as network data, a network header, a network trailer or the like. Other header information includes the number of bytes of valid data in the MBUF, an offset indicating where the valid data begins in the data portion, a pointer indicating where the next MBUF with data associated with the corresponding packet can be found, and a pointer indicating where the first MBUF of the next packet can be found.

Software running on the CPU 30 of the processing system 10 can utilize this MBUF header information to process packets in the form of a chain of MBUFs. The software can add and delete network headers and trailers on packets as the packets are processed by various software layers. To add a network header, the software need only append an MBUF with a data portion containing the network header to the start of an MBUF chain. To delete a network header, the software need only adjust the value of an offset in the MBUF which contains the network header. An advantage of using a fixed-size kernel data structure such as the MBUF is that the number of memory read and write operations required to process a given packet are considerably reduced. Different network protocol layers can pass MBUF chains and modify data by manipulating only the above-described offsets and pointers in the MBUF headers. The ATM SAR of the present invention takes advantage of these and other similar features of MBUF data structures to facilitate processing. For example, a reassembly operation may involve arranging the data received on a given virtual circuit into an MBUF chain and placing the MBUF chain into a receive queue for an upper protocol layer to parse. As will be described in greater detail below, the cell buffers used to receive and transmit ATM cells may be configured in accordance with the MBUF data structure or another similar data structure with the above-described pointer and chaining features.

Figure 10:
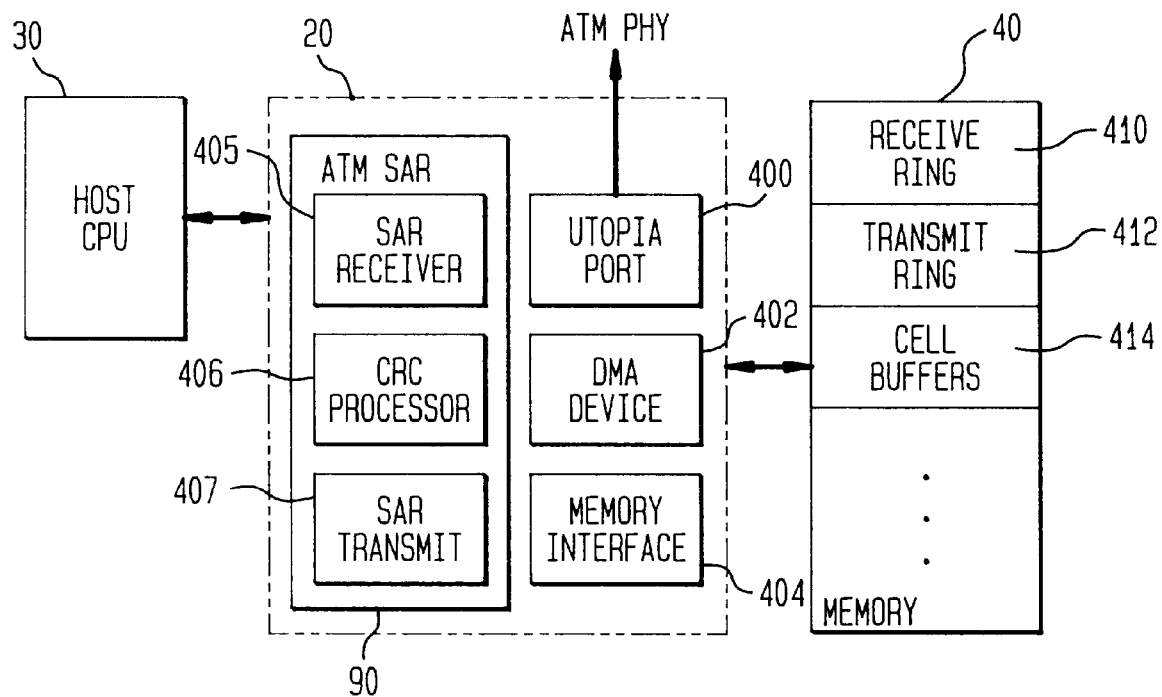
FIG. 10 is a block diagram illustrating an exemplary system suitable for implementing asynchronous transfer mode (ATM) segmentation and reassembly (SAR) functions in accordance with the invention.
Figure 13:
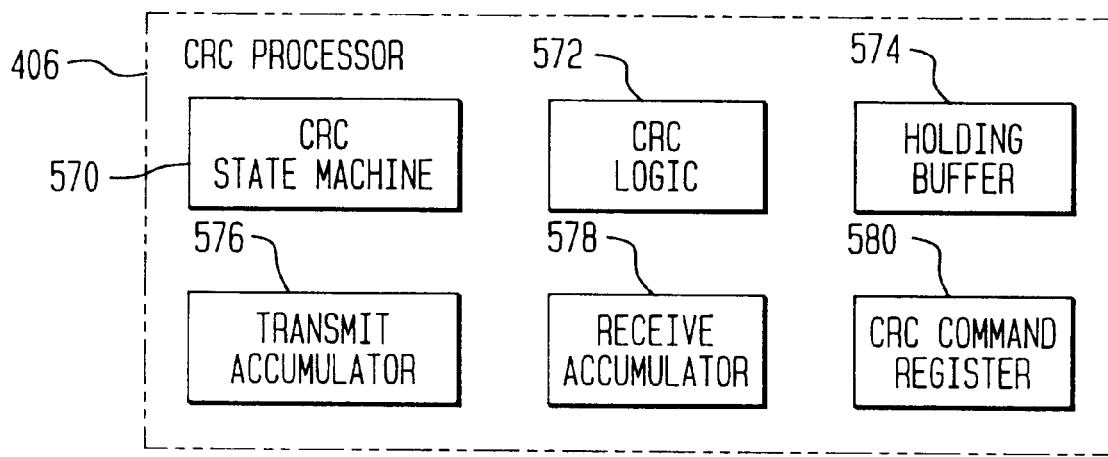
FIG. 13 is a block diagram of a CRC processor suitable for use in ATM segmentation and reassembly operations.

FIG. 10 is a block diagram illustrating various features of an ATM SAR in accordance with the invention. The ASIC processor 20 of FIG. 1 is shown in this example as including a UTOPIA port 400, a direct memory access (DMA) device 402, and a memory interface 404. The UTOPIA port 400 provides a standard interface to an ATM physical (PHY) layer device such as a synchronous optical network (SONET) receiver or transmitter, and is described in greater detail in the above-cited ATM Forum reference. The UTOPIA port in this embodiment is configured to clock cell data at a rate of 20.25 MHz, although other data rates could of course be used. The DMA device 402 and memory interface 404 are controlled in accordance with instructions executed by the CPU 30, and provide for transfer of data to and from the DRAM 40 in a manner to be described in greater detail below. The ATM SAR device 90 in the ASIC processor 20 includes a SAR receiver 405, a CRC processor 406 and a SAR transmitter 407. The SAR receiver 405 and SAR transmitter 407 are shown in greater detail in FIGS. 11A and 14A, respectively. The CRC processor 406 is illustrated in FIG. 13 and serves to process receive and transmit CRC information in a manner to be described in greater detail below. The DRAM 40 in this exemplary embodiment is shown as including a receive ring portion 410, a transmit ring portion 412 and a cell buffer portion 414. The receive ring portion 410 is used to store an array of pointers which specify addresses in the cell buffer portion 414 in which received ATM cells will be stored. The transmit ring portion 412 is used to store an array of pointers which specify addresses in the cell buffer portion 414 of ATM cells to be transmitted. The cell buffers may each be configured as 64-byte MBUFs in accordance with the above-described MBUF data structure. Each cell buffer thus corresponds to a single MBUF and includes the above-described header and data portion. The pointers stored in the receive ring portion 410 and the transmit ring portion 412 therefore correspond to the above-described MBUF header pointers and may be used to chain together ATM cells for a given virtual circuit in a manner to be described in greater detail below.

8.2 Reassembly

Figure 11A:
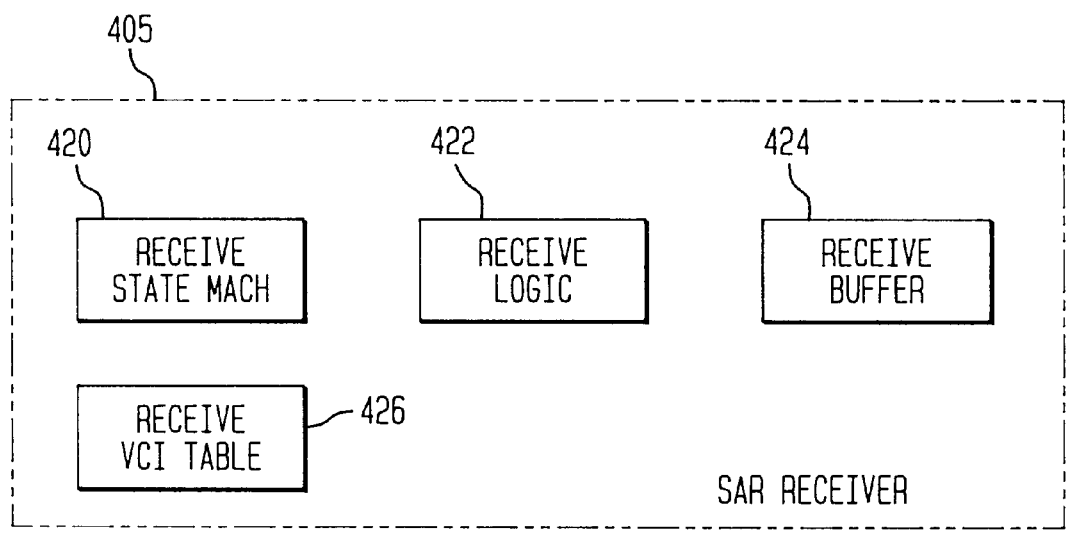
FIG. 11A is a block diagram of an exemplary SAR receiver in accordance with the present invention.

FIG. 11A shows an exemplary SAR receiver 405 in accordance with the invention. The receiver 405 includes a receive state machine 420, receive logic 422 and a receive buffer 424. The receive buffer 424 holds ATM cell data received from the UTOPIA port 400 until it can be processed in the receiver 405. The buffer 424 may be implemented as an 8×16 single-ported RAM in order to provide sufficient buffering for a 16-byte burst data transfer. The state machine 420 and logic 422 operate in conjunction with host CPU 30 and ASIC processor 20 to provide receive functions which are illustrated in the flow diagrams of FIGS. 11B and 11D below.

The receiver 405 further includes a receive VCI look-up table 426 which may be implemented as a 16×16 RAM. The receive VCI table 426 contains information identifying the particular VCIs which are supported by the receiver 405. The receiver 405 accepts and processes a given incoming cell if that cell has a VCI which is found within the look-up table 426. The contents of the look-up table can be updated by software operating on host CPU 30. The table 426 may be stored in DRAM 40 or elsewhere within the processor 20. The receiver 405 may operate at a clock rate on the order of 20.25 MHz.

Figure 11B:
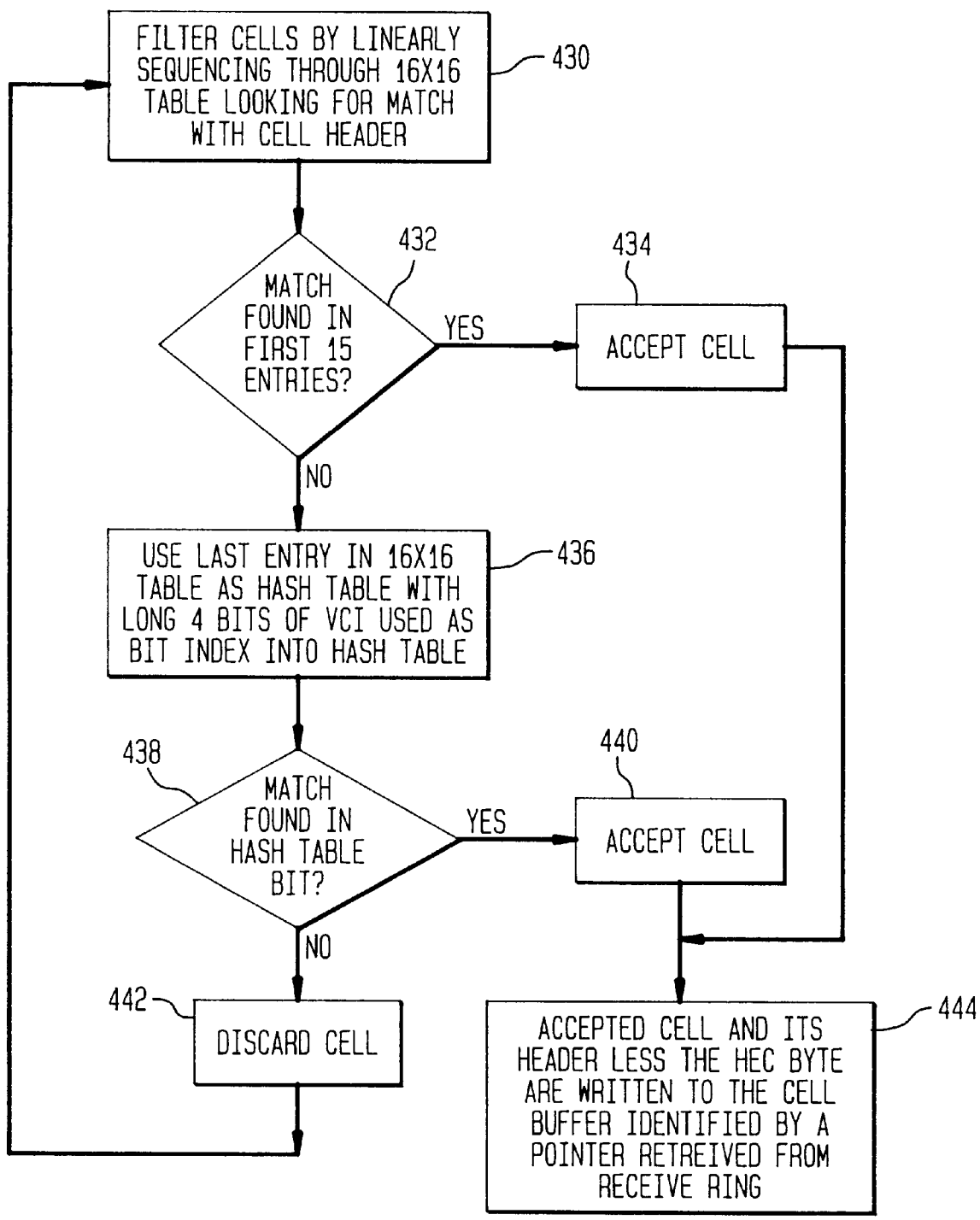
FIG. 11B is a flow diagram illustrating the input filtering and storage functions performed in an ATM reassembly operation.

FIG. 11B is a flow diagram illustrating a portion of an exemplary reassembly operation in accordance with the invention. A stream of ATM cells is received in the processor 20 via the UTOPIA port 400 in a conventional manner. The cells are then filtered using the look-up table 426 of SAR receiver 405. As noted above, the look-up table 426 in this exemplary embodiment is a 16×16 table which stores the VCIs for the cells to be accepted. In step 430, the processor 20 linearly sequences through the 16×16 table 426 looking for a match between a VCI in an incoming cell header and one of the VCIs previously stored in the first 15 entries of the 16×16 table. Entry 16 of the 16×16 table itself serves as a hash table in which each bit of the entry indicates whether or not a particular VCI is to be accepted in the receiver 405 of processor 20. Although the entire VCI is compared for a match in this embodiment, alternative embodiments may utilize a subset of the VCI bits, such as the 10 least significant VCI bits, or may utilize the VPI in conjunction with all or a portion of the VCI.

In step 432, a determination is made as to whether a match has been found between the incoming ATM cell header and one of the VCIs stored in the first 15 entries of the 16×16 look-up table 426. If a match is found, the corresponding cell is accepted as shown in step 434. If a match is not found, entry 16 is used as a hash table with the low four bits of the incoming cell VCI serving as a bit index into the hash table. The value of the bit in the hash table position indicated by the low four bits of the incoming cell VCI will then determine whether or not the cell will be accepted. For example, if the incoming cell has a VCI in which the low four bits are "1010", the receiver 405 in processor 20 will examine bit position 11 in the entry 16 hash table, and will indicate a match if that bit is a logic "1", or no match if that bit is a logic "0". If a match is found between a portion of an incoming cell VCI and a hash table bit, the cell is accepted as indicated by steps 438 and 440. This hash table arrangement allows the receiver 405 of processor 20 to simultaneously service more than 16 different virtual circuits using minimal hardware. Software running on CPU 30 may be utilized to provide additional filtering of the cells matched using the hash table. The software may also be configured to alter the look-up table 426 so as to move virtual circuits between the first fifteen entries and the hash table in the event that collisions are detected. If there is no match found between an incoming cell VCI and one of the first 15 entries of the 16×16 table or one of the hash table bits, the cell is discarded as shown in step 442. If the cell is accepted in step 434 or 440, the cell is written to a designated 64-byte MBUF cell buffer in the cell buffer portion 414 of the DRAM 40 as indicated in step 444. A header error control (HEC) byte is removed from the 53-byte accepted cell, and the remaining 52-byte portion of the cell is written to the designated cell buffer. The address of the cell buffer in which the accepted cell is stored is determined by a pointer which the receiver 405 retrieves from the receive ring portion 410 of the DRAM 40. As noted above, the cell buffers may be configured to include a header and a data portion in accordance with the above described MBUF data structure format.

Figure 11C:
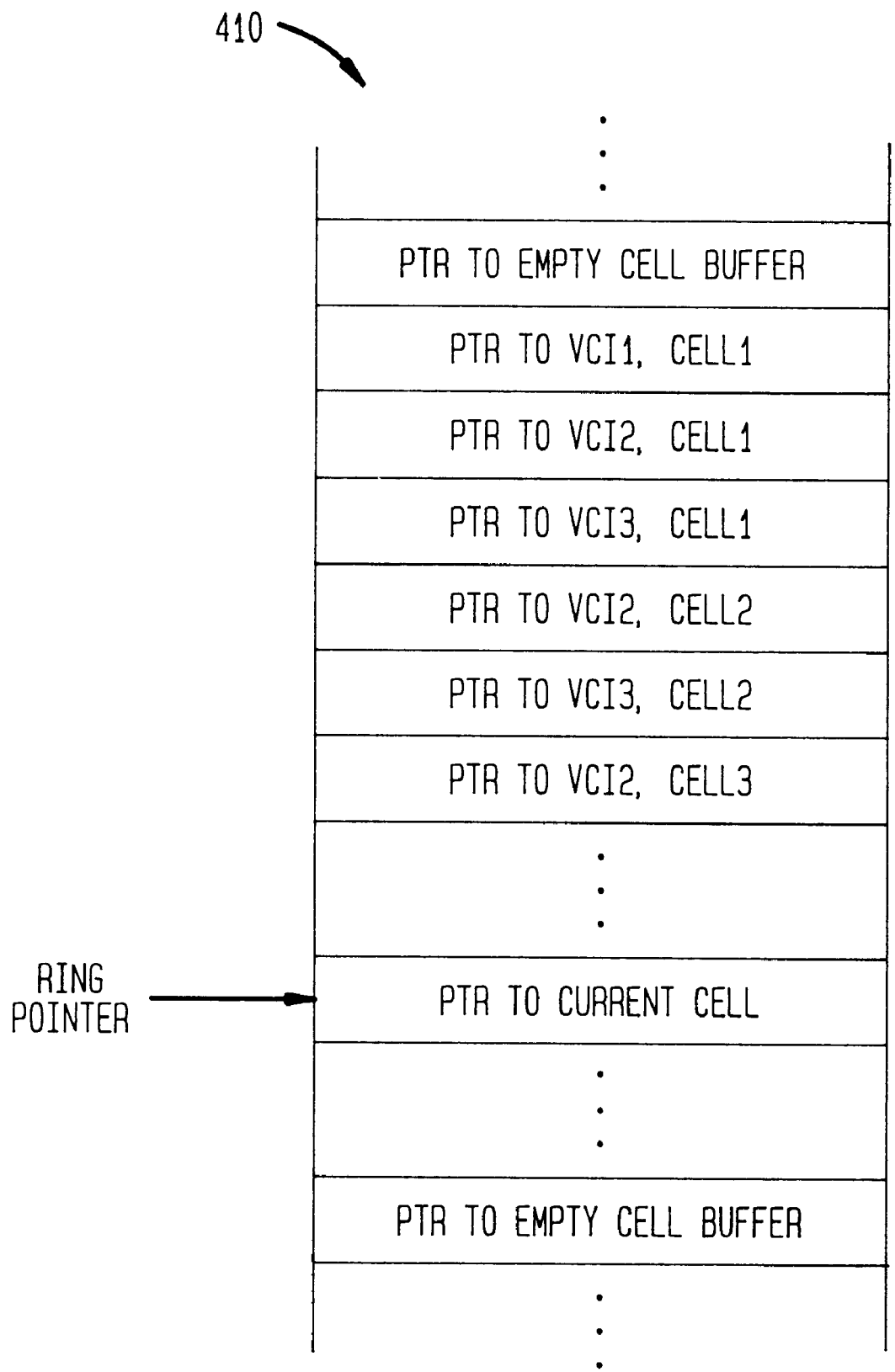
FIG. 11C shows an exemplary receive ring portion of memory suitable for use in an ATM reassembly operation.

FIG. 11C illustrates an exemplary receive ring 410 in accordance with the invention. The receive ring 410 in this example is configured as an array of pointers.

The size of the receive ring may be on the order of four DRAM pages, or 4096 bytes, such that it can include up to 1024 32-bit pointers and can support up to 48K of received cell data. As noted above, each pointer identifies a particular cell buffer in the cell buffer portion 414 of the DRAM 40. Each pointer also indicates whether an incoming cell has been stored in the corresponding buffer, and if a cell has been stored in the buffer, the pointer specifies the VCI and/or other identifying information for that cell. In operation, the receiver 405 in the ASIC processor 20 retrieves a receive ring entry including a pointer to a free cell buffer, waits for an incoming cell to be received and accepted in the manner described in steps 430–444 of FIG. 11B, and stores the accepted cell in the cell buffer indicated by the retrieved receive ring pointer as shown in step 444 of FIG. 11B. The receiver 405 then retrieves the next available pointer from the receive ring. The exemplary receive ring of FIG. 11C is shown after a number of incoming ATM cells have been accepted and stored. The ring includes pointers to various cells for three virtual circuits identified as VCI1, VCI2 and VCI3. The receive ring also includes a number of pointers to empty cell buffers, as well as a pointer to a cell buffer in which a currently-received cell will be stored. The ring pointer shown to the left of the receive ring 410 in FIG. 11C identifies the current receive ring entry being accessed by the receiver 405.

The receive ring 410 may be initialized using software running on host CPU 30. For example, software can be used to allocate a number of cell buffers for a block of incoming ATM cell data and to store pointers to the allocated buffers in the receive ring. The software is also configured to periodically step through the receive ring to determine, for example, if any cells accepted via the above-described hash table collide with other cells having confirmed valid VCI values. The software may also utilize the pointers for cells having a given VCI to form a chain of cells for that VCI.

As noted above, the cell buffers may utilize an MBUF data structure. The software can therefore use the above-described MBUF pointers to form a chain of cell buffers for a given VCI. The software may be used to provide the ring pointer function as shown in FIG. 11C which serves to identify the pointer which will be used for the currently-received cell. The software may also utilize a number of interrupt bits to monitor the status of the receive ring. For example, a receive ring warning (RRW) flag and a receive ring limit (RRL) flag may be used. The RRW flag can provide an indication to the software that the receive ring is running out of pointers to empty cell buffers. The RRL flag can provide an indication that the receive ring has actually run out of pointers to empty cell buffers, and can be used to automatically disable the further receipt of additional ATM cells. The software can also be used to cause an interrupt to be flagged on the receipt of a cell including a header in which the AAL5 end-of-frame bit is set, or on receipt of any other particular type of cell. If a cell with a set AAL5 end-of-frame bit is received, the processor 20 and CPU 30 are thereby made aware that a full AAL5 frame has been received for a given virtual circuit, such that frame-level processing may then be performed for that virtual circuit.

Figure 11D:
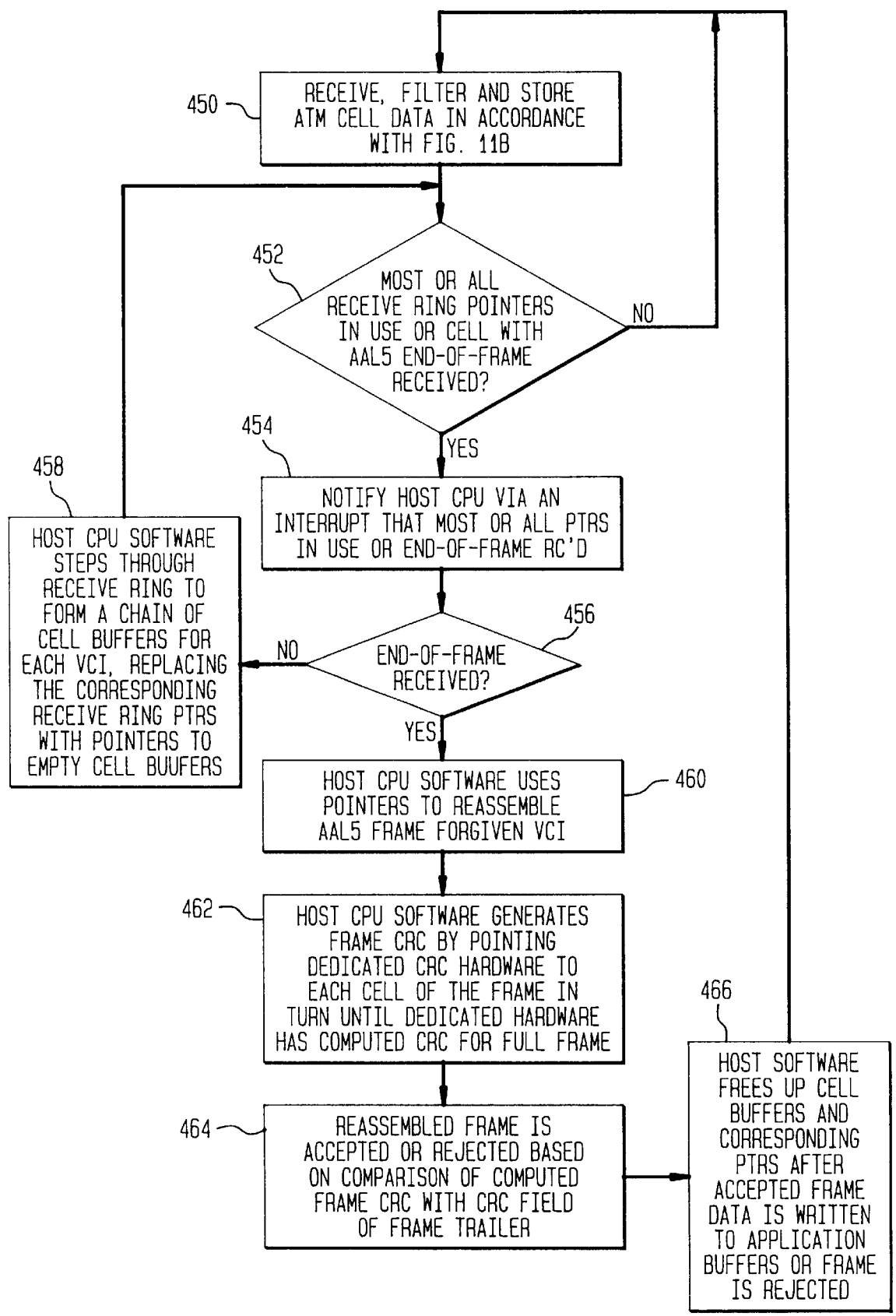
FIG. 11D is a flow diagram illustrating the cyclic redundancy code (CRC) calculation and AAL5 framing functions of an ATM reassembly operation.

FIG. 11D illustrates processing operations performed in the processor 20 and CPU 30 during ATM reassembly. Step 450 indicates that ATM cell data is received, filtered and stored in the manner illustrated in conjunction with FIG. 11B. If most or all pointers in the receive ring are already in use, or if a cell including a set AAL5 end-of-frame bit is received, steps 452 and 454 indicate that an interrupt is provided to the host CPU 30. For example, the above-described RRW or RRL flags may be used to provide the indication to the CPU 30 that most or all receive ring pointers are in use. A similar interrupt may be triggered upon receipt of a cell with the end-of-frame bit set. If none of these conditions is met, there is an adequate supply of available receive ring pointers, and the process returns to step 450 to continue to receive, filter and store ATM cell data using the receive ring pointers in the manner previously described. If a set end-of-frame bit has not been received but most or all receive ring pointers are in use, steps 456 and 458 indicate that the host CPU software should service the receive ring to prevent an overflow condition. The host CPU software services the receive ring by stepping through the ring to form a chain of occupied cell buffers for each of the virtual circuits supported by the receiver. As will be described in conjunction with FIGS. 12A–12H below, each of the chains includes a list header identifying the virtual circuit, and any pointers to cell buffers in a given VCI chain can then be removed from the receive ring. This frees up space in the receive ring for new pointers which identify empty cell buffers. As part of the receive ring servicing operation, the host CPU software replaces any pointers which are placed into a VCI chain with new pointers from a freelist of empty cell buffers. It should be noted that this receive ring servicing operation may be performed upon receipt of a set RRW or RRL flag, after receipt of a particular number of cells, or at a predetermined time after the last receive ring servicing operation. The servicing operation replenishes the supply of available receive ring pointers, and the process of FIG. 11D then returns to step 452 to receive, filter and store additional received cells.

The receipt of a cell with a set end-of-frame bit indicates to the host CPU software in step 460 that an AAL5 frame can now be reassembled for the given VCI for which the set end-of-frame bit was received. The frame reassembly in step 460 involves stepping through the receive ring to link the pointers for the given VCI into a chain of cell buffers which hold the received cells for that VCI. A partial chain of cell buffers may already exist for the given VCI as a result of a prior receive ring servicing operation performed in step 458. The pointers for the given VCI are therefore either linked into an existing chain for that VCI or formed into a first chain for that VCI if there is no existing chain for that VCI. As noted above, the chain for a given VCI is identified by a distinct list header, and any pointers which are placed into the chain may be subsequently removed from the receive ring and replaced with new pointers.

The host CPU software in conjunction with CRC processor 406 performs a CRC computation to determine if the frame should be accepted or rejected. Step 462 indicates that the CRC computation involves the host CPU software stepping through the corresponding VCI cell buffer chain and pointing the dedicated hardware of the CRC processor 406 to each cell of the frame in turn until the processor 406 has computed the CRC for the full frame. The resulting computed frame CRC is then compared to the CRC field of the AAL5 trailer at the end of the last cell in the frame as indicated in step 464. Other criteria for frame acceptance may also be used. For example, the length field of the frame trailer could be checked to determine if any cells were dropped. If the computed frame CRC matches the CRC field of the trailer, and any other frame acceptance criteria are met, the frame is accepted. The trailer of the accepted frame is then removed, and the frame is passed to upper protocol layers associated with host CPU 30 or other portions of processing system 10 for additional processing. After or during the upper layer processing, the accepted frame data may be written to application buffers. The host CPU software can then free up the cell buffers and corresponding pointers for use with subsequently-received cells, as shown in step 466. If the computed frame CRC does not match the CRC field, or any other frame acceptance criteria are not met, step 464 indicates that the frame may be rejected. The host CPU software can then immediately free up the cell buffers and corresponding pointers of the rejected frame, as shown in step 466.

Figure 12D:
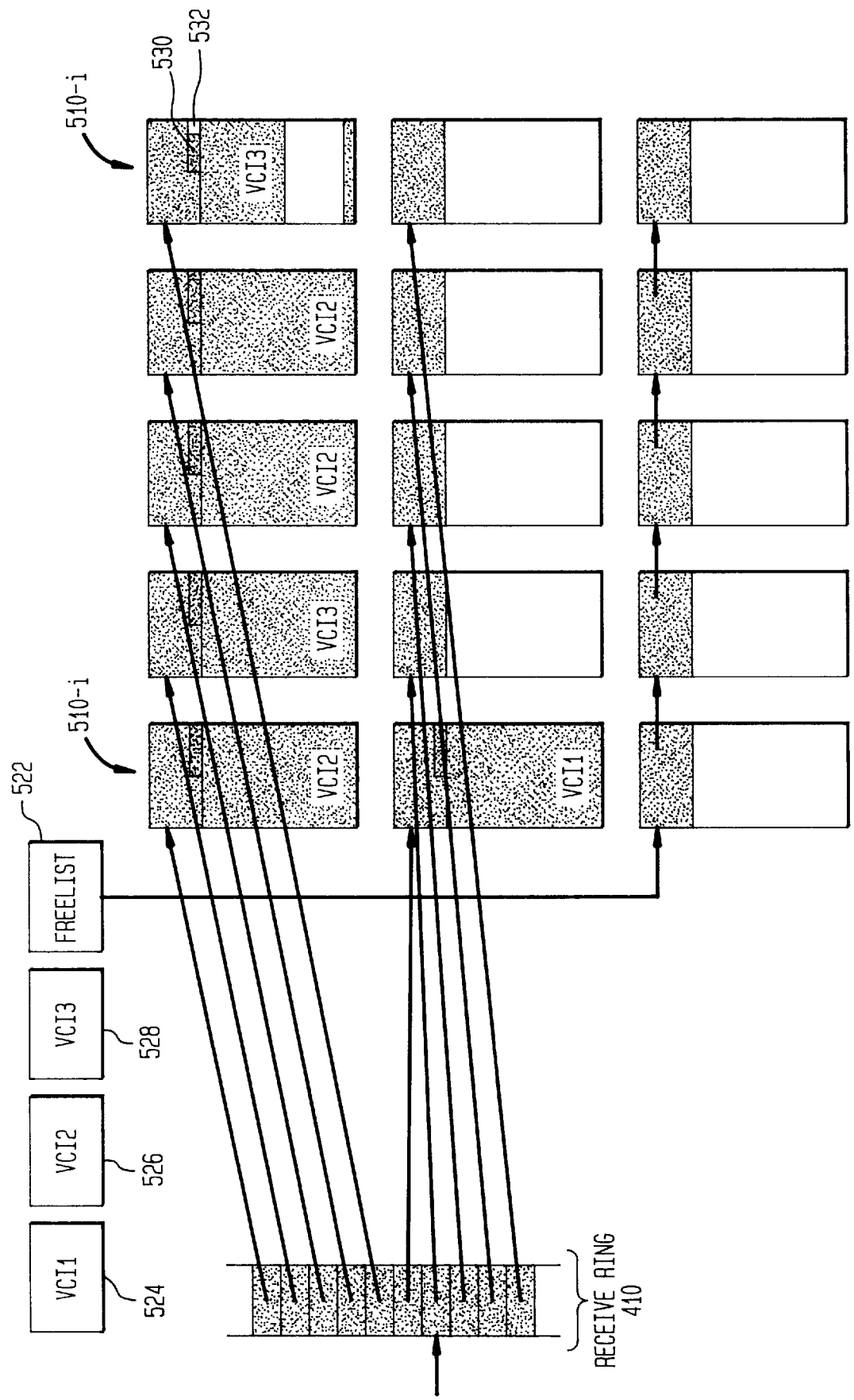
Figure 12F:
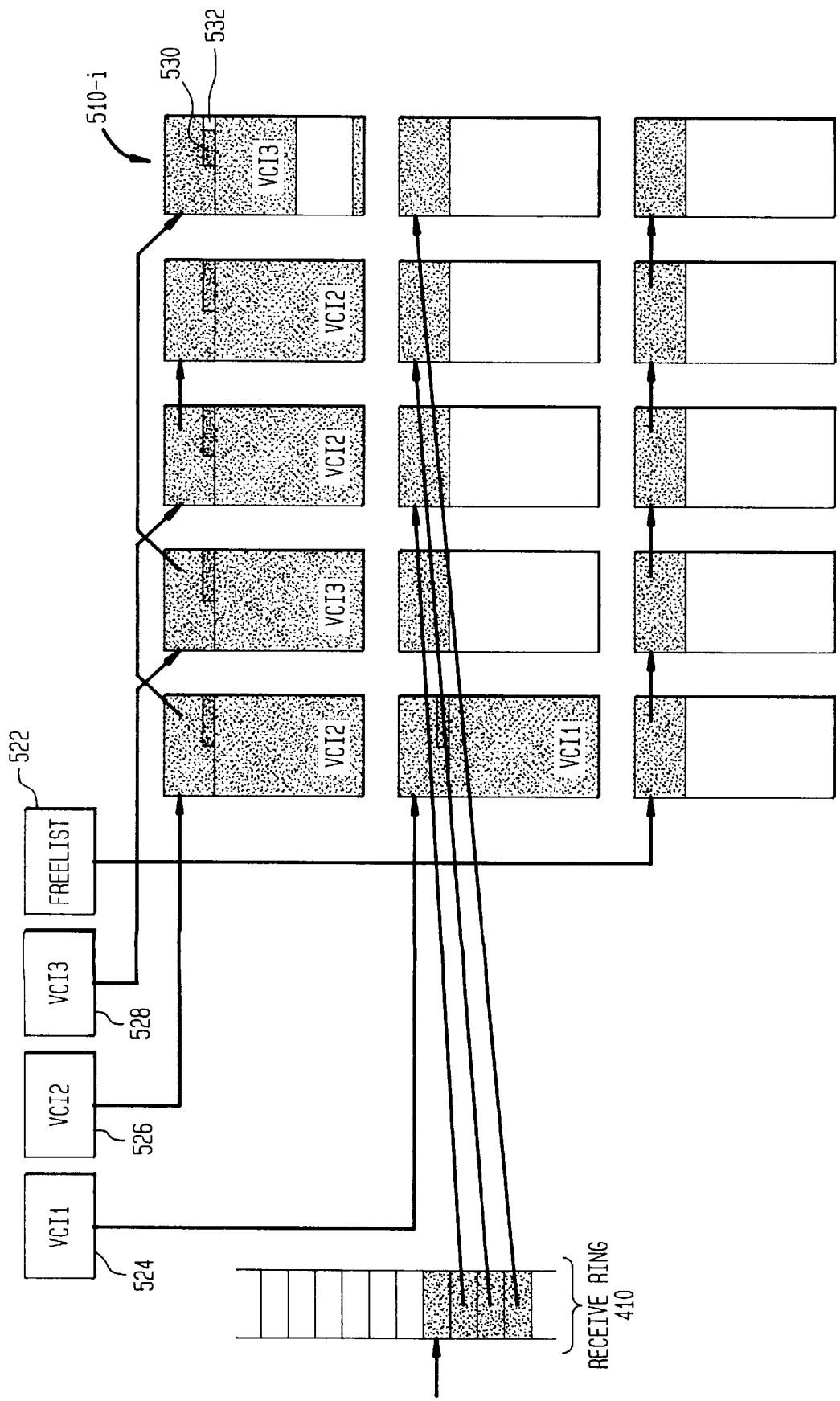

FIGS. 12A–12H illustrate an exemplary reassembly operation in accordance with the present invention. FIG. 12A serves to illustrate the above-described MBUF data structure which may be utilized in an ATM SAR device in accordance with the present invention. FIG. 12A shows a group of MBUFs arranged into a first packet 502, a second packet 504 and a third packet 506. Each of the packets 502, 504 and 506 includes multiple MBUFs 510-i, i=1, 2, . . . N. The first packet 502 includes five MBUFs 510-1 through 510-5, while the second packet 504 and the third packet 506 include three MBUFs 510-i and two MBUFs 510-i, respectively. Each of the MBUFs 510-i includes a header 512 and a data portion 514. As noted above, each MBUF may be 64 bytes in length, with a 16-byte header and a 48-byte data portion. The entire 48-byte data portion 514 may not be occupied by data in all MBUFs. Some of the MBUFs are therefore shown in FIG. 12A as including an unoccupied portion 516.

For example, the data portion of the first MBUF 510-1 of the packet 502 is only partially filled. This partially filled data portion may contain only a network header which was appended to the packet 502 by network protocol software. The data portions of the middle three MBUFs 510-2, 510-3 and 510-4 of the packet 502 contain user data to be sent in packet 502. The data portion of the middle MBUF 510-3 is only partially-filled because the user data did not fill three entire MBUFs. The data portion of the final MBUF 510-5 of the packet 502 contains a network trailer added by the network protocol software. As noted above, each 64-byte MBUF may correspond to a particular cell buffer in the cell buffer portion 414 of the memory 40. The MBUFs 510-i will therefore be referred to as cell buffers in the following description.

FIG. 12B illustrates the status of a group of cell buffers 510-i at the initialization of a reassembly operation. A list header designated freelist 522 identifies all unused cell buffers 510-i. All of the cell buffers 510-i are initially on the freelist 522. Driver software running on CPU 30 directs the operation of the SAR receiver 405. The host CPU software prepares the receiver for cell reception by removing cell buffers from the freelist 522 and writing pointers to the removed cell buffers into the receive ring 410 as shown in FIG. 12C. The receive ring 410 illustrated in FIG. 12C thus includes a series of pointers to empty cell buffers. The software points the SAR receiver 405 to the first entry of the receive ring identifying an empty cell buffer. The receive ring pointer is designated by the arrow to the left of the receive ring 410. It will be assumed for the remainder of this example that the SAR receiver 405 is configured to receive data on three different VCIs designated VCI1, VCI2 and VCI3. The software running on CPU 30 directs the SAR receiver 405 to filter out all VCIs other than VCI1, VCI2 and VCI3. The software also maintains three list pointers 524, 526 and 528 which are used to form cell buffer chains for cells received on VCI1, VCI2 and VCI3, respectively.

The receiver 405 retrieves the receive ring entry indicated by the receive ring pointer and awaits the receipt of an ATM cell. An ATM cell arriving with a VCI which corresponds to either VCI1, VCI2 or VCI3 passes through the above-described VCI filter and is accepted by the receiver 405. The receiver 405 then writes the first four bytes of the ATM cell header and the 48 bytes of ATM cell data into the cell buffer identified by the receive ring entry. The receiver 405 then advances the ring pointer to the next entry in the receive ring and retrieves therefrom a pointer to the next available cell buffer. This cell buffer is used to store the next cell received and accepted for VCI 1, VCI2 or VCI3. FIG. 12D shows the status of the cell buffers 510-i and the receive ring 410 after receipt of a number of ATM cells for VCI1, VCI2 and VCI3. The areas 530 shown in each of the occupied cell buffer headers correspond to a 4-byte ATM cell header.

As noted above in conjunction with FIG. 11D above, the host CPU software periodically services the receive ring 410 to avoid overflow. This servicing operation may be in response to an interrupt condition generated by the receiver 405. The interrupt condition may be triggered by the receipt of an ATM cell with the AAL5 end-of-frame bit set, or by reaching the limits specified for setting the above-described RRW or RRL flags. The software services the receive ring by first examining the receive ring pointer to determine how many cells have been received since the last time the ring was serviced. The software then steps through the receive ring, examining the stored ATM cell identified by each of the receive ring entries to determine which VCI the cell belongs to. All stored cells for a particular VCI are then linked into a cell buffer chain for that VCI. The list headers 524, 526 and 528 are used to identify the cell buffer chains for VCI1, VCI2 and VCI3, respectively. FIG. 12E illustrates the three cell buffer chains formed as a result of the receive ring servicing operation. It can be seen that list header 524 for VCI1 identifies a single cell buffer containing the single cell received on that VCI. The list header 526 for VCI2 identifies a chain of three cell buffers, while the list header 528 for VCI3 identifies a chain of two cell buffers. As noted above, the pointers to any cell buffers identified by one of the list headers 524, 526 or 528 are removed from the receive ring. The software may then remove free cell buffers from the group identified by the freelist 522 and load the corresponding pointers into the newly-freed receive ring entries.

The host CPU software also determines if a stored cell has the end-of-frame bit 532 set in its header 530. In this exemplary embodiment, the last cell buffer 510-i in the chain identified by the VCI3 list header 528 includes an ATM cell header 530 with a set end-of-frame bit 532. This indicates to the driver software that an entire AAL5 frame has been received for VCI3, and that post-processing such as the above-described CRC computation may be performed on the received VCI3 AAL5 frame.

The host CPU software may perform the post-processing at the same time the receive ring is serviced, or may schedule the post-processing for performance at a future time. The post-processing may also include checking a frame length field in the AAL5 trailer at the end of the frame to ensure that no cells were dropped. As described in conjunction with FIG. 11D above, a CRC computed for the entire frame is compared to the CRC field of the frame trailer to determine if the frame should be accepted or rejected. The CRC computation is therefore performed in this embodiment after an entire AAL5 frame has been received, instead of as the individual cells are received. This provides improved ATM processing efficiency in set top box and other processing applications.

Figure 12G:
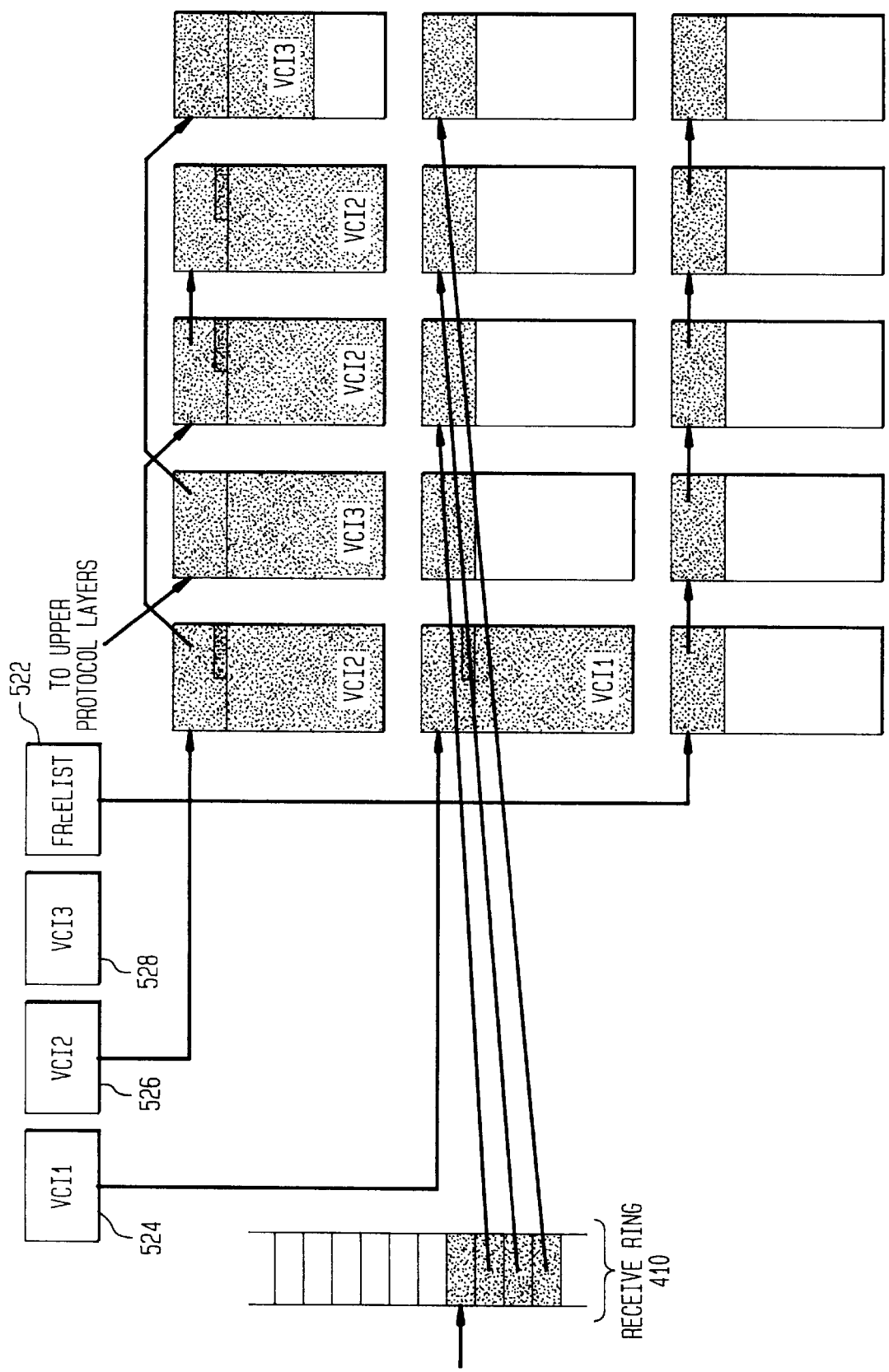
Figure 12H:
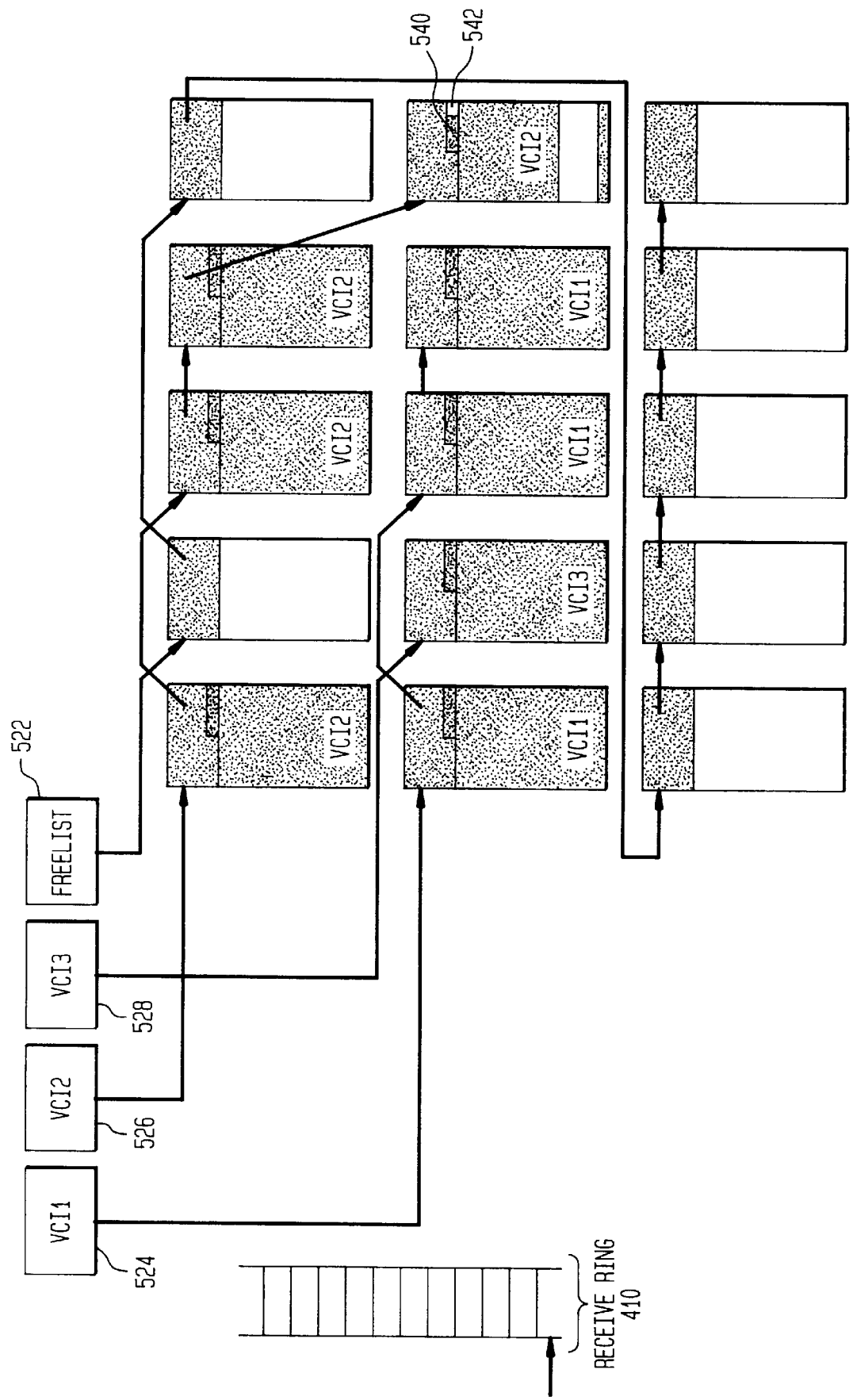

As noted above, the software running on the host CPU 30 could be configured to point the dedicated CRC hardware in CRC processor 406 of FIG. 13 to each cell of the frame in turn until the full frame CRC is computed. Alternatively, the frame CRC could be computed entirely in software. If the computed CRC does not match the CRC field from the frame trailer, the entire frame is rejected and the cell buffers and corresponding pointers are linked back into the freelist for later reuse. If the computed CRC does match the trailer CRC field, the host CPU software adjusts the cell buffer headers for the VCI chain as shown in FIG. 12G to remove the ATM cell headers, and also removes the AAL5 trailer and any padding. It can be seen in FIG. 12G that the ATM cell header portions have been removed from the VCI3 cell buffer chain, and that the corresponding list header has been directed to an upper protocol layer. After the upper protocol layer processing is completed, the data portions of the processed AAL5 frame may be copied into appropriate application buffers, and the newly-freed cell buffers may be linked back into the freelist for later reuse. FIG. 12H illustrates the group of cell buffers after the buffers previously associated with the VCI3 chain have been returned to the freelist. It can be seen from FIG. 12H that a number of additional cells have been received and stored in cell buffers, including a cell on VCI2 having a cell header 540 with a set end-of-frame bit 542. The host CPU software will recognize the set end-of-frame bit 542 and perform or schedule frame processing for VCI2.

FIG. 13 illustrates an exemplary CRC processor 406 in greater detail. The processor 406 includes a CRC state machine 570, CRC logic 572 and a holding buffer 574. The CRC state machine 570 and CRC logic 572 combine to perform the above-noted CRC calculations in a well-known manner. The CRC processor 406 may operate at a clock rate of 40.5 MHz. The holding buffer 574 provides temporary storage of data blocks on which CRC calculations are to be performed, and may be implemented as an 8×16 single-ported RAM. The CRC processor 406 further includes a transmit accumulator register 576, a receive accumulator register 578, and a CRC command register 580. A CRC operation may be initiated on a given data block by writing the start address of the block, the length of the block and a command into the command register 580. Exemplary commands which may be supported by the CRC processor 407 include commands requesting computation of a partial CRC for a receive or transmit cell or group of cells. Alternatively, a command may be provided for generating a cumulative CRC for any given set of receive or transmit cell data. The CRC calculation requested by the command written to register 580 is carried out in a conventional manner using the state machine 570 and logic 572. The results of the calculation are stored in the appropriate accumulator register 576 or 578. Separate accumulator registers are provided for receive and transmit in order to prevent interference between interruptable receive and transmit processes. The host CPU 30 interfaces with the registers 576, 578 and 580 of the CRC processor 406 to request and obtain the above-noted frame CRCs. In alternative embodiments, the CRC function of ATM SAR 90 could be provided elsewhere in the ASIC processor 20 or in the CPU 30.

8.3 Segmentation

Figure 14A:
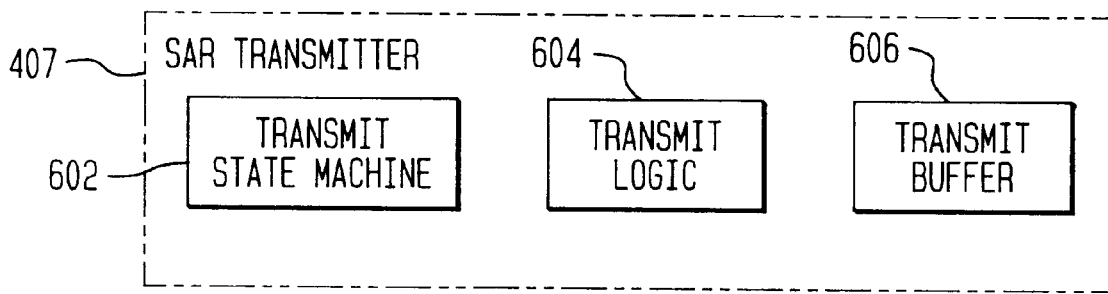
FIG. 14A is a block diagram of an exemplary SAR transmitter in accordance with the invention.

FIG. 14A is a block diagram of the SAR transmitter 407 incorporated into the ATM SAR 90. The SAR transmitter 407 includes a transmit state machine 602, transmit logic 604 and a transmit buffer 606. The transmit state machine 602 and transmit logic operate in conjunction with host CPU 30 and other portions of ASIC processor 20 to provide segmentation functions to be described in greater detail below. The transmit buffer 606 serves to buffer ATM cell data prior to its transmission via the UTOPIA port 400 and may be implemented as an 8×16 single-ported RAM. The SAR transmitter 407 may be configured to operate at a clock rate of 20.25 MHz.

Figure 14B:
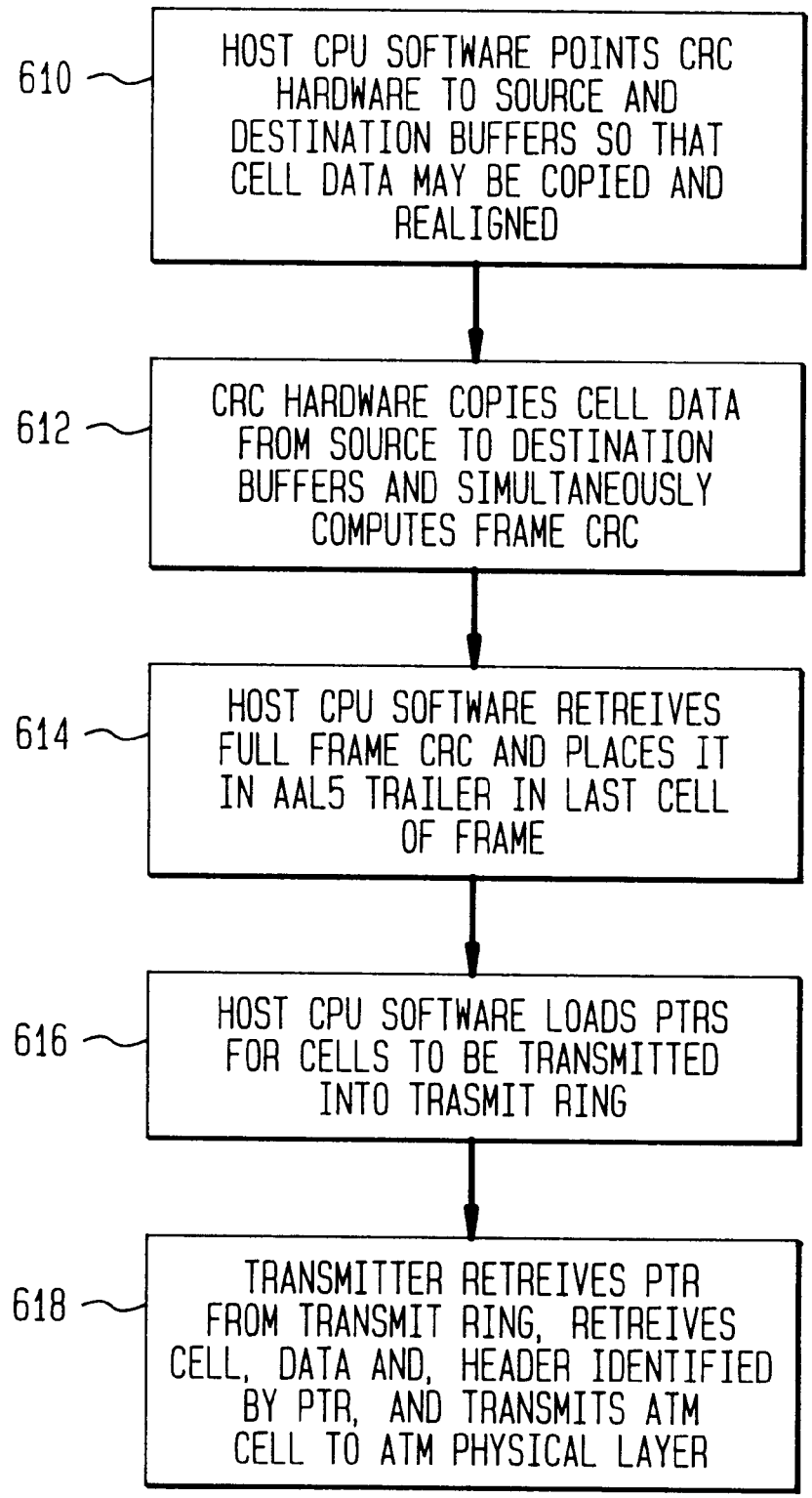
FIG. 14B is a flow diagram illustrating a portion of an exemplary segmentation operation in accordance with the invention.

FIG. 14B is a flow diagram illustrating a portion of an exemplary segmentation operation in accordance with the present invention. The segmentation operation utilizes a transmit ring 412 stored in a portion of the DRAM 40 as shown in FIG. 10. The transmit ring 412 in this exemplary embodiment is implemented as one DRAM page, or 1024 bytes, and therefore may include up to 256 32-bit pointers. This allows the transmit ring to support up to 12K of transmit cell data. It should be noted that the SAR transmitter 407 incorporates transmit ring warning (TRW) and transmit ring limit (TRL) flags which operate to provide overflow indications to the host CPU 30 in a manner similar to that described above for the corresponding receive ring flags RRW and RRL.

Step 610 of FIG. 14B indicates that in one possible embodiment of the invention, the host CPU software operates in conjunction with the above-described CRC processor 406 to realign the cell data. The need for realignment can be appreciated by reference to packet 502 of FIG. 12A, which includes partially-filled cell buffers 510-1 and 510-5 appended to the start and end of the packet as a result of processing performed by upper protocol layers. The realignment operation is used to provide packed cells suitable for ATM transmission, and involves copying the cell data from a source location to a destination location. The source and destination locations may be different cell buffers or different portions of the same cell buffer. Step 610 of FIG. 14B indicates that the host CPU software points dedicated CRC hardware in the CRC processor 406 to source and destination buffer locations such that the cell data can be copied from the source to the destination and thereby properly realigned. The CRC processor 406 may realign the cell data in 16-byte DRAM bursts at the same time that it calculating the cumulative transmit CRC for a given frame. The CRC holding buffer 474 has a 16-byte capacity and is used to support this burst data retrieval function. The CRC processor 407 may also be configured to accommodate odd length and odd alignment buffers. For example, the CRC logic 472 may be operative to recognize and process a pair of command bits specifying whether the first byte and/or the last byte of a given burst data transfer should be eliminated. Step 612 indicates that the CRC processor 406 computes a frame CRC as it copies and realigns each block of cell data in that frame. The host CPU software is responsible for storing appropriate cell headers for the realigned cells. The data retrieval and storage operations performed in the realignment process may utilize the DMA device 402 of ASIC processor 20.

After the realignment is complete, step 614 indicates that the host CPU software retrieves the full frame CRC from the transmit accumulator register 576 of CRC processor 406, and places it in an AAL5 trailer in the last cell of the frame. The host CPU software then loads pointers for the cell buffers in the frame into the transmit ring 412 as shown in step 616. The software directs the loading of the transmit ring such that cells for a particular VCI are not transmitted more often than is allowed by a quality of service (QOS) agreement made with the network at connection set-up. The transmit ring loading may involve interleaving the cells for the various VCIs, and inserting pointers to null cells at appropriate transmit ring locations. It should be noted that a single cell buffer could be allocated for all inserted null cells, since all null cell pointers may identify the same cell buffer. The transmitter 407 retrieves a pointer from the transmit ring, retrieves the cell data and cell header identified by the retrieved pointer, and transmits the cell to the ATM PHY layer via the UTOPIA port 400 of ASIC processor 20. The transmit ring pointer is then incremented to the identify the next transmit ring entry to be retrieved by the transmitter 407, and thus the next cell to be transmitted to the ATM PHY layer. The cell retrieval operations performed by transmitter 407 may utilize the DMA device 402 of processor 20. The host CPU software is configured to service the transmit ring periodically by stepping through the ring, storing pointers for cells to be transmitted, and linking the cell buffers and pointers of already-transmitted cells back into the freelist for reuse. The servicing of the transmit ring may be initiated in response to changes in the status of the above-noted TRW or TRL flags.

It should be understood that the foregoing description is merely illustrative of the invention. Numerous alternative embodiments within the scope of the appended claims will be apparent to those of ordinary skill in the art.

The claimed invention is:

1. A method of converting an input data stream including a sequence of input data blocks into a converted stream suitable for addressing a look-up table, the method comprising the steps of:
    determining if an input block of the input data stream corresponds to a predetermined value;
    combining the input block with a previously-stored identifier of a first portion of the look-up table if the input block does not correspond to the predetermined value; and
    storing an identifier of a second portion of the look-up table if the input block does correspond to the predetermined value, wherein the step of storing further includes the steps of receiving a subsequent input block of the input data sequence and storing the subsequent input block as the identifier of the second portion.

2. A method of converting an input data stream including a sequence of input data blocks into a converted stream suitable for addressing a look-up table, the method comprising the steps of:
    determining if an input block of the input data stream corresponds to a predetermined value;
    combining the input block with a previously-stored identifier of a first portion of the look-up table if the input block does not correspond to the predetermined value;
    accessing the look-up table using an address corresponding to the result of the step of combining the input block with a previously-stored identifier of a first portion of the look-up table; and
    storing an identifier of a second portion of the look-up table if the input block does correspond to the predetermined value.

3. A method of converting an input data stream including a sequence of input data blocks into a converted stream suitable for addressing a look-up table, the method comprising the steps of:
    determining if an input block of the input data stream corresponds to a predetermined value;
    combining the input block with a previously-stored identifier of a first portion of the look-up table if the input block does not correspond to the predetermined value;
    combining a subsequent data block with the previously-stored identifier to thereby provide an address into the look-up table; and
    storing an identifier of a second portion of the look-up table if the input block does correspond to the predetermined value.

4. A method of converting an input data stream including a sequence of input data blocks into a converted stream suitable for addressing a look-up table, the method comprising the steps of:
    determining if an input block of the input data stream corresponds to a predetermined value;
    combining the input block with previously-stored identifier of a first portion of the look-up table if the input block does not correspond to the predetermined value;
    combining a subsequent data block with the stored identifier of a second portion of the look-up table to thereby provide an address into the look-up table; and
    storing an identifier of a second portion of the look-up table if the input block does correspond to the predetermined value.

5. A method of converting an input data stream including a sequence of input data blocks into a converted stream suitable for addressing a look-up table, the method comprising the steps of:
    determining if an input block of the input data stream corresponds to a predetermined value;
    combining the input block with a previously-stored identifier of a first portion of the look-up table if the input block does not correspond to the predetermined value; and
    storing an identifier of a second portion of the look-up table if the input block does correspond to the predetermined value,
        wherein the look-up table is a $2^{2y}$xm table, the data block is a y-bit data block and the identifiers of the first portion and the second portion are y-bit identifiers.

6. A method of converting an input data stream including a sequence of input data blocks into a converted stream suitable for addressing a look-up table, the method comprising the steps of:
    determining if an input block of the input data stream corresponds to a predetermined value;
    combining the input block with a previously-stored identifier of a first portion of the look-up table if the input block does not correspond to the predetermined value; and
    storing an identifier of a second portion of the look-up table if the input block does correspond to the predetermined value,
        wherein the look-up table is a 256×16 table, the data block is a 4-bit data block and the identifiers of the first portion and the second portion are 4-bit identifiers.

7. An apparatus for converting an input data stream including a sequence of input data blocks into a converted stream suitable for addressing a look-up table, the apparatus comprising:

a comparator having an input connected to receive an input block of the input data stream, and an output providing a signal indicative of whether the input block corresponds to a predetermined value; and a circuit connected to the comparator and receiving the signal therefrom, the circuit operative to combine the input block with a previously-stored identifier of a first portion of the look-up table if the input block does not correspond to the predetermined value, and to store an identifier of a second portion of the look-up table if the input block does correspond to the predetermined value.

8. The apparatus of claim 7 wherein the circuit connected to the comparator includes an input connected to receive a subsequent input block of the input data sequence, and wherein the circuit is further operative to store the subsequent input block as the identifier of the second portion.

9. The apparatus of claim 7 wherein the circuit is further operative to access the look-up table using an address corresponding to a combination of the input block with the previously-stored identifier of the first portion of the look-up table.

10. The apparatus of claim 7 wherein the circuit further includes an input connected to receive a subsequent data block of the input data sequence, and an output corresponding to an address representing a combination of the subsequent data block with the previously-stored identifier of a first portion of the look-up table.

11. The apparatus of claim 7 wherein the circuit further includes an input connected to receive a subsequent data block of the input data sequence, and an output corresponding to an address representing a combination of the subsequent data block with the stored identifier of a second portion of the look-up table.

12. The apparatus of claim 7 wherein the look-up table is a $2^{2y}$xm table, the data block is a y-bit data block and the identifiers of the first portion and the second portion are y-bit identifiers.

13. The apparatus of claim 7 wherein the look-up table is a 256×16 table, the data block is a 4-bit data block and the identifiers of the first portion and the second portion are 4-bit identifiers.

14. An apparatus for converting an input data stream including a sequence of input data blocks into a converted stream, the apparatus comprising:

a look-up table having a plurality of input address lines, wherein a first set of the input address lines are connected to receive an input block of the input data stream;

a comparator having an input connected to receive an input block of the input data stream, and an output providing a signal indicative of whether the input block corresponds to a predetermined value; and a first register having a load signal input coupled to the output of the comparator, a data input connected to receive an input block of the data stream, and an output coupled to a second set of the input address lines of the look-up table, the register storing an identifier of a first portion of the look-up table, the register loading the input block as an identifier of a second portion of the look-up table if the input block corresponds to the predetermined value, and supplying the previously stored identifier of a first portion of the look-up table to the output of said register if the input block does not correspond to the predetermined value.

15. The apparatus of claim 14 further including a multiplexer having an output connected to the first set of input address lines of the look-up table, a first input connected to receive a current input data block, a second input connected to receive a previously-stored input data block, and a select input coupled to the output of the comparator, such that the multiplexer supplies one of the current input data block or the previously-stored input data block to the first set of input address lines depending upon the output of the comparator.

16. The apparatus of claim 14 wherein the look-up table is a $2^{2y}$xm table, the first and second sets of input address lines each include y lines, and the input data block and stored identifiers each include y bits.

17. The apparatus of claim 14 wherein the look-up table is a 256×16 table, the first and second sets of input address lines each include 4 lines, and the input data block and stored identifiers each include 4 bits.

18. The apparatus of claim 14 further including a second register coupled between the output of the comparator and the load signal input of the first register.

19. The apparatus of claim 18 wherein the second register provides a delay sufficient to allow a subsequent input data block to reach the first register.

* * * * *